United States Patent
Kendra

(10) Patent No.: US 12,298,386 B2
(45) Date of Patent: May 13, 2025

(54) MOTION EXTENDED ARRAY SYNTHESIS FOR USE IN HIGH RESOLUTION IMAGING APPLICATIONS

(71) Applicant: Leidos, Inc., Reston, VA (US)

(72) Inventor: John R. Kendra, Arlington, VA (US)

(73) Assignee: Leidos, Inc., Reston, VA (US)

( * ) Notice: Subject to any disclaimer, the term of this patent is extended or adjusted under 35 U.S.C. 154(b) by 280 days.

(21) Appl. No.: 17/573,346

(22) Filed: Jan. 11, 2022

(65) Prior Publication Data

US 2022/0308202 A1    Sep. 29, 2022

Related U.S. Application Data

(60) Division of application No. 17/039,602, filed on Sep. 30, 2020, now Pat. No. 11,249,183, which is a
(Continued)

(51) Int. Cl.
*G01S 13/90* (2006.01)
*G01S 13/46* (2006.01)
(Continued)

(52) U.S. Cl.
CPC .......... *G01S 13/9023* (2013.01); *G01S 13/46* (2013.01); *G01S 13/589* (2013.01); *G01S 13/904* (2019.05);
(Continued)

(58) Field of Classification Search
CPC .... G01S 13/9023; G01S 13/46; G01S 13/589; G01S 13/904; G01S 13/9082;
(Continued)

(56) References Cited

U.S. PATENT DOCUMENTS 6,861,978 B2    3/2005 Lam
6,942,186 B1 *  9/2005 Levin ............... B64G 1/40
                                                244/166
(Continued)

FOREIGN PATENT DOCUMENTS

JP      2001335000 A   * 12/2001

OTHER PUBLICATIONS

A. Richard Thompson, James M. Moran, George W. Swenson, Jr., "Interferometry and Synthesis in Radio Astronomy," Third Edition, Springer Open, 20.
(Continued)

*Primary Examiner* — Timothy A Brainard
*Assistant Examiner* — Ismaaeel A. Siddiquee
(74) *Attorney, Agent, or Firm* — Dawn-Marie Bey; Bey & Cotropia PLLC

(57) ABSTRACT

A process and systems for constructing arbitrarily large virtual arrays using two or more collection platforms (e.g. AUX and MOV systems) having differing velocity vectors. Referred to as Motion Extended Array Synthesis (MXAS), the resultant imaging system is comprised of the collection of baselines that are created between the two collection systems as a function of time. Because of the unequal velocity vectors, the process yields a continuum of baselines over some range, which constitutes an offset imaging system (OIS) in that the baselines engendered are similar to those for a real aperture of the same size as that swept out by the relative motion, but which are offset by some (potentially very large) distance.

15 Claims, 31 Drawing Sheets

Related U.S. Application Data continuation of application No. 15/789,101, filed on Oct. 20, 2017, now Pat. No. 10,823,843.

(60) Provisional application No. 62/410,495, filed on Oct. 20, 2016.

(51) Int. Cl.
*G01S 13/58* (2006.01)
*G01S 13/00* (2006.01)
*G01S 13/02* (2006.01)

(52) U.S. Cl.
CPC ..... *G01S 13/003* (2013.01); *G01S 2013/0254* (2013.01); *G01S 2013/468* (2013.01); *G01S 13/9058* (2019.05); *G01S 13/9064* (2019.05); *G01S 13/9082* (2019.05); *G01S 13/9088* (2019.05); *G01S 13/9089* (2019.05)

(58) Field of Classification Search
CPC ......... G01S 13/9088; G01S 2013/0254; G01S 2013/468; G01S 13/003; G01S 13/9058; G01S 13/9064; G01S 13/9089
See application file for complete search history.

(56) References Cited

U.S. PATENT DOCUMENTS

| | | | |
|---|---|---|---|
| 10,367,254 B1* | 7/2019 | Greenbaum | H01Q 1/288 |
| 2004/0004569 A1* | 1/2004 | Lam | G01S 3/02 |
| | | | 342/351 |
| 2010/0244843 A1 | 9/2010 | Kuzmin et al. | |
| 2011/0163912 A1* | 7/2011 | Ranney | G01S 7/414 |
| | | | 342/179 |
| 2012/0001977 A1 | 1/2012 | Burke | |
| 2015/0355719 A1 | 12/2015 | Suman et al. | |
| 2016/0109570 A1* | 4/2016 | Calabrese | G01S 13/9054 |
| | | | 342/25 F |
| 2017/0041068 A1* | 2/2017 | Murakowski | H04B 10/60 |
| 2019/0075283 A1 | 3/2019 | Chinnock et al. | |
| 2020/0092468 A1 | 3/2020 | Mermelstein et al. | |

OTHER PUBLICATIONS

S. Stergiopoulos and E. J. Sullivan, "Extended Towed Array Processing by an Overlap Correlator," J. Acoust. Soc. Am., 86, pp. 158-171, 1989.

G. L. D'Spain, et al., "Active Control of Passive Acoustic Fields: Passive Synthetic Aperture/Doppler Beamforming with Data from an Autonomous Vehicle," J. Accoust. Soc. Am. 120 (6), Dec. 2006.

John R. Kendra, "Motion Extended Array Synthesis, Part 1: Theory and Method," IEEE Transactions on Geoscience and Remote Sensing, vol. 55, No. 4, 17 pp., Apr. 2017.

John R. Kendra, et al., "Motion-Extended Array Synthesis, Part II: Experimental Validation," IEEE Transactions on Geoscience and Remote Sensing, vol. 55, No. 4, 13 pp., Apr. 2017.

John R. Kendra, "Motion-Extended Array Synthesis, Part III: An Offset Imaging System Perspective," IEEE Transactions on Geoscience and Remote Sensing, vol. 55, No. 4, 16 pp., Apr. 2017.

A. Camps, et al., "Synthesis of Large Low Redundancy Linear Arrays," IEEE Trans. Antennas Propag., vol. 49, No. 12, pp. 1881-1883, Dec. 2002.

Lambrigtsen et al., "GeoSTAR—A Breakthrough in Remote Sensing Technology," Proceedings of the Sixth Annual NASA Earth Science Technology Conference (ESTC 2006), College Park, MD, USA, Jun. 27-29, 2006.

"Small Spacecraft Technology State of the Art," NASA, Mission Design Division, AMES Research Center, 173 pp., Dec. 2015.

P. D. Welch, "The use of fast fourier transform for the estimation of power spectra: a method based on time averaging over short, modified periodograms," *IEEE Trans. Audio Electroacoust.*, vol. AU-15, pp. 70-73, Jun. 1967.

Park et al., "Improved Music-Based SMOS RFI Source Detection and Geolocation Algorithm," IEEE Trans, Geosci. Rem. Sens., vol. 54, No. 3, pp. 1311-1322, Mar. 2016.

Leidos, Inc., "White Paper: Motion-Extended Array Synthesis (MXAS)," 6 pp., Jul. 3, 2014 (redacted).

Michael Shao, et al., "A Constellation of SmallSats With Synthetic Tracking Cameras to Search For 90% of Potentially Hazardhos Near-Earth Objects," Astronomy Astrophysics 603, A126, 15 pp., 2017.

Andrew Petro, "Space Technology Mission Directorate, Small Spacecraft Technology, Markets & Motivations," Briefing to the NASA Advisory Committee, Jul. 28, 2014.

* cited by examiner

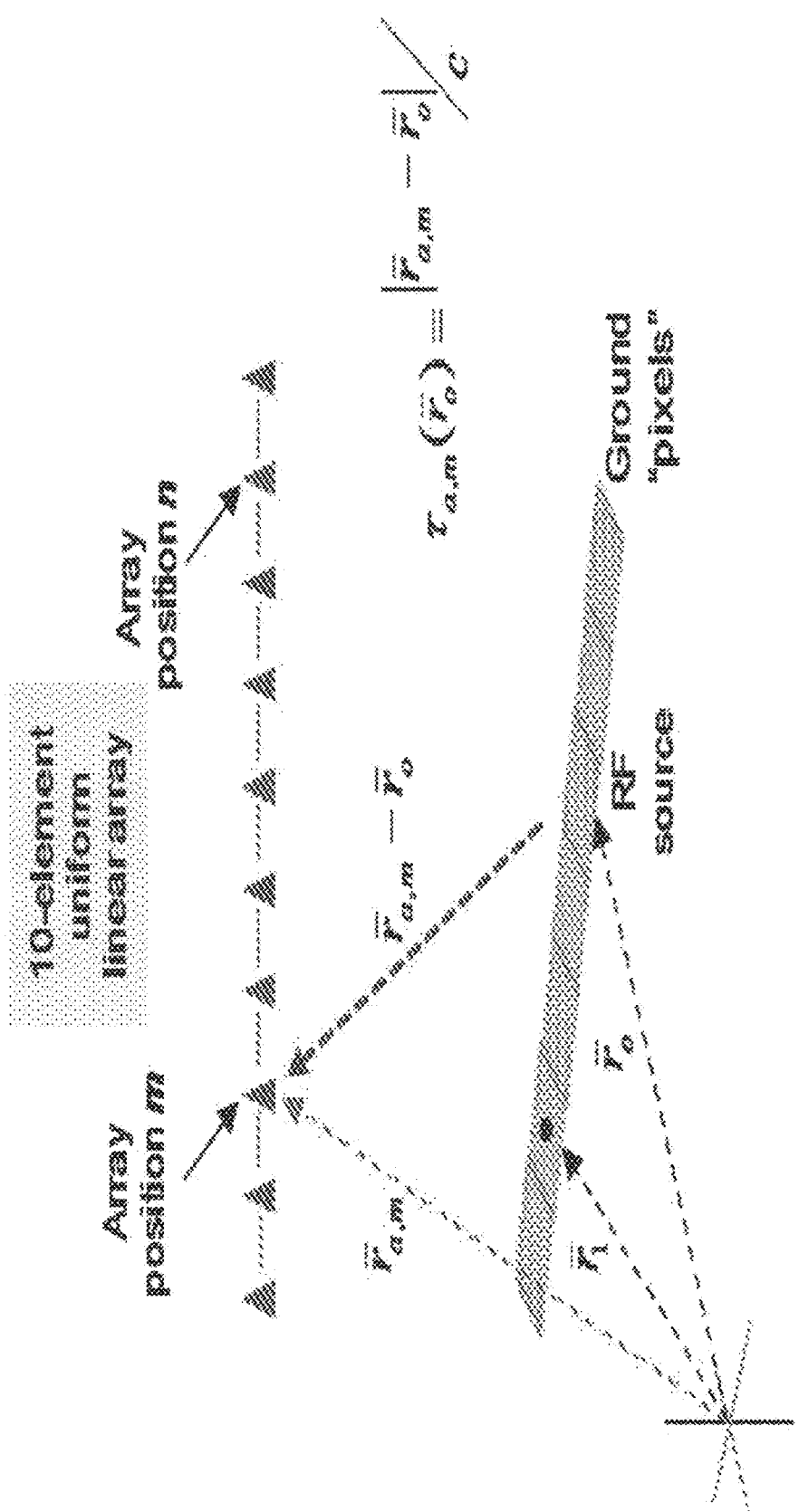
Figure 3 – Prior Art

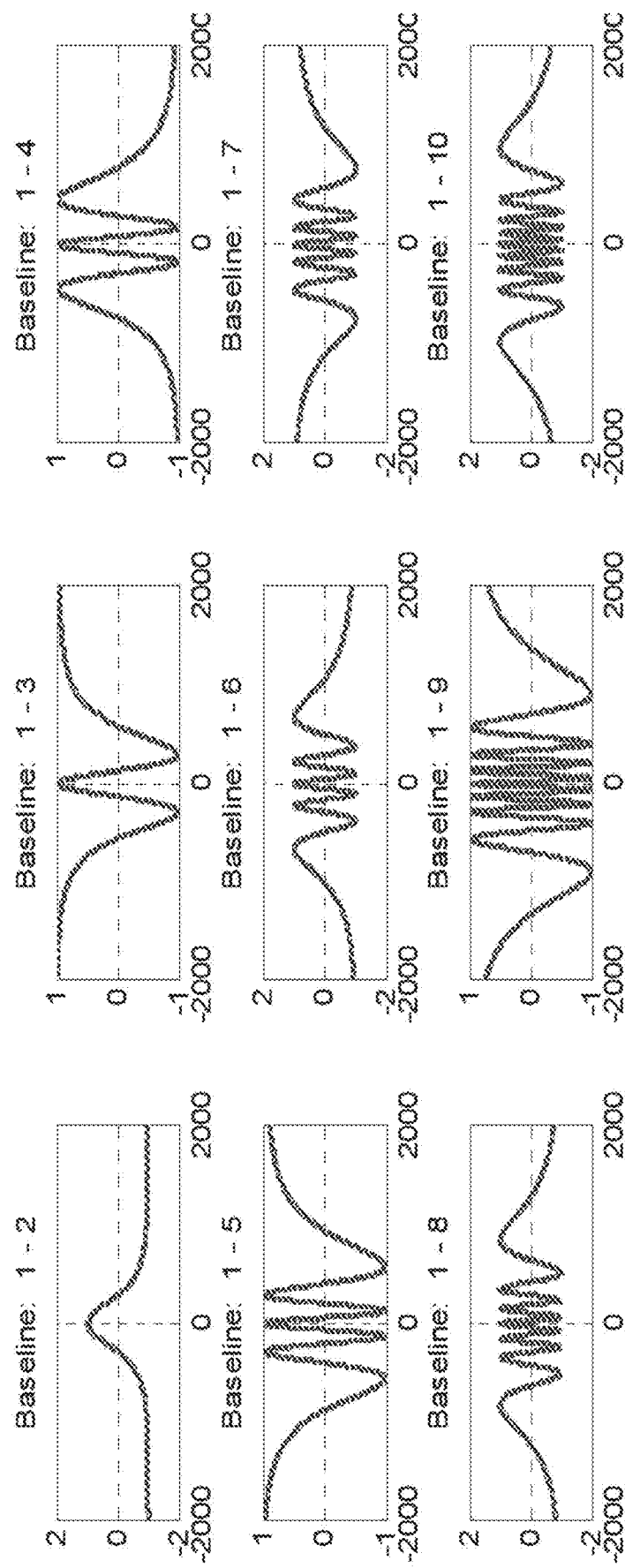
Figure 4 – Prior Art

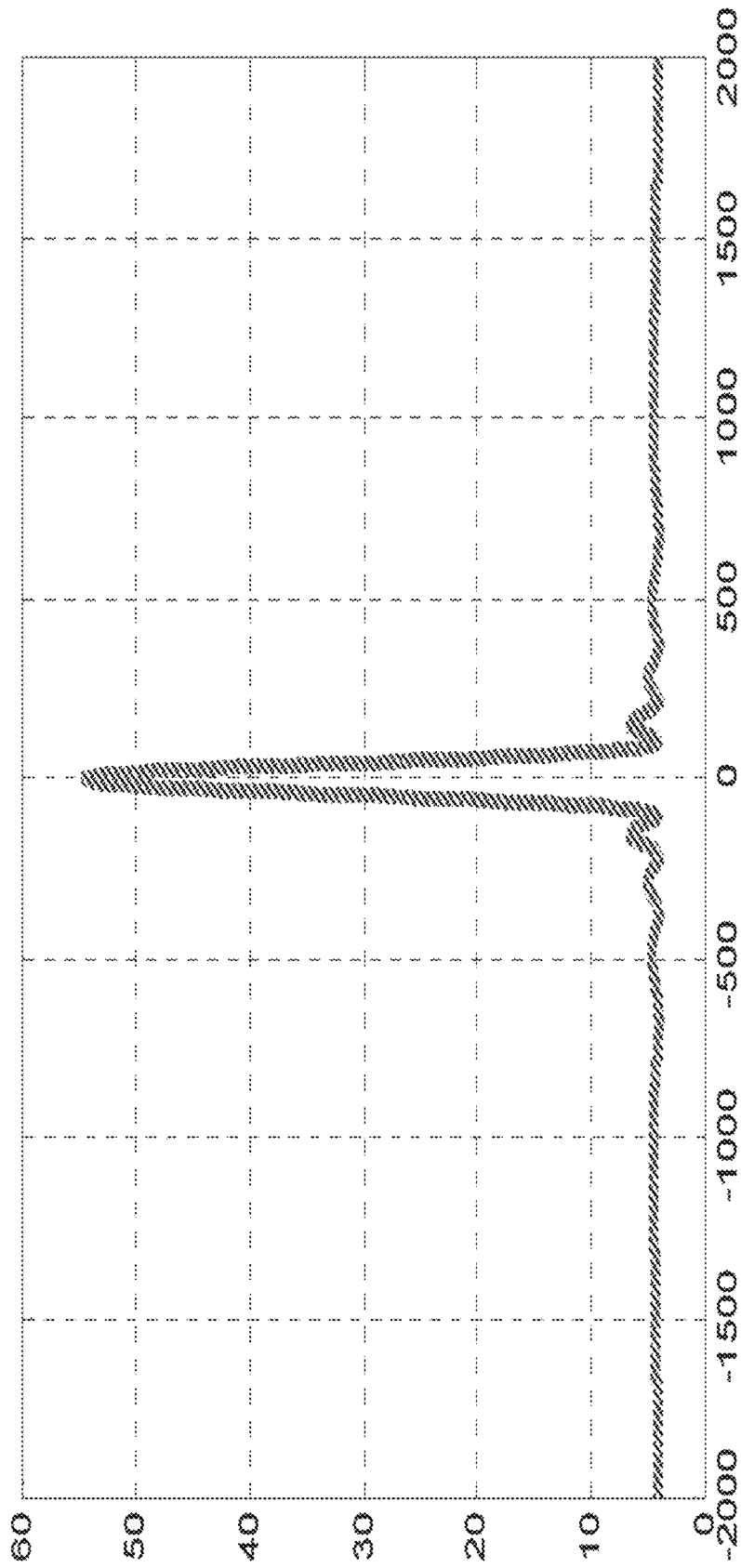
Figure 5 – Prior Art

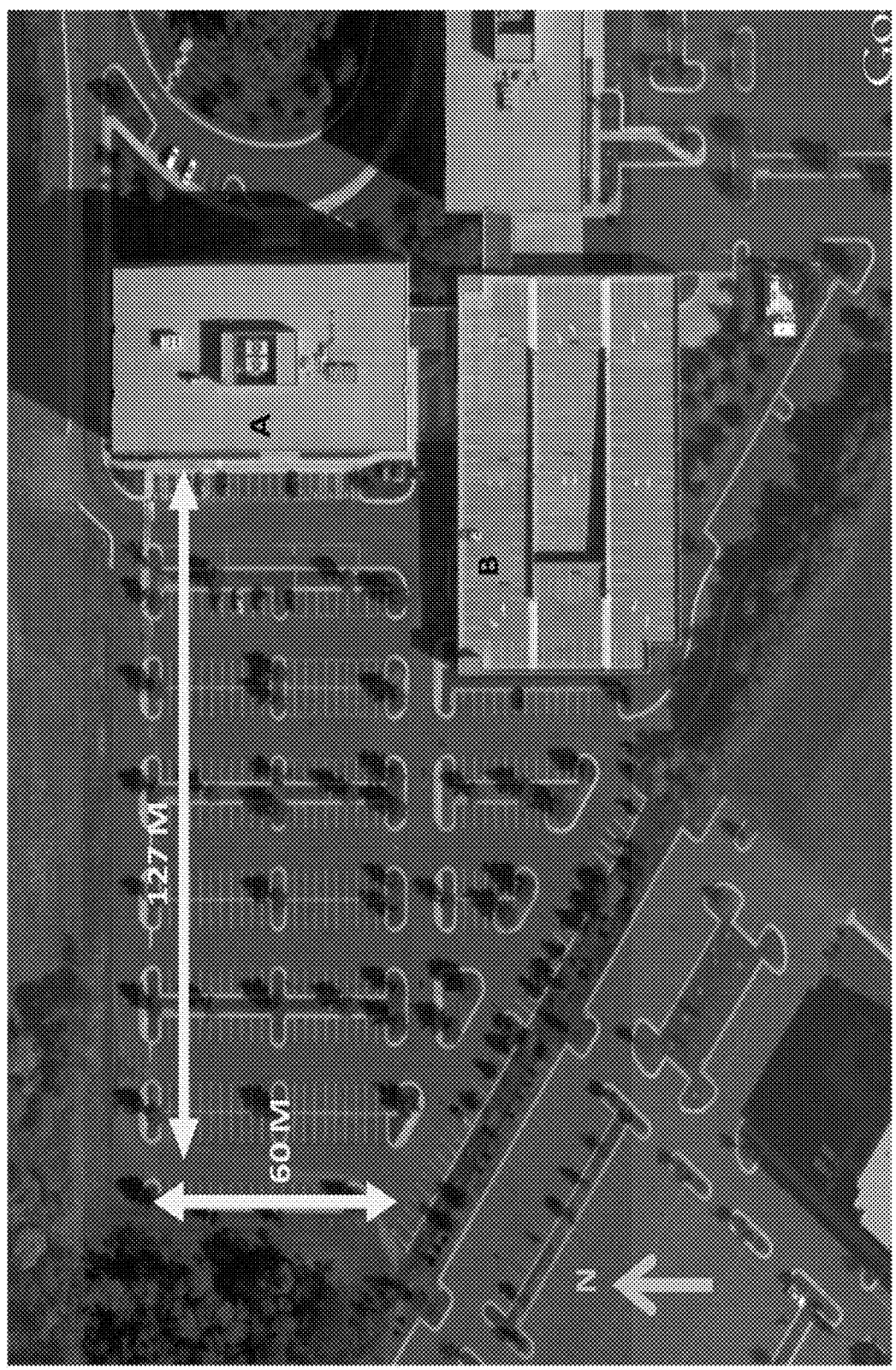
Figure 24

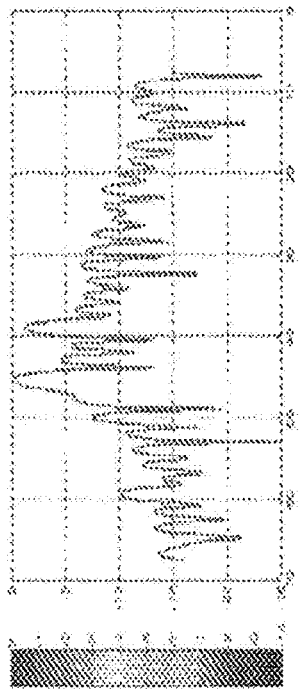
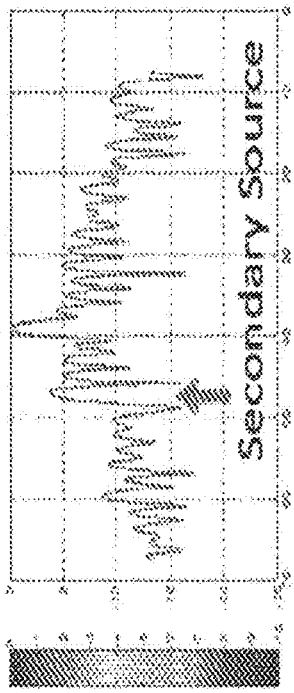
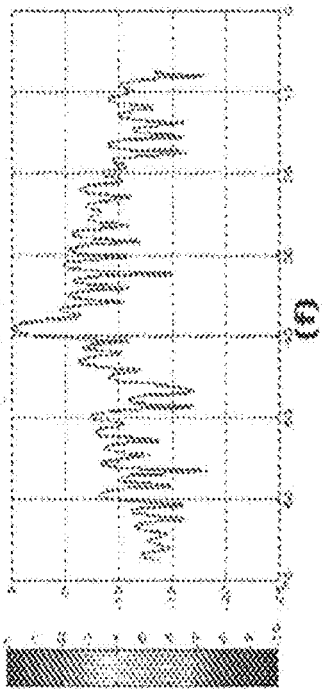
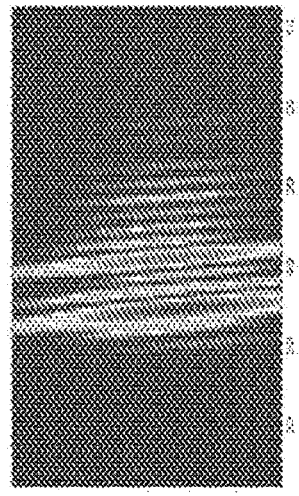
Figure 26a Figure 26b Figure 26c Figure 26d Figure 26e Figure 26f

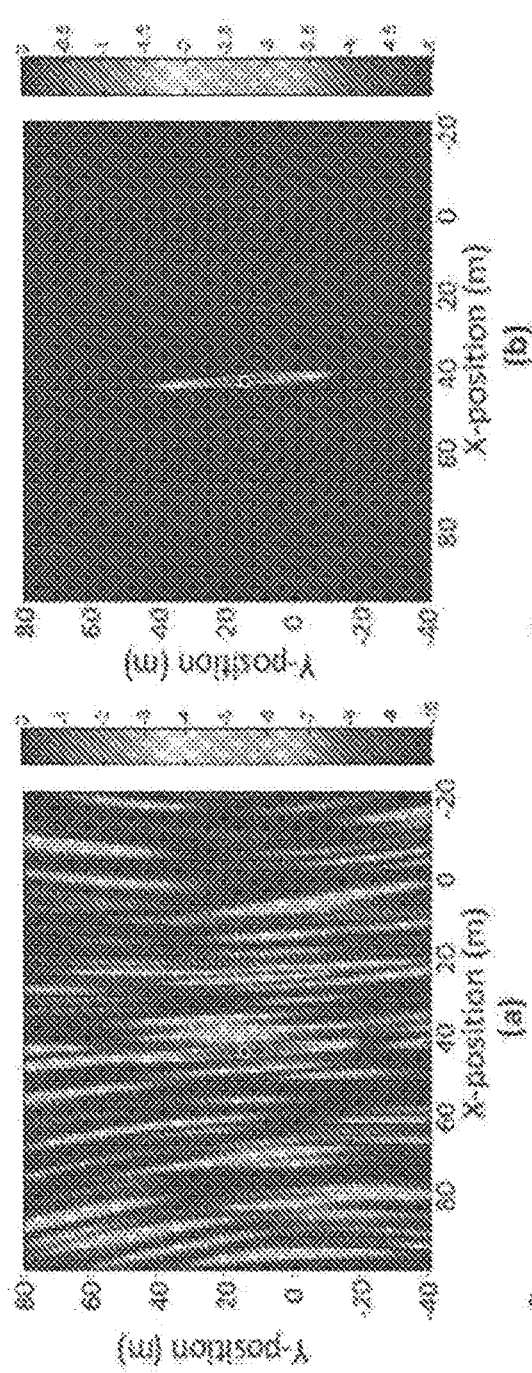
Figure 28a
Figure 28b
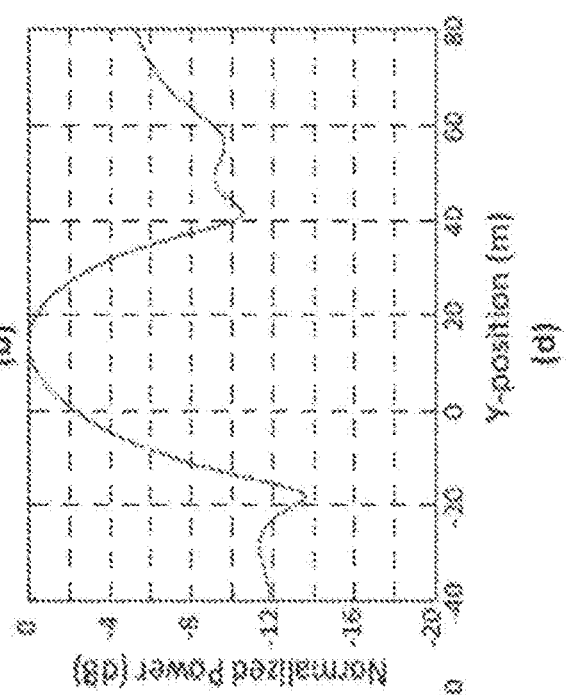
Figure 28d
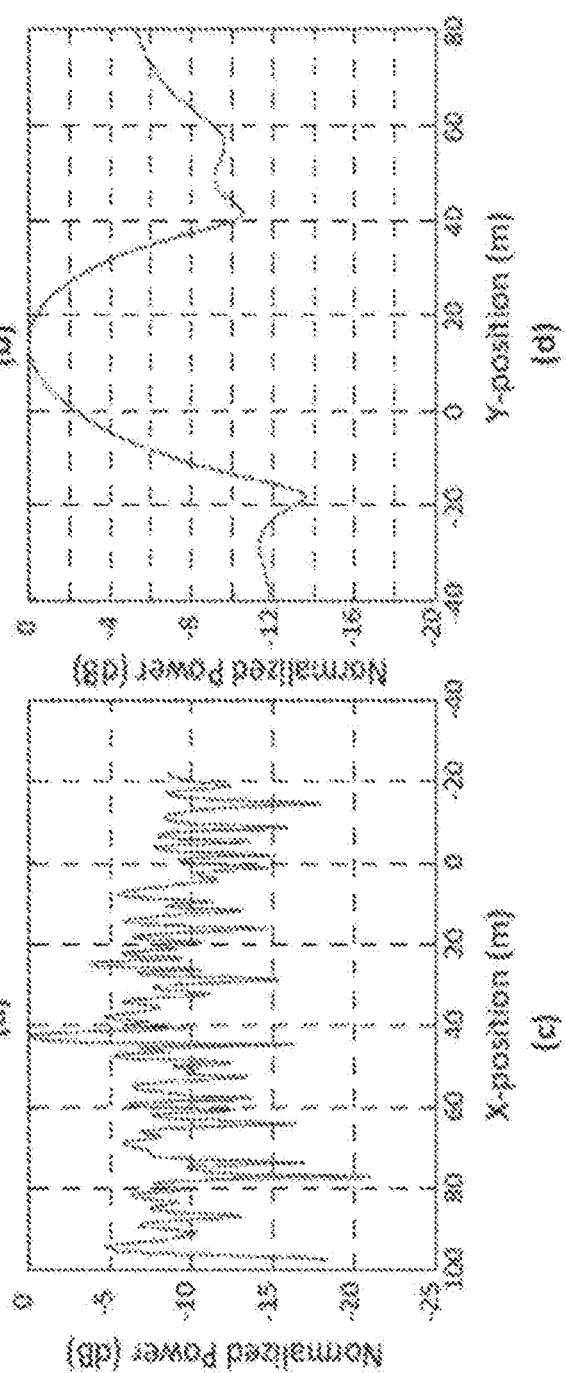
Figure 28c

MOTION EXTENDED ARRAY SYNTHESIS FOR USE IN HIGH RESOLUTION IMAGING APPLICATIONS

CROSS-REFERENCE TO RELATED APPLICATIONS

The present application is a divisional of application Ser. No. 17/039,602, filed Sep. 30, 2020, entitled "Motion Extended Array Synthesis For Use in High Resolution Imaging Applications," which is a continuation of application Ser. No. 15/789,101, filed on Oct. 20, 2017, entitled "Motion Extended Array Synthesis For Use in High Resolution Imaging Applications," now U.S. Pat. No. 10,823,843, which claims the benefit of priority to similarly titled U.S. Provisional Patent Application Ser. No. 62/410,495 filed on Oct. 20, 2016, both of which are incorporated herein by reference in their entireties.

GOVERNMENT FUNDING STATEMENT

Embodiments disclosed herein may have been conceived or first actually reduced to practice in performance of work under the following Government funding vehicle: Office of Naval Research, under Grant N00014-11-C-0016. As a result, the Government may have certain rights to those embodiments.

BACKGROUND

Field of the Embodiments

The present embodiments are generally in the field of imaging. More particularly, the present embodiments are related to an improved process for RF and acoustic sensing domains.

Description of the Related Art

A fundamental interest in remote sensing is in maximizing the measurement attributes of directionality (resolution) and sensitivity. Indeed, these are key figures of merit for any form of imaging. The key system attribute of an imaging system that sets the resolution and greatly influences sensitivity is the effective aperture of the system; the larger it is, the greater the resolution and, for a given time period of integration, the greater is the sensitivity as well. There has thus been a historical quest, traceable over the past century, to develop techniques to effectively synthesize large apertures while circumventing the requirement for infrastructure that is unfeasibly large and/or expensive.

Aperture synthesis (AS) refers to the process of superimposing weighted baseline measurements (essentially, interferometer outputs), which are typically collected in a temporally distributed fashion, to create an image, or more precisely, an estimate of the object intensity distribution (or, in the case of coherent imaging, the object amplitude distribution). The application of AS in the realm of Radio Astronomy (RA), in the form of synthesis imaging (SI), best exemplifies both the evolution of the technology and its present fullest realization. For example, a comprehensive description is found in Interferometry and Synthesis in Radio Astronomy (2nd Ed., Wiley, 2004), by A. R. Thompson, J. M. Moran, and G. W. Swenson. Notably, RA SI is distinguished from general AS in the prominent feature (in SI) of exploitation of the earth's rotation to develop a broader set of effective physical baselines.

In addition to RA SI, there are many other applications that employ passive aperture synthesis. In general these applications exploit neither temporal distribution of baseline collection nor earth rotation for baseline diversity. Instead, they exploit the principle of imaging systems that holds that (for far-field imaging scenarios), a sparsely-defined aperture can produce the equivalent imaging performance, in terms of PSF, to a full aperture providing that the former comprises the same set of distinct physical baselines as the latter. In both RA SI and the various sparse array applications of aperture synthesis, the resultant synthetic aperture is ultimately limited by the maximum dimensions that are spanned by the physical collection elements of the imaging system.

One notable example of prior art in which the resultant synthetic aperture size, in at least one dimension, is not constrained by the physical collection infrastructure of the system is in the realm of undersea passive synthetic aperture sonar (PSAS). The Extended Towed Array Measurements (ETAM) algorithm, invented in 1990 by E. J. Sullivan and S. Stergiopoulos, synthesizes an extended towed array based on correlations performed on two datasets taken at the same positions in space but temporally offset, that is, when the endmost elements of a towed linear array occupy the same set of positions earlier occupied by the foremost elements of the same array. For narrowband signals, the ETAM method has been demonstrated to enable synthesis of an aperture eight times longer than the physical (64-element) towed array. The approach however, has not been found to be applicable to non-narrowband signals.

A second notable example of prior art is as described in U.S. Pat. No. 6,861,978 B2, "Method and System for Mutual Coherent Synthetic Aperture Radiometry" (McSAR). McSAR provides for passive 2-D imaging using two collectors, at least one of which is moving, and having appreciable angular separation between them. Under this configuration, resolution in the "cross-range" dimension, that is the direction of the ground projection of a line connecting the two collectors, is achieved through the signal bandwidth, and the decorrelation that bandwidth engenders for excursions from a specific delay value (and hence specific cross-range location). The resolution phenomenon is equivalent to the RA SI concept of a fringe washing function, or fringe envelope; it is a function of bandwidth and angular separation, and it progressively degrades as either or both of these attributes are reduced in magnitude. In particular, the resolution distance is infinitely large when either of these attributes, angle or bandwidth, is zero. Resolution in the along-track dimension, which is the direction of the ground projection of the trajectory of the faster moving collector, is noted in the McSAR description as developing in accordance with synthetic aperture radar (SAR) processing principles.

Accordingly, there remains a need in the art for an aperture synthesis system whereby arbitrarily large (subject to the object field remaining within the field of view (FOV) of participant sensors), multi-dimensional apertures may be constructed, through the differential motion of two or more collectors, without use of a reference waveform, for both spatially coherent and incoherent scenes, in a manner that is suitable for and applicable to: a) arbitrary bandwidth scenarios, to include very wide bandwidth and zero bandwidth; and b) arbitrary collector configurations (assuming overlapping FOV between them of the object field), to include the case of negligible angular separation between participant collectors.

SUMMARY OF THE EMBODIMENTS

In a first exemplary embodiment, a system for imaging one or more emitters from a target scene includes: a first sensor system having the target scene within its field of view; a second sensor system having the target scene within its field of view; wherein at least one of the first and second sensor systems is moving such that a first velocity vector for the first sensor system is different from a second velocity vector of the second sensor system resulting in a relative motion therebetween and further wherein a temporally-distributed virtual imaging array is established thereby; and a processor for receiving first sensor data from the first sensor and second sensor data from the second sensor, wherein the first and second sensor data include first and second emitter signal data from the one or more emitters and imaging the first and second emitters within the target scene.

In a second exemplary embodiment, a process for imaging one or more emitters from a target scene includes: receiving by a first sensor system having the target scene within its field of view, first signals indicative of one or more emitters in the target scene; receiving by a second sensor system having the target scene within its field of view, second signals indicative of one or more emitters in the target scene; wherein at least one of the first and second sensor systems is moving such that a first velocity vector for the first sensor system is different from a second velocity vector of the second sensor system resulting in a relative motion therebetween, and further wherein a temporally-distributed virtual imaging array is established thereby; and processing by a processor only the first and second signals to image the one or more emitters within the field of view.

In a third exemplary embodiments, an offset-spatial-frequency imaging system for imaging a target, includes: a first and second antenna, wherein the first and second antenna are in relative motion, and further wherein the first and second antenna collect temporally distributed individual signals from one or more emitters in the target; and a processor for receiving the temporally distributed individual signals from the first and second antenna and constructing temporally distributed individual signal baselines of the one or more emitters in the target.

In a fourth exemplary embodiment, a nadir-imaging system includes: multiple independent moving collectors for receiving reflected energy from a surface below the nadir-imaging system, wherein the reflections are produced by narrowband illumination; and a specially programmed processing system for forming multiple I-dimensional imaging arrays as a function of time of the moving collectors using knowledge of the narrowband illumination as a reference waveform together with the received reflected energy and forming multiple interferometric baselines therein and therebetween, wherein the multiple I-dimensional arrays formed by the multiple independent moving collectors are constrained to exist at diverse orientations with respect to each other but to intersect or nearly intersect at common point in space; and for combining the multiple interferometric baselines both within and between the multiple I-dimensional imaging arrays to form a 2-dimensional imaging array.

BRIEF SUMMARY OF THE FIGURES

FIG. 3 illustrates a representative prior art scenario imaging of a strip of ground containing a single source, using a ten-element uniform linear array;

FIG. 4 illustrates baselines for the distinct spacings depicted in the prior art model one-source problem of FIG. 3;

FIG. 5 is the sum of FIG. 4 baselines, taking into account the multiplicity (and spatial translations) of each, which is the point spread function (PSF) image of the one-source from FIG. 3;

FIG. 24 illustrates an experimental set-up for testing the MXAS concept;

FIGS. 26(a)-(b) shows the same result as FIG. 25 without a Hanning window applied and FIG. 26(c)-(d) and (e)-(f) show the results of the application of null steering performed for this same image result;

FIG. 28(a)-(d) show actual imaging results from the MXAS experimental set-up in FIG. 24 including the azimuth (horizontal) cut at the maximum elevation angle (vertical position) (FIG. 28(c)), as well as the elevation cut at the maximum azimuth value (FIG. 28(d));

DETAILED DESCRIPTION

The present embodiments exploit the realization of a system and method referred to herein as Motion Extended Array Synthesis (MXAS), in the RF and acoustic sensing domains, for the purpose of achieving high resolution in imaging, direction finding, and geolocation applications. The focus is on a system and method in which, like Synthetic Aperture Radar (SAR), the aperture synthesized is much larger than any aspect of the physical system, but, unlike SAR, in which there is no reference waveform available to exploit. We show that arbitrarily large virtual arrays, limited only by antenna element field of view, can be created by moving one collection system away from another, sweeping out a 1- or 2-dimensional area. The virtual array so created is suitable for use in general signal environments, including complex scenarios with co-channel and/or ultra-weak sources. In the MXAS processing construct, the temporally-distributed array formation is cast into a form resembling standard array processing and affording the same degrees of freedom as a real array of the same size. A performance assessment comparing an MXAS implementation to a leading method for direction finding (DF) and geolocation shows orders of magnitude improvement for MXAS, and conformance to the Cramer-Rao Lower Bound (CRLB) for DF for an array, under the correct interpretation of motion extension.

Figure 1:
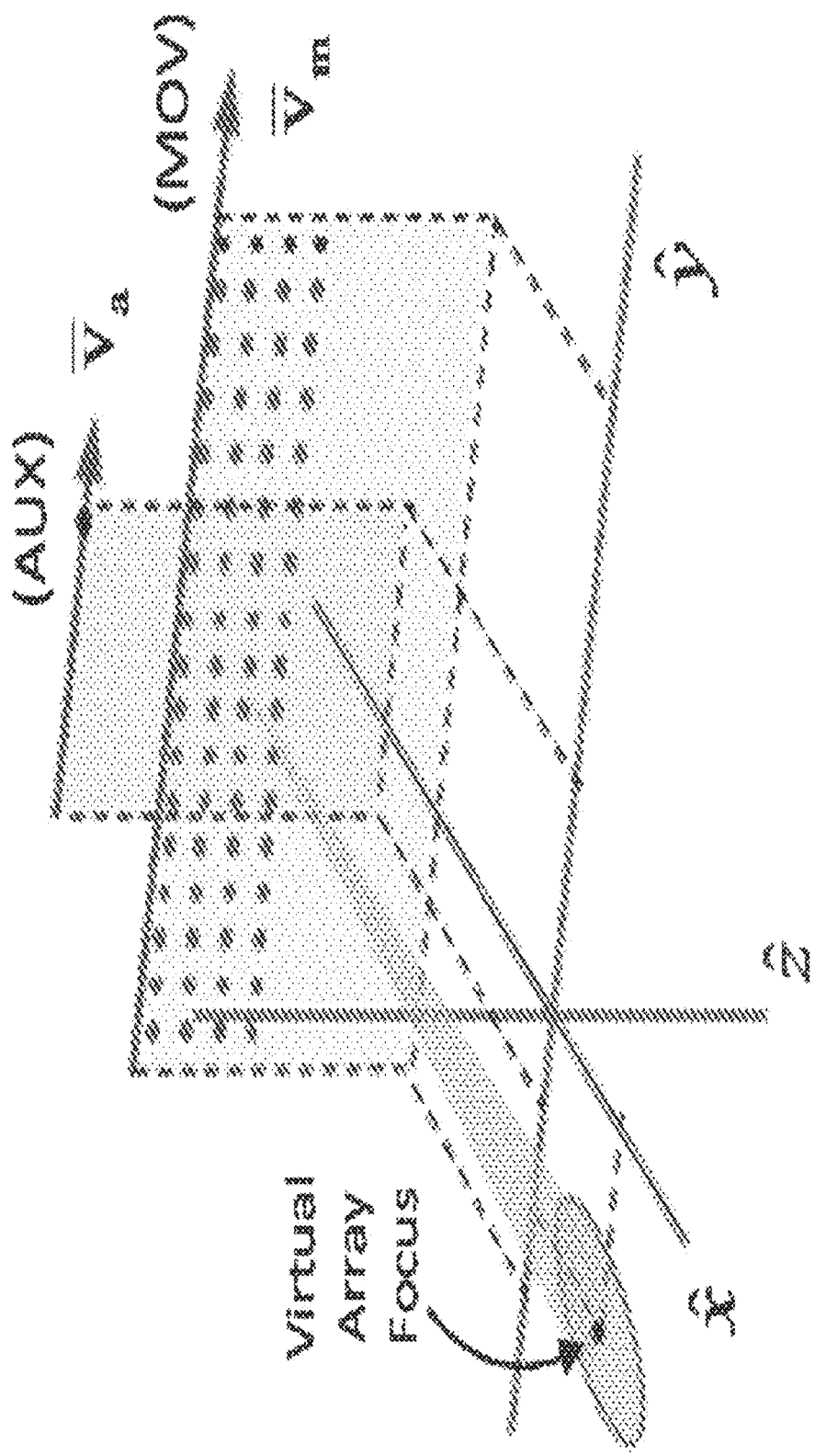
FIG. 1 is a schematic showing, generally, the Motion Extended Array Synthesis (MXAS) concept according to one or more embodiments described herein.

The present embodiments invoke the Motion Extended Array Synthesis (MXAS) theory and method wherein effective aperture extent is established by the space swept out by the relative motion of one collection system (the MOV), in the presence of a second collection system (AUX), which may be static, but primarily, must have a different velocity vector than the MOV. The derivation proceeds from the perspective of a variation on the operation of a linear array. The MXAS concept is generally and schematically illustrated in FIG. 1.

As discussed further herein, the MXAS concept and method possess the following principal attributes. First, the synthetic array may be arbitrarily large, subject to the constraint that the object field remains within the field of view (FOV) of all participating sensors. Second, beyond the element FOV and bandwidth requirements, there are few constraints on the relative locations of the MOV and AUX systems. Third, the point spread function (PSF) associated with the synthetic array is equivalent to the "voltage" (vs. power) pattern of a physical array of equivalent dimensions. Fourth, the process is suitable for arbitrarily complex scenarios including multiple co-channel (even coherent) emission sources and/or ultra-weak sources. Fifth, no concept of a reference waveform is employed in the process, beyond collection by the AUX and MOV systems. And sixth, the synthetic array possesses degrees of freedom (DOF) equal to the number of (Nyquist-spaced) virtual elements; these DOF are exploitable for such purposes as nulling of multiple/many targets for improved image elucidation.

Figure 2B:
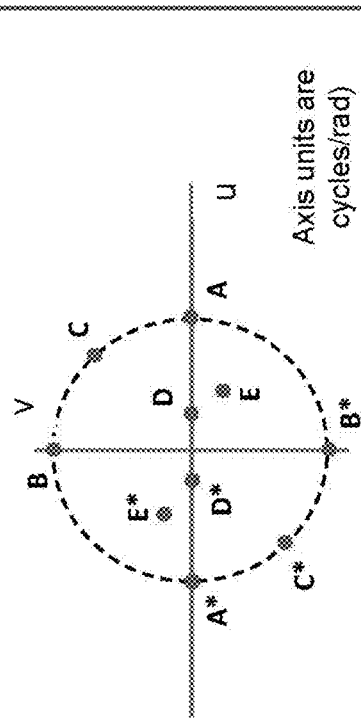
FIGS. 2(a)-2(d) are schematics illustrating a notional circular aperture.

The nature of MXAS can be appreciated in terms of the fundamental definition of an aperture. For illustration, we examine in FIGS. 2(a)-2(d) a notional circular aperture. The performance of an aperture, regardless of sensing modality (e.g., optical, RF, acoustic) can be described in terms of a summation of outputs from every possible two-element interferometer, or baseline, identifiable within the area of the aperture. The lines in FIG. 2(a) show some of the many possible baselines identifiable for the circular aperture. The endpoints of a given baseline in FIG. 2(a) are denoted with the same lower case letter, one end with a prime superscript. From imaging theory, a baseline is sensitive to (captures) one spatial frequency component of a target scene, and that spatial frequency is proportional to the geometry (i.e., length and orientation) of the baseline. The spatial frequency coverage of an aperture is typically represented on a u-v plane, in which u-values are the magnitude of the horizontal component of a spatial frequency and v-values, the vertical component. Also, for far-field applications (discussed further herein), where it is assumed that the incident signal from any point in the target scene impinges upon the aperture as a plane wave, the spatial position (translation) of a baseline within the aperture plane does not matter. Hence, from FIG. 2(a), the short baseline denoted with (d, d') maps to a purely horizontal spatial frequency, D, just as does baseline (a, a')→A. The spatial frequency representation of the baselines of FIG. 2(a) are shown in FIG. 2(b), where the spatial frequency associated with a given baseline is denoted using the same letter but in the uppercase. In addition, for every spatial frequency, there exists automatically the conjugate of that spatial frequency, corresponding to a measurement on the reversed direction of the baseline; thus for every spatial frequency shown in FIG. 2(b) there is also the conjugate shown (e.g. A*).

Figure 2D:
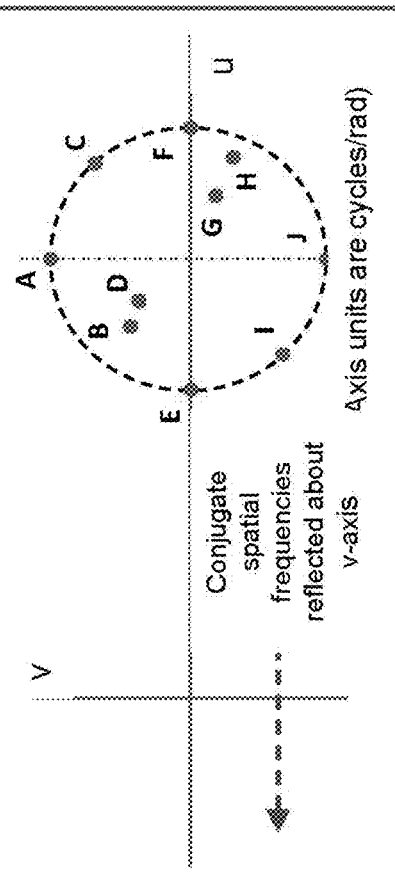
Figure 2A:
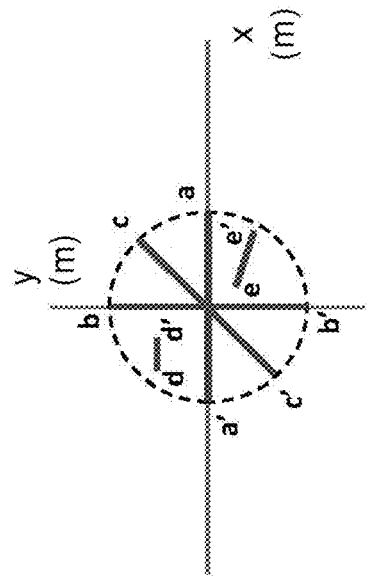
Figure 2C:
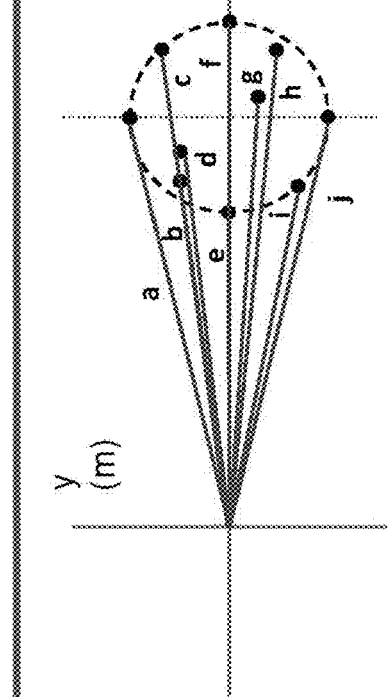

In contrast to a conventional aperture, a synthetic aperture produced under MXAS comprises an imaging system in which, as illustrated in FIG. 2(c), every participant (i.e., directly measured) baseline utilizes the exact same particular collection node (antenna element) as one endpoint, and this node happens to be spatially offset from all of the other baseline endpoints (other antenna element positions), all of which are themselves clustered into an area that resembles the conventional aperture.

Accordingly, the spatial frequencies measured by the offset configuration are as illustrated in FIG. 2(d); that is, highly similar (though non-identical) to the conventional case but for a constant spatial frequency offset. Also, the conjugate baselines appear reflected about the origin. Despite these differences, the MXAS research has shown, theoretically and experimentally, that for a wide variety of applications of interest, such a synthetic array achieves, within a known proportionality factor, the imaging performance of a real (physical) aperture of the same size.

The notion of an offset-spatial-frequency imaging system is relatively obscure. The real value of the offset imaging concept is in the exploitation of one additional fundamental property of imaging, namely that individual baselines can be collected in a temporally distributed (i.e., non-simultaneous) manner, providing that the target has a fixed intensity distribution over the collection time. This factor, combined with the preservation of imaging performance under an offset spatial frequency configuration, allows for the formation of arbitrarily large effective apertures, extended by motion in one or more dimensions.

FIG. 3 illustrates a representative prior art aperture: imaging of a strip of ground containing a single RF source, using a ten-element uniform linear antenna array. The process of imaging a point source combines together the outputs of all of the different two-element interferometers inherent in the 10-element array. In aperture synthesis terminology, these element pairs are called baselines and the correlation product formed from their respective collected data is termed a complex baseline; going forward, the term baseline is intended to convey both the physical baseline and the correlation product emerging from it. Based on the foregoing description, the fundamental challenge solved by MXAS regarding formation of a baseline between two arbitrary virtual nodes when they do not exist simultaneously in time.

For full generality, we consider the geometry of the problem as having a near-field nature; that is, involving non-plane-wave incidence, wherein energy from a given source point is incident upon distinct portions of the array in the form of non-parallel rays. The operation of focusing a single snapshot of data (a set of samples, one from each element) for the array onto a given pixel location $\bar{r}$ is given by:

$$Y(\bar{r}) = \left| \sum_{i=1}^{N_e} \tilde{a}_i(\bar{r}) \tilde{V}_i \right|^2 \qquad (1)$$

$$= \sum_{i=1}^{N_e} |\tilde{a}_i(\bar{r})|^2 |\tilde{V}_i|^2 + 2 \sum_{i=1}^{N_e-1} \sum_{j=1}^{N_e} R(\tilde{a}_i(\bar{r}) \tilde{a}_j^*(\bar{r}) \tilde{V}_i \tilde{V}_j)$$

where $Y(\bar{r})$ is the output power, the $\tilde{v}_i$'s are the voltage outputs from each antenna element, and the $\tilde{a}_i$ terms the steering terms—phase adjustments—that allow for coherent combination of the contributions of each element from a source at position $\bar{r}$. For a source signal defined as, $$\tilde{s}(t) = \tilde{s}_o(t) \exp(j\omega t), \qquad (2)$$

the quantities in (1) are given by:

$$\tilde{V}_i = \tilde{\gamma}_i \tilde{s}_o(kt_s - \tau_{a,i}(\bar{r}_o)) \exp(-j\omega \tau_{a,i}(\bar{r}_o)) \qquad (3)$$

and, $$\tilde{a}_i(\bar{r}) = \exp(j\omega \tau_{a,i}(\bar{r})), \qquad (4)$$

Where $\tilde{\gamma}_i$ is the complex voltage response of antenna element i, the delay term $\tau_{a,i}(\bar{r})$ is as defined in FIG. 3, and $kt_s$ is the time expressed in the form of an integer number of sampling intervals. The output of the array is the total power obtained from focusing onto position $\bar{r}$. As indicated, the first term on the right-hand-side is a sum of self-products of the element inputs; the second term on the right-hand-side is the sum of the cross-products of the weighted element inputs; as indicated by the double summation of eq. (1) there are N(N−1)/2 such cross-products. The explicit form of a cross-product between elements i and j is:

$$R(\tilde{a}_i(\bar{r}) \tilde{a}_j^*(\bar{r}) \tilde{V}_i \tilde{V}_j^*) = |\tilde{V}_i \tilde{V}_j^*| \cos\{\omega[\Delta \tau_{ij}(\bar{r}_o) - \Delta \tau_{ij}(\bar{r})]\}, \qquad (5)$$

where, $$\Delta \tau_{ij}(\bar{r}) = \tau_i(\bar{r}) - \tau_j(\bar{r}), \qquad (6)$$

and where we have made the assumption that the maximum delay of the envelope across the array is negligible compared to the envelope decorrelation length.

Although for a ten-element array there are forty-five (i.e., 10(10−1)/2) such baselines, there are only nine distinct pair-spacings, having multiple spatial locations which, for a near-field scenario, matters. Representative baselines for the distinct spacings are depicted in prior art FIG. 4 for the model one-source problem of FIG. 3. The sum of these, taking into account the multiplicity (and spatial translations) of each, leads to the image of the source, the PSF, which is the principal figure of merit of an imaging system. The PSF is shown in prior art FIG. 5.

Figure 6:
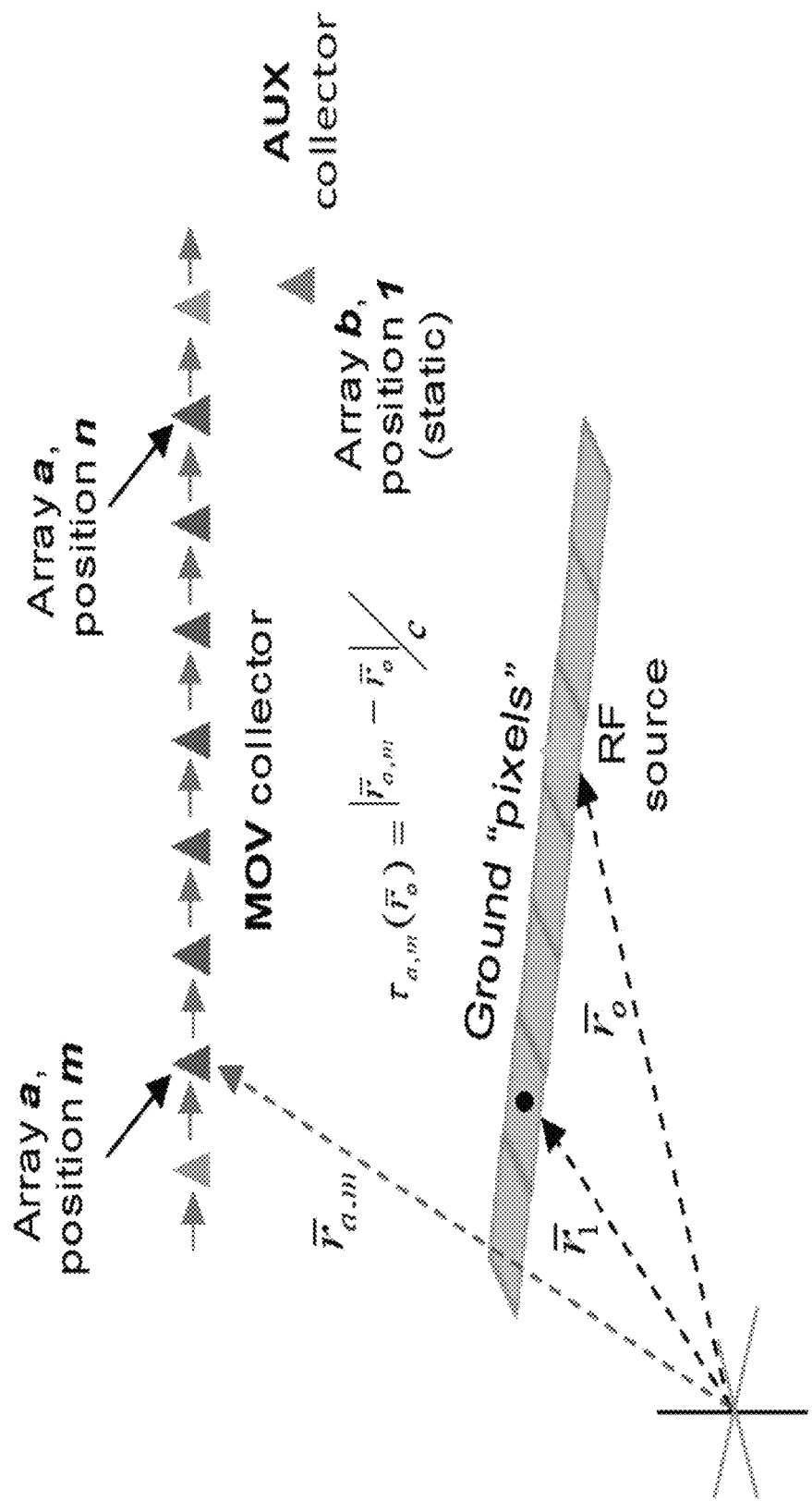
FIG. 6 is a variation of the model given in FIG. 3, constituting a model of a moving collector.

We now consider in FIG. 6 a variation of the model given in FIG. 3. Consider the sequential collection of a single sample of signal energy incident on each of a set of locations spaced $\lambda/2$ apart, and at times separated by some arbitrary sampling interval, $t_s$. This constitutes a model of a moving collector. We consider this array, a, to be created by a moving collector which for shorthand we term the MOV system.

For a real array, for simultaneously collected data, we would normally form, as we have seen, cross-products between the data for every pair of nodes. We cannot do that here, however, as the data from node to node is uncorrelated in the general case of an arbitrary signal environment. In the MXAS method we instead form "quasi-baselines" between each position's data and the temporally corresponding data from an additional collection antenna, which we term the Auxiliary collector, or the AUX element, located at some arbitrary position in space (static, for now). This correlation process is therefore $$Y(\bar{r}) = \sum_{l=1}^{N_e} \tilde{a}_l(\bar{r}) \tilde{b}_l^*(\bar{r}) \tilde{V}_a(l) \tilde{V}_b^*(l), \qquad (7)$$

where we recognize in (7) that the signal from the source at $\bar{r}_o$ at location m of array a is:

$$\tilde{V}_a(m) = \tilde{\gamma}_a \tilde{s}_o(kt_s - \tau_{a,m}(\bar{r}_o)) \exp(-j\omega \tau_{a,m}(\bar{r}_o)) \qquad (8)$$

and, similarly, for the b node, corresponding to the AUX element, and which in this example is fixed in space, we have:

$$\tilde{V}_b(l) = \tilde{\gamma}_b \tilde{s}_o(kt_s - \tau_b(\bar{r}_o)) \exp(-j\omega \tau_b(\bar{r}_o)) \qquad (9)$$

In the same manner in which focusing is achieved in real array beamforming, we apply steering terms $\tilde{a}_n(\bar{r})$ and $\tilde{b}_n(\bar{r})$, given by:

$$\tilde{a}_l(\bar{r}) = \exp(j\omega \tau_{a,l}(\bar{r})) \text{ and } \tilde{b}_l(\bar{r}) = \exp(j\omega \tau_b(\bar{r})) \qquad (10)$$

As noted, we call the terms inside the summation in eq. (7) "quasi-baselines". Our interest is in pairs of these quasi-baselines, for the purpose of discerning the intra-array baselines of interest (e.g. $\bar{r}_{a,n} - \bar{r}_{a,m}$). For this, we look at a portion of the summation process of eq. (7) which contains contributions from nodes m and n in array a:

$$Y(\bar{r}) = \ldots + \tilde{s}_o(kt_s - \tau_{a,m}(\bar{r}_o)) \tilde{s}_o^*(kt_x - \tau_b(\bar{r}_o)) \times \qquad (11)$$

$$\exp\{-j\omega[\tau_{a,m}(\bar{r}_o) - \tau_{a,m}(\bar{r})]\} \exp\{-j\omega[\tau_b(\bar{r}) - \tau_b(\bar{r}_o)]\} +$$

$$\ldots + \tilde{s}_o[(k+K)t_s - \tau_{a,n}(\bar{r}_o)] \tilde{s}_o^*[(k+K)t_s - \tau_b(\bar{r}_o)] \times \exp$$

$$\{-j\omega[\tau_{a,n}(\bar{r}_o) - \tau_{a,n}(\bar{r})]\} \exp\{-j\omega[\tau_b(\bar{r}) - \tau_b(\bar{r}_o)]\} + \ldots$$

At this point, we make two assumptions:

$$\tilde{s}_o(nt_s - \tau_{a,m}(\bar{r}_o)) \cong \tilde{s}_o(nt_s - \tau_b(\bar{r}_o)), \quad (12)$$

which says that the differential delay between any position of the MOV and AUX elements, relative to the source, is a small fraction of the reciprocal bandwidth (BW) of the signal of interest (i.e. a fraction of a "symbol"), presuming that a time registration adjustment between MOV and AUX datasets that most closely aligns them has also been imparted. The second assumption, $$|\tilde{s}_o(kt_s - \tau_{a,m}(\bar{r}_o))|^2 \cong |\tilde{s}_o[(k+K)t_s - \tau_{a,m}(\bar{r}_o)]|^2, \quad (13)$$

requires that the signal power is approximately equal at two different moments in time. Thus, significant amplitude modulation occurring at time scales long compared to the collection duration of a single element would be expected to degrade the result.

Under these assumptions, we may re-write eq. (11) as:

$$Y(\bar{r}) \cong \ldots + |\tilde{s}_o(kt_s - \tau_{a,m}(\bar{r}_o))|^2 \exp\{-j\omega[\tau_{a,m}(\bar{r}_o) - \tau_{a,m}(\bar{r})]\} \times \quad (14)$$

$$\exp\{-j\omega[\tau_b(\bar{r}) - \tau_b(\bar{r}_o)]\} + \ldots + |\tilde{s}_o(kt_s - \tau_{a,m}(\bar{r}_o))|^2 \exp$$

$$\{-j\omega[\tau_{a,n}(\bar{r}_o) - \tau_{a,n}(\bar{r})]\} \times \exp\{-j\omega[\tau_b(\bar{r}) - \tau_b(\bar{r}_o)]\} + \ldots$$

Figure 7:
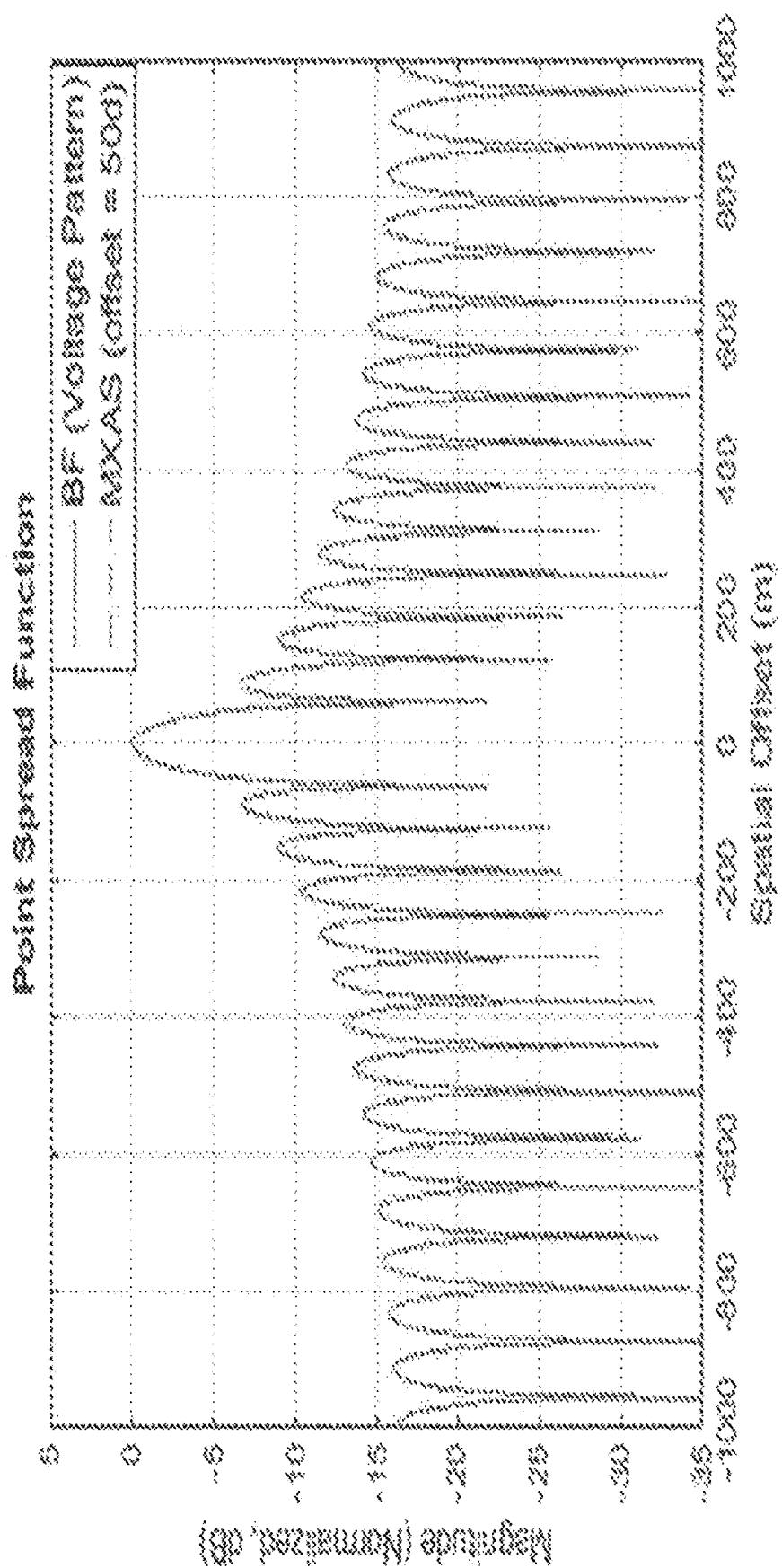
FIG. 7 depicts simulation results showcasing the equivalence between an MXAS process and the voltage pattern for an equivalent digital beamforming array in accordance with one or more embodiments described herein.

If we now take the magnitude of (14), (which for a complex quantity $$\hat{z}s|\hat{z}| = \sqrt{\hat{z}\hat{z}^*}\ )$$

we get:

$$|Y(\bar{r})| \cong \{ \ldots + |\tilde{s}_o(kt_s - \tau_{a,m}(\bar{r}_o))|^4 [\exp\{-j\omega[\tau_{a,m}(\bar{r}_o) - \tau_{a,n}(\bar{r}_o)]\} \times \exp\{j\omega[\tau_{a,m}(\bar{r}) - \tau_{a,n}(\bar{r})]\} + C.C.] + \ldots \}^{1/2} \quad (15)$$

which we may re-write as:

$$|Y(\bar{r})| \cong \quad (16)$$

$$\{ \ldots + |\tilde{s}_o(kt_s - \tau_{a,m}(\bar{r}_o))|^4, \times \cos\{\omega[\Delta\tau_{a,mn}(\bar{r}_o) - \Delta\tau_{a,mn}(\bar{r})]\} + \ldots \}^{1/2}$$

in which expression we recognize, in comparison to eq. (5), the desired baseline between nodes m and n, for the virtual array, a. Notably, the baseline for m-n in eq. (15) is the square root of that which applies for a real array. In fact, the operation producing the m-n baseline produces all of the same terms as in the beamforming example, including the self-products. The effective antenna beam, therefore, for a virtual array formed by passive MXAS has a square root relationship to the beam for a corresponding real array. While squaring the result would restore the equivalence, note that eq. (15) is already in units of power; squaring the result gives the fourth-order statistic and causes significant noise development and expansion of the dynamic range exhibited by the signal environment. FIG. 7 depicts simulation results showcasing the equivalence between an MXAS process and the "voltage" pattern for an equivalent digital beamforming array.

The foregoing analysis is predicated upon a perfectly static AUX element (collector bin this treatment). For many applications, such a condition would be impossible to achieve. A moving AUX does not, however, preclude formation of a virtual array. It may be shown that in such a case the result becomes:

$$|Y(\bar{r})| \cong \{ \ldots + |\tilde{s}_o(kt_s - \tau_{a,m}(\bar{r}_o))|^4 \times \cos\{\omega[\Delta\tau_{a,mn}(\bar{r}_o) - \Delta\tau_{a,mn}(\bar{r})) - (\Delta\tau_{b,mn}(\bar{r}_o) - \Delta\tau_{b,mn}(\bar{r}))]\} + \ldots \}^{1/2}. \quad (17)$$

The interpretation of eq. (17) is that the movement of the AUX collector reduces the effective length of every baseline. In the limit, where the AUX is moving at the exact rate as the MOV element, the baselines that result are consistent with the pairs of physical nodes existing only within the MOV element (e.g., a 1-D array); that is, there is no motion-extended aperture synthesis enabled. From this we infer that motion extended aperture synthesis is not possible using a single platform. The one exception to this is for target signals that are stable tones. In this case, the exact behavior of the signal, for a hypothesized source location, can be specified, in a relative sense, at every point in time and space.

The foregoing treatment has been, for the sake of clarity, based on a single sample at each virtual node. For an arbitrary number of samples, $N_{sx}$, at each node, we may re-write eq. (7) as, $$\tilde{Z}(\bar{r}) = |\tilde{Y}(\bar{r})| = \left| \sum_{n=1}^{N_e} \sum_{j=1}^{N_{sx}} \tilde{a}_n(\bar{r}) \tilde{b}_n^*(\bar{r}) \tilde{V}_{a,n}(j) \tilde{V}_{b,n}^*(j) \right| \quad (18)$$

At this junction, it is useful to consider Ne as the number of position intervals, which makes it applicable for even a non-static AUX element. For solution of all Np potential target locations ("pixels") over the area of interest (AOI), each described by some vector $\bar{f}$, we may render eq. (18) in the form of a matrix equation:

$$\underset{(N_p \times 1)}{\bar{Z}} = (|(\bar{A}_{ab}\bar{X})_i|), \quad (19)$$

in which context the notation shown is intended to denote element-wise absolute value of the vector; and where:

$$\underset{(N_p \times N_e)}{\bar{A}_{ab}} = \bar{A}_a \circ \bar{A}_b^*, \quad (20)$$

where O denotes the Hadamard product; that is, element-by-element multiplication, and, $$\overline{A}_q_{\substack{q\in\{a,b\}\\(N_p\times N_e)}} = \begin{bmatrix} \tilde{q}_{1,1} & \cdots & \tilde{q}_{1,N_e} \\ \vdots & \ddots & \vdots \\ \tilde{q}_{N_p,1} & \cdots & \tilde{q}_{N_p,N_e} \end{bmatrix} \quad (21)$$

in which the rows provide the steering vectors for the Ne position intervals to every pixel (of which there are $N_p$) in the AOI; and, $$\overline{X}_{(N_e\times 1)} = \overline{X}_M \overline{I}_1, \quad (22)$$

where, $$\overline{X}_M_{(N_e\times N_{sx})} = \overline{V}_a \circ \overline{V}_b^*, \quad (23)$$

$$\overline{V}_q_{\substack{q\in\{a,b\}}} = \begin{bmatrix} \tilde{V}_{q,1}(1) & \cdots & \tilde{V}_{q,1}(N_{sx}) \\ \vdots & \ddots & \vdots \\ \tilde{V}_{q,N_e}(1) & \cdots & \tilde{V}_{q,N_e}(N_{sx}) \end{bmatrix}, \quad (24)$$

$$\overline{I}_1_{(N_{sx}\times 1)} = [1\ 1\ \cdots\ 1]^T, \quad (25)$$

in which the identity vector $I_1$ performs a summing function over the sample products for a given interval position of the MOV and AUX for all $N_{sx}$ samples. Thus, in eq. (19), $\overline{X}$ is a vector of the second-order-statistic (SOS) associated with each co-array element of the offset imaging system that is effectively engendered between the MOV and AUX collection systems. The elements of the vector may therefore be considered the "baseline response" or "complex visibilities" associated with that system.

The rows of $\overline{A}_{ab}$ in eq. (19) can be thought of as the weight vector that is applied to the baseline responses for the purpose of maximizing directivity in the direction of a given pixel. These weights are given, as seen in eqs. (20)-(21), by the conjugate Hadamard product of the steering vector between, on the one hand, each (virtual) node of the motion-extended virtual array and, on the other hand, the (corresponding, in time) AUX node, which is in general spatially offset from the MOV nodes. Thus eq. (19) can be seen as accomplishing simultaneous focusing, via appropriate weights, of the imaging system onto each target scene pixel.

An alternative but equally valid viewpoint is that the columns of $\overline{A}_{ab}$ represent the spatial basis functions that the imaging system casts onto the target scene (and to which the imaging system is therefore also sensitive) and eq. (19) amounts to image formation through multiplication of the baseline response by the corresponding basis function. For a far-field scenario (which condition is not a requirement for application of the concept), the basis functions, as mentioned, are sinusoidal and the operation in eq. (19) is a Fourier transform of the baseline responses, contained in $\overline{X}$.

Under the first interpretation, however, of a weight matrix for focusing, we can exploit the similarity in form of eq. (19) to the beamforming model for a voltage array manifold vector (in contrast to the present power co-array manifold vector which is) $\overline{X}$ to synthesize an antenna pattern. In doing so, we have the degrees of freedom equal to the length of the co-array, which can be significant given the motion-extended nature of the imaging system. Thus we may apply complex weighting to the $N_e$ baselines to accomplish array-centric operations ranging from sidelobe control (tapering) to interference mitigation in the form of null-steering to multiple/many directions simultaneously. The latter is accomplished using standard beamforming methods which are known to this skilled in the art. In the present case, the constraint matrix for steering $N_e$ nulls to locations $\overline{r}_i$; i=1: $N_c$, is given by:

$$\overline{C}_{(N_p\times N_e)} = \left[\overline{a}(\overline{r}_1)\circ\overline{b}^*(\overline{r}_1)\ \overline{a}(\overline{r}_2)\circ\overline{b}^*(\overline{r}_2)\ \cdots\ \overline{a}(\overline{r}_{N_c})\circ\overline{b}^*(\overline{r}_{N_c})\right], \quad (26)$$

where the notation $\overline{a}(\overline{r}_i)$ and $\overline{b}(\overline{r}_i)$ denote steering vectors from all $N_e$ of the MOV and AUX system virtual node positions (which may be the same position in the case of a static AUX), respectively, to target scene pixel position $\overline{r}_i$. The constraint matrix $\overline{C}$ is used to modify the SOS response weight matrix as:

$$\overline{A}'_{ab}_{(N_p\times N_e)} = \overline{A}_{ab} - \left(\overline{A}_{ab}\overline{C}[\overline{C}^H\overline{C}]^{-1}\overline{C}^*\right). \quad (27)$$

Figure 8A:
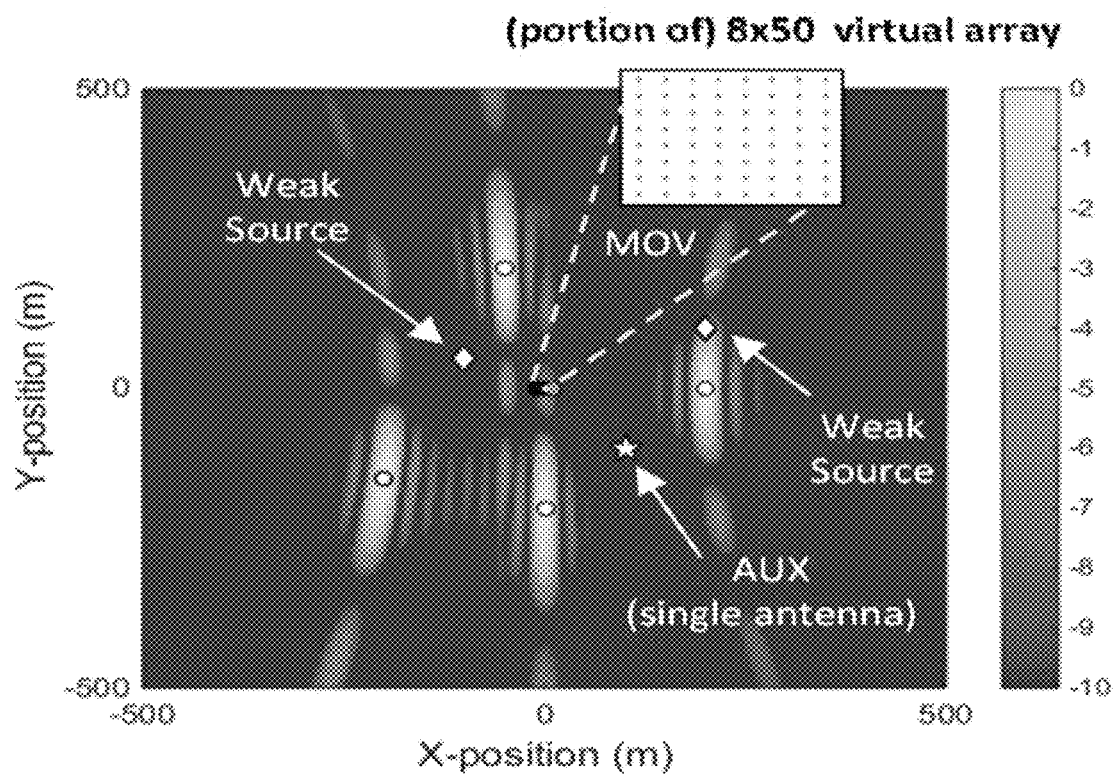
FIGS. 8a and 8b show simulation results in which interference mitigation measures are employed in MXAS processing to image multiple sources, strong and weak, in accordance with one or more embodiments described herein.
Figure 8B:
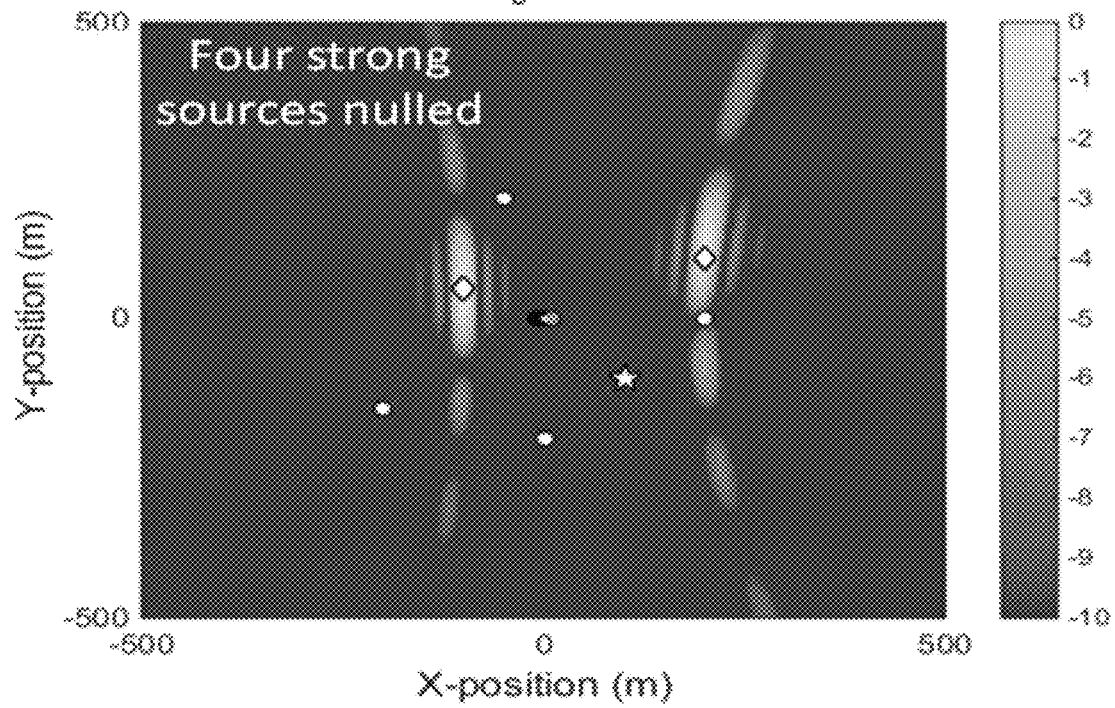

FIGS. 8a and 8b shows simulation results in which these interference mitigation measures are employed in MXAS processing. In this simulation, the virtual array is an 8×50 array; the processing employs discrete steps; that is an 8×1 array (the MOV element) is advanced half-wavelength spatial increments and at each step, ten milliseconds of data collected. The scene imaged is 1 km×1 km; the frequency is 400 MHz; the array altitude is a 500 meters. There are six sources shown; the sources are all highly correlated as with a multi path scenario; four are strong sources having SNR that is 25 dB higher than the two weak sources (FIG. 8a). The waveform is GMSK with a 5-kHz bandwidth. As shown, before the nulling is applied, the two weak sources are undetectable; following nulling they become visible (FIG. 8b). The AUX element, a single collection node, is static can be seen as a yellow star in the middle of the image, just below the MOV array; the AUX element is at the same altitude as the MOV array.

The SOS approach to array processing has recently been shown to be highly advantageous in real array processing, specifically for highly sparse arrays. In this case, the SOS response matrix is the Khatri-Rao product of the voltage-based array manifold (instead of the Hadamard product used here), and the input SOS source vector is the vec of the array covariance matrix. In these treatments, it has been proven that not only does the SOS approach afford a greater number of degrees of freedom (DOF), but, importantly, all of the DOF can be accessed with a sparse array having the same co-array as its corresponding fully-populated array; that is, the same array functionality is available with a fraction of the physical elements.

The clear difference in these approaches relative to the MXAS approach just outlined is that they are executed on signal data that is simultaneously collected across the elements of a real (albeit sparse) array; in contrast, for MXAS not only are the correlations temporally distributed, which allows for arbitrarily large motion-extended virtual arrays, but these correlations apply to quasi-baselines (between the MOV and AUX nodes) which may be widely separated in space.

The MXAS method as described so far allocates quantities ($N_{sx}$) of data to virtual nodes located at fixed positions in space, appropriate for a discrete-motion (step-wise) behavior of the MOV collector. As this is evidently a contrived scenario, the question is whether and how such methods can be applied to data collected by a realistically (continuously) moving collector.

Figure 9:
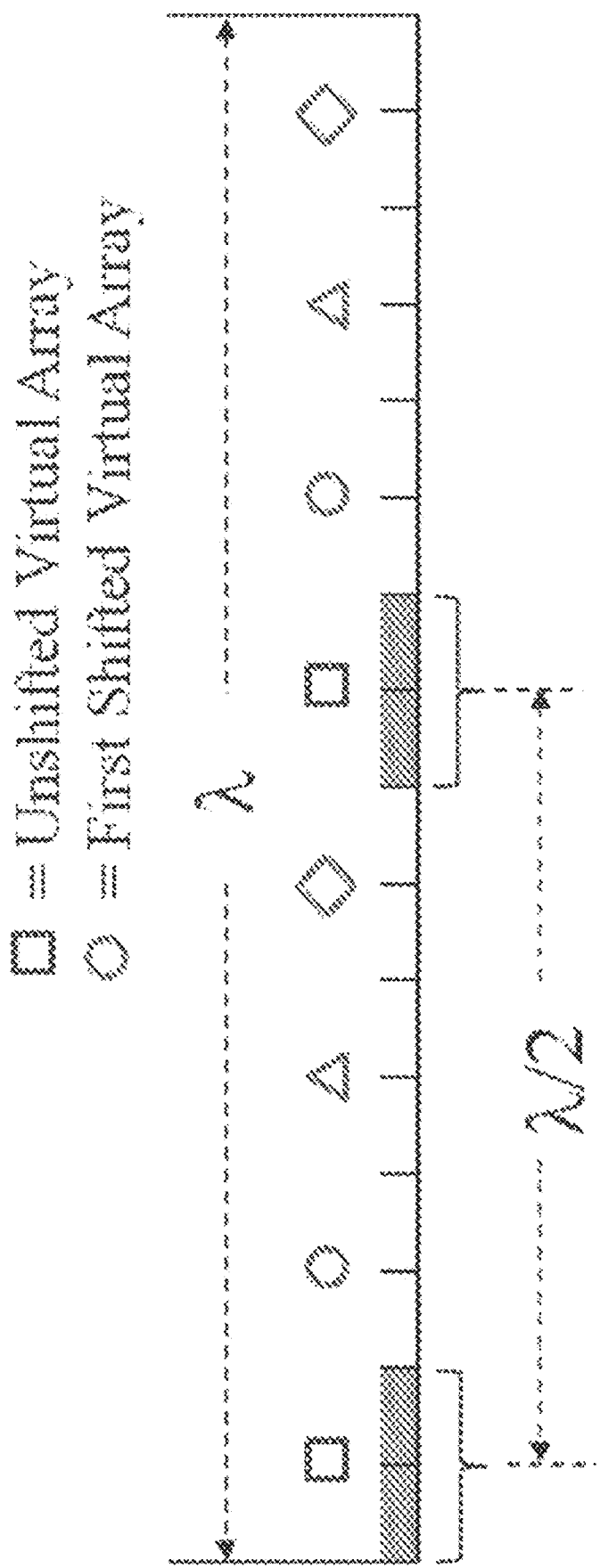
FIG. 9 is a schematic of the continuous-motion MXAS algorithm using a differential shift matrix in accordance with one or more embodiments described herein.

To this end we have developed a continuous-motion MXAS algorithm. The algorithm computes the SOS response matrix $\overline{A}_{ab}$ given in eq. (20) for the nominal array spanning the collector path, and then efficiently interpolates this matrix at small spatial increments—on the order of $\lambda/32$—using a differential shift matrix. The concept is illustrated in FIG. 9.

The algorithm proceeds as follows. A nominal virtual array manifold $\overline{A}_{ab}$ is created as for the discrete-movement case discussed in eq. (20); the rows of $\overline{A}_{ab}$ provide the steering vectors for the $N_e$ position intervals to every pixel (of which there are $N_p$) in the AOI. Assembly of $\overline{A}_{ab}$ requires computation of distance from each of the $N_e$ position intervals to all of the $N_p$ pixels. For the continuous motion case, this is done for a nominal virtual array, with $\lambda/2$—spaced elements, spanning the swept out area. The distance matrix computed is $\overline{D}_{UVA}$, termed the unshifted virtual array (UVA) distance matrix; from which the nominal array manifold is computed as $$\overline{A}_{ab}=\exp[j\omega(\overline{D}_{UVA}-\overline{D}_{AUX})] \quad (28)$$

Where $\overline{D}_{AUX}$ is the distance from the AUX element to the $N_p$ pixels, which we assume stationary (when it is not, it is treated in the same manner as we now describe for the MOV).

Next, the distance matrix computation is done for a virtual array shifted W/M from the UVA, in the along-track direction, which result we term $\overline{D}_{FSVA}$ corresponding to the first shifted virtual array (FSVA). The offset distance $\lambda/M$ computed based on geometry-dependent maximum phase error criteria (e.g. $\pi/5$ rad). We compute then a differential shift matrix, $\overline{D}_{SM}=\overline{D}_{FSVA}-\overline{D}_{UVA}$. Then the manifold appropriate for each shifted array can be computed simply by $$\overline{A}_{ab,m}=\overline{A}_{ab}\circ \exp[j\omega(m-1)\overline{D}_{SM}]. \quad (29)$$

The multiple manifolds thus computed are then interleaved into a single matrix to $\overline{A}_{ab,T}$ to permit formation of a direct matrix product with the time-ordered correlation products ("visibilities") $\overline{X}$ (as in eq. (19)) between the MOV and AUX datasets, which data has been parsed in time based on the MOV system motion, for correspondence with small spatial areas straddling each virtual element.

The algorithm is implemented as an online algorithm, meaning that it can serially process blocks of sequential data instead of one large matrix operation after all of the data is collected. The interference mitigation methods shown in eqs. (26)-(27) remain available for use.

Figure 10:
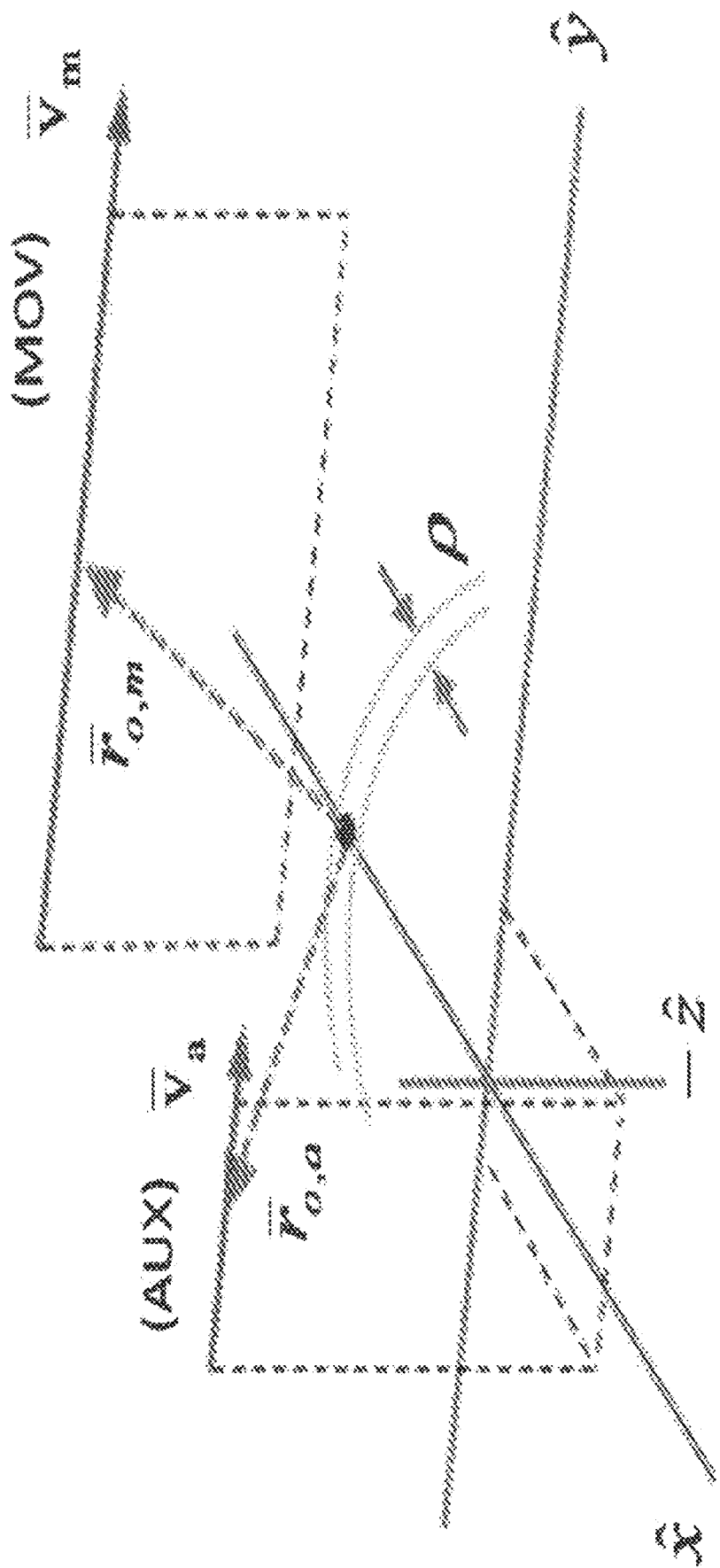
FIG. 10 shows a scenario in which two moving nodes (AUX and MOV), single antenna elements in this case, both moving, though at different rates, have considerable angular separation relative to the scene being imaged.

FIG. 10 shows a scenario in which the AUX and MOV systems, single antenna elements in this case, both moving, though at different rates, have considerable angular separation relative to the scene being imaged.

In this case, for a given applied time offset value, $\tau$, between the as-received AUX and MOV data streams, there is, as indicated in FIG. 10, a geometry-dependent locus of ground points (here, the xy-plane) for which $\tau$ provides approximate registration of the AUX and MOV complex envelope data, respectively, assuming emission from a "pixel" within the locus.

For emissions occurring outside of this locus, the signal envelope data is decorrelated between the AUX and MOV data streams (aligned as they are with time offset value $\tau$) and successful imaging is not enabled.

The spatial decorrelation distance on the ground, and therefore effective width of the locus, is given by the approximate expression, $$\rho \cong \frac{(c/B)}{-\hat{z}\times[\hat{z}\times(\hat{r}_{o,a}-\hat{r}_{o,m})]}, \quad (30)$$

where c is the speed of light, B is the signal bandwidth, and the unit vectors, $\hat{r}_{o,a}$ and $\hat{r}_{o,m}$, as indicated in FIG. 10, are directed from a pixel in the spatial locus, to the AUX and MOV nodes (or their trajectory mid-points) respectively. From this we can see that, dependent on angular separation and signal bandwidth, offset imaging can afford 2-D resolution, even with single antenna AUX and MOV system elements. The derivation of equation (30) is shown in the Appendix to EXHIBITS A and B from the U.S. Provisional Patent Application Ser. No. 62/410,495 to which this case claims benefit, where it is also shown to describe the interrelationship between array parameters (length, position, and attitude), signal bandwidth, and fringe-washing-limited IFOV.

Figure 11:
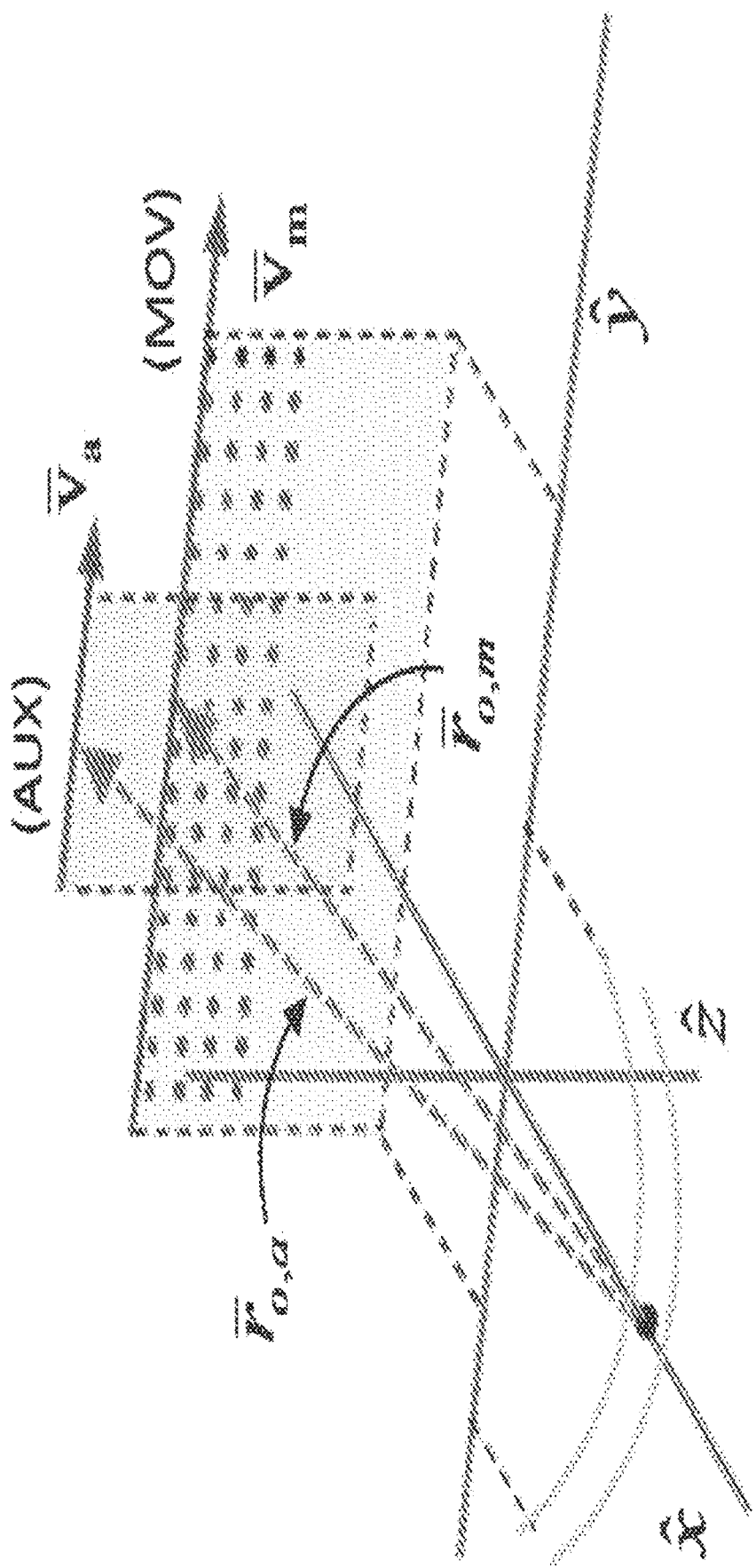
FIG. 11 shows a scenario for nearly co-located AUX and MOV nodes.

On the other hand, for nearly co-located AUX and MOV nodes, as depicted in FIG. 11, the decorrelation effect just described does not provide for cross-range resolution, since, from (30), the unit vectors are nearly co-linear and thus p very large.

In this case, however, a 2-D virtual array, enabled by the MOV element consisting of a 1-D linear array in a direction orthogonal to the motion, can provide 2-D imaging capability which, depending on the circumstances, might exceed what would be available from a high-angular separation configuration. This will be particularly true for case of very small (or zero) signal bandwidth, to which condition the 2-D virtual array is completely insensitive, but for which the high-angular separation effect affords little or no cross-range resolution.

Figure 12:
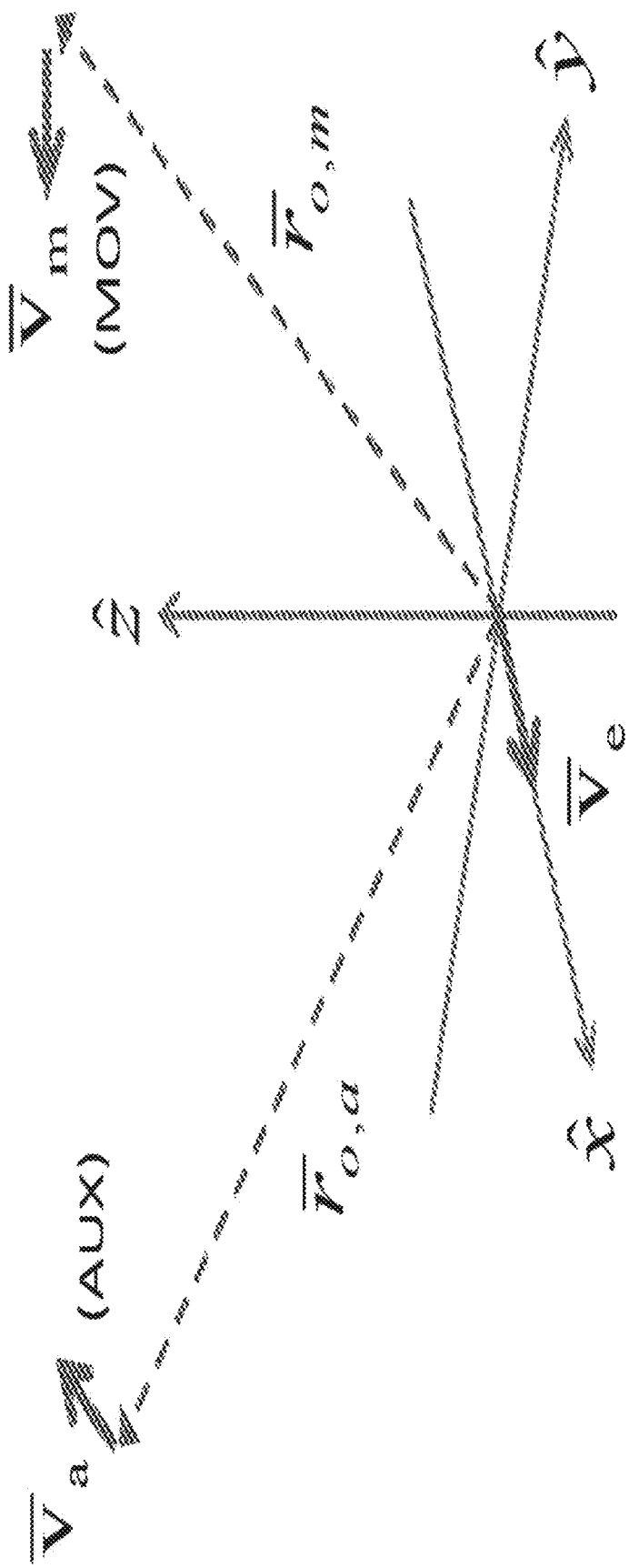
FIG. 12 is a schematic of a high-angular separation scenario in accordance with one or more embodiments described herein.

In the high-angular separation scenario, the associated image processing must necessarily accommodate the rate of differential phase variation of the waveform from a given pixel incident onto the AUX and MOV elements, respectively, as a function of time. The rate of differential phase variation may be expressed as a differential Doppler frequency term, taking the form $$\Delta f_d = \left(\frac{1}{\lambda}\right)[(\overline{v}_a\cdot\hat{r}_{o,a})-(\overline{v}_b\cdot\hat{r}_{o,b})] \quad (31)$$

where, as depicted in FIG. 12, $\overline{v}_a$ and $\overline{v}_m$ are the velocity vectors for the AUX and MOV elements and, as before, $\hat{r}_{o,a}$ and $\hat{r}_{o,m}$ are the unit vectors from a source (emitter) to the AUX and MOV elements.

Accommodation of this phase variation is readily achieved in the image formation process, using methods such as are outlined above, albeit with additional measures to handle the cross-range resolution (signal decorrelation) effect just described herein. Unknown emitter motion, however, creates significant degradation of the resultant image. When an emitter is moving with velocity $\overline{v}_e$ as shown in FIG. 12, the actual rate of differential phase variation experienced by the two collecting elements due to the waveform from the moving emitter becomes, $$\Delta f_d'=\Delta f_d+(1/\lambda)[(\overline{v}_e\cdot\hat{r}_{o,a})-(\overline{v}_e\cdot\hat{r}_{o,m})]=\Delta f_d+(\overline{v}_e/\lambda)\cdot[\hat{r}_{o,a}-\hat{r}_{o,m}]. \quad (32)$$

As the second term on the right-hand side of eq. (32) is not compensated for in the image formation process—and could easily exceed in magnitude the first term—the representation of the emitter in the image can incur major distortions to include both defocusing and large displacement within (or even out of) the resultant image. In the case where the AUX and MOV systems are approximately co-located, however, the unit vectors from the emitter to the AUX and to the MOV systems are nearly parallel, in which case from eq. (32), $\Delta f_d' \cong \Delta f_d$, with the result that the image distortion introduced by the moving emitter is limited to smearing due to actual migration through resolution cells during the imaging data-collection interval, in exactly the same fashion as would occur for imaging by a real array.

The performance of the MXAS method has been tested against the industry standard technique used for DF (and geolocation): Time Difference of Arrival (TDOA)/Frequency Difference of Arrival (FDOA) method. In this approach, data collection by two separate platforms is compared for Time-of-Arrival (TOA) and Frequency-of-Arrival (FOA). For pulse signals, it is possible to compare these parameters determined independently (through pulse parameterization) at each platform (thereby easing greatly requirements for data transmission bandwidth between the platforms). For non-pulsed signals however, the observables of TDOA (especially) and FDOA are determined using cross ambiguity function processing, which requires the full signal data obtained for some snapshot length at each platform.

One advantage of the TDOA/FDOA approach relative to MXAS is that it does not require the stringent precision in time and frequency synchronization nor high phase stability between platform local oscillators as does MXAS. This difference stems from the fact that TDOA/FDOA is concerned with correlation of the signal complex envelope, as it is manifest at the two collectors, whereas MXAS exploits RF carrier variation between the two signal sets.

To enable the clearest comparison between the two methods, we utilize a data-driven approach. Such an approach eliminates the possibility of misinterpretation (or misapplication) of existing analytical models. Analytical models do exist as respects performance bounds of the TDOA/FDOA method. The prior art formulates expressions for the Cramer-Rao Lower Bound (CRLB) for TDOA and FDOA estimation as a function of SNR, BW, and collection time. For TDOA, the standard deviation of the error in a measurement is given by the following approximate expression:

$$\sigma_{TDOA} \approx \frac{0.55}{B_S \sqrt{BT\gamma}} (sec) \quad (33)$$

where $B_s$ is the signal bandwidth, B the receiver noise bandwidth, T is the time interval of the data utilized in the calculation, and $\gamma$ the effective (instantaneous) signal SNR, measured in BW B. Similarly, for the FDOA measurement error:

$$\sigma_{FDOA} \approx \frac{0.55}{T\sqrt{BT\gamma}} (Hz) \quad (34)$$

These expressions however do not directly inform the question of DF and geolocation accuracy; these latter metrics are obtained by examining the (variance in) intersection of constant time contours (isochrones) and constant Doppler contours (isodops) that are constructed from TDOA and FDOA observables, respectively. The precision in azimuth and range estimates of the resultant geolocation is strongly dependent on the geometry of the collection scenario. As these are the very metrics of interest for comparison with the MXAS method outputs, we thus take a data-driven approach to the performance comparison.

Figure 13:
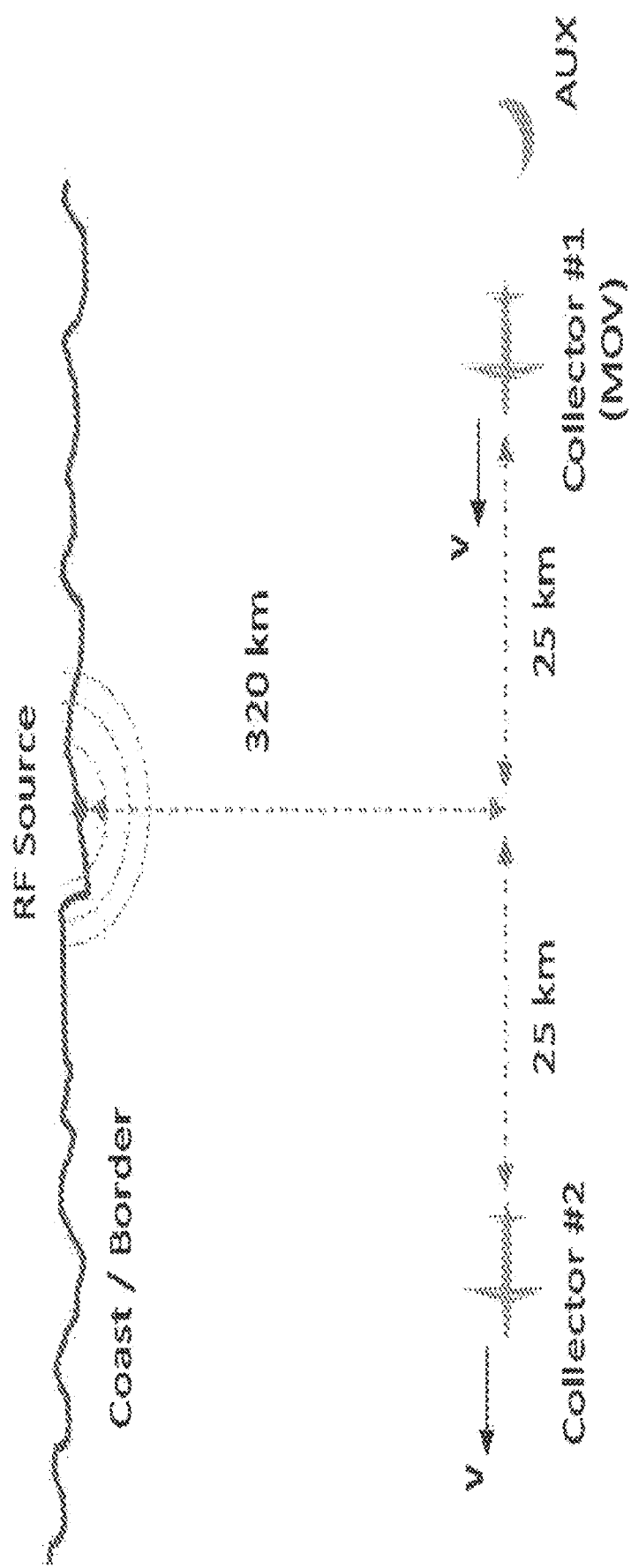
FIG. 13 illustrates a "stand-off" DF application collection scenario.

The collection scenario we choose as the basis for comparison is a "stand-off" DF application, illustrated in FIG. 13. Table 1 shows the relevant parameters, for both MXAS and FDOA/TDOA. Note that although both methods utilize two platforms, the positions of the two differ between the methods.

TABLE 1

| Scenario Parameter | Symbol | Value |
|---|---|---|
| Nominal Range | $R_0$ | 320 km (200 mi) |
| Platform Velocity | v | 156 m/s (350 mph) |
| Platform Separation* | d | 50 km |
| Integration time | t | 250 ms |
| Total Collection Interval | T | 10 sec |
| Signal Center Frequency | f | 500 MHz |
| Signal Bandwidth | B | 20 kHz |
| Signal Instantaneous SNR | g | −10 dB |

*Applies only to TDOA/FDOA; for MXAS location of 2nd platform (AUX) is arbitrary and can even be static.

For TDOA/FDOA, the two collectors are 50-km apart, whereas for MXAS, the second collector (the AUX) is near the starting point of the collection, as if it were a pod or a drone ejected from the main, moving platform. The digital signal data is realistically propagated using an arbitrary resampler. To determine the DF uncertainty with MXAS, 200 independent trials are conducted for each of eight durations ranging from 50 ms to the full 10 seconds.

For TDOA/FDOA, 200 trials are conducted for a snapshot length of 250 ms. In each case, a CAF is created from the data sets from the two collectors and the peak TDOA and FDOA values determined. Subsample interpolation is employed to enables fine determination of the observables.

For collector positions symmetric about the origin on the x-axis, as in this scenario, the isochrone is determined based on the TDOA estimate using:

$$\frac{4x^2}{\tau^2 c^2} - \frac{4y^2}{d^2 - \tau^2 c^2} = 1. \quad (35)$$

The starting point for computing the isodop for a given FDOA estimate is the definition of a Doppler frequency:

$$f_d = \frac{f|\vec{v}|\cos\theta}{c}, (Hz) \quad (36)$$

where $\theta$ is the angle between the collector velocity vector $\vec{v}$ and the line connecting the collector and the target source. To generate the isodop, for each angle $\theta_1$ measured from the first collector, we calculate $f_{d1}(\theta_1)$. We then determine the corresponding angle of incidence, $\theta_2$ upon the second collector by enforcing, $$f_{d2}(\theta_1, FDOA_i) = FDOA_i - f_{d1}(\theta_1), \quad (37)$$

where $FDOA_i$ is the FDOA estimate for trial i, and therefore, $$\theta_2 = \cos^{-1}\left[\frac{f_{d2}(\theta_1, FDOA_i)c}{|\vec{v}|f}\right]. \quad (38)$$

The intersection of the two lines extending from collectors #1 and #2 at relative angles $\theta_1$ and $\theta_2$ marks a point on the isodop. The intersection between the isodop and the isochrones marks the geolocation estimate for trial i.

Figure 14:
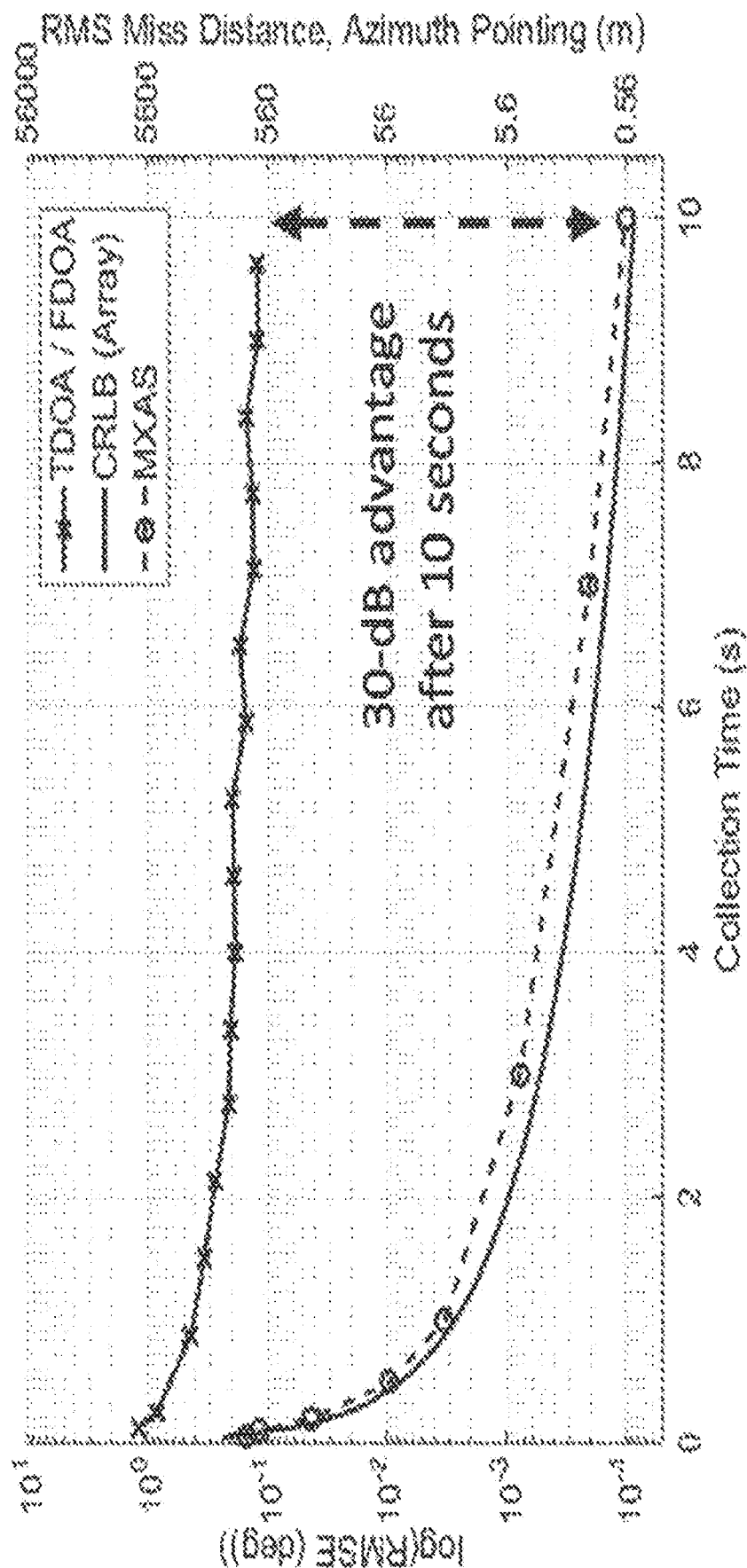
FIG. 14 shows the result of the Monte Carlo comparison between the MXAS and TDOA/FDOA methods for the scenario of FIG. 13.

FIG. 14 shows the result of the Monte Carlo comparison between the MXAS and TDOA/FDOA methods. For each method, all of the data over ten seconds is employed. In the ten seconds which constitute the time interval for comparison, the collectors (with the exception of the static AUX in MXAS) travel 1560 meters, which distance subtends an angle of less than 0.3 degrees relative to the target. This minimal angular diversity removes the need to independently compute the TDOA/FDOA geolocation uncertainty (i.e., 200 trials) for each adjacent 250 ms snapshot; it can be asserted with confidence that the statistical result computed for one position is entirely representative of the other positions. Nor will this small amount of angular diversity (over ten seconds) act to improve in a geometric fashion the geolocation uncertainty when results from adjacent snapshot processing are combined. It is expected, however, that the uncertainty is reduced by non-coherent addition of independent estimates. Instead of just assuming the nature of this effect, in the Monte Carlo testing we explicitly calculate the reduced uncertainty that is achieved by averaging estimates with all preceding snapshot windows. In particular, it is assumed that adjacent (250 ms) snapshots used for CAF processing could overlap each other by 50%, leading to the use of 80 (i.e., the number of 50% overlapping 250-ms windows in ten seconds) independent windows. The results in FIG. 14 shows the expected result, namely that the uncertainty (RMSE) in DF estimate decreases as the square root of the number of independent observations. Thus over 10 seconds, the DF precision improves by about 9.5 dB or 5 log (2T/τ), where T is the total duration and t the snapshot duration (250 ms).

For MXAS, the collector travel distance (1560 m) is also the length of the virtual array. We note that, under this scenario of range and BW, an IFOV of 60 degrees can be maintained for an array length of up to 15 km without violating the decorrelation (fringe washing) constraint.

Also shown for comparison in FIG. 14 is an adapted form of the expression for the CRLB for DF performance for a uniform linear array, in which the fixed quantities of the linear array have been substituted in the expression with time-dependent versions that reflect the MXAS process. The unmodified CRLB formula, derived is, $$\sigma_{DF}^2 \geq \frac{12}{(2\pi)^2 M\gamma \frac{M+1}{M-1}\left(\frac{L}{\lambda}\right)^2 \sin^2\varphi}, \quad (39)$$

where M is the number of elements at spacing $d=\lambda/2$, L is the total array length, $\gamma$ is the element-level SNR, and $\varphi$ is the bearing (DF) angle relative to the array baseline. For appropriate application to MXAS, we consider a time-dependent array length $L(t)=vt$ and number of (virtual) elements $M(t)=L(t)/(\lambda/2)+1$, and the effective ujoutput $SNR1\eta_{\it{eff}}=M(t)\gamma$, as for a real array. While eq. (39) is derived only for a single snapshot, the prior art show that the CRLB is inversely proportional to the number of snapshots K(t), which for MXAS we define as $K(t)=Bt/M(t)$, the average number of samples per virtual node. With these modifications applied to eq. (39), we form the expression for the bearing uncertainty, $$\sigma_{DF,MXAS}(t) \geq \frac{k\beta(t)}{\sqrt{K(t)M(t)\gamma}} = \frac{k(\lambda/L(t))}{\sqrt{Bt}\,\gamma} = \frac{k\lambda}{vt^{3/2}\sqrt{\gamma B}} \quad (40)$$

in which $$k = \mathrm{sqrt}\left[\frac{12}{(2\pi)^2 \frac{M+1}{M-1}\sin^2\varphi}\right], \quad (41)$$

and where k=0.3 for <p=90°, and M>>1. It is evident from the close agreement in FIG. 14 of eq. (40) with the Monte Carlo MXAS results, that the performance of the MXAS process is well-described in terms of an array with time-dependent characteristics as are here employed, thereby providing validation of the interpretation of MXAS as a motion-extended array, as well as characterization of its performance with respect to noise and integration time. Equation (40) also expresses the property manifest in FIG. 14 that $\sigma_{DF,MXAS}$ improves as 15 log(t) dB, whereas the TDOA/FDOA method improves as 5 log (t) dB due to the non-coherent averaging effects discussed above.

We also note that whereas the expression for the array half-power beamwidth employed in eq. (40) is $\beta(t)=\lambda/vt$, in accordance with the findings discussed above, the correct expression for MXAS would more precisely be, $$\beta(t) = \frac{1.31\lambda}{vt} (\mathrm{rad}). \quad (42)$$

The factor of 1.31, which is not incorporated in the CRLB calculation shown on FIG. 14, would raise the CRLB curve by 1.17 dB, which actually improves the correspondence with the MXAS Monte Carlo results.

In MXAS, the data is coherently combined; for TDOA/FDOA the data from independent, adjacent, overlapping 250-ms snapshots is non-coherently combined. The most prominent attribute of FIG. 14 is the tremendous improvement, 30-dB, of DF precision afforded by the MXAS method. The validity of the results is further bolstered by Table 2, in which is compared the single-snapshot uncertainty in $\sigma_{TDOA}$ and $\sigma_{FDOA}$ obtained from CAF processing (of 200 independent trials) with the CRLB prediction from the prior art.

TABLE 2

|  | CRLB | Monte Carlo Simulation |
|---|---|---|
| $\sigma_{TDOA}$ (s) | 3.01e−6 | 3.27e−6 |
| $\sigma_{FDOA}$ (Hz) | 0.241 | 0.285 |

An additional aspect that the data-driven approach allows us to explore is the effect of choosing longer snapshot durations (dwells) for the CAF processing. In general, for CAF processing, the dwell is kept relatively short since it is implicit in the CAF processing construct that the TDOA and FDOA values are fixed, when, in reality, for moving platforms, they are changing. Similarly, a specific collector position is used in the subsequent geolocation processing, at which discrete point in space the entire dwell is assumed to have been collected. It turns out that for the "stand-off" scenario used here, the TDOA and FDOA characteristics change very little with time, and it is possible to use a much longer dwell. A curious effect, however, which can be understood from consideration of eq. (33), is that for $\sigma_{TDOA}$, the use of a longer dwell does not actually change the result. That is because, according to eq. (33), $\sigma_{TDOA}$ improves with dwell time t according to 5 log ($\tau$), which happens to match the improvement level obtained from non-coherently averaging N=2T/$\tau$ independent DF estimates. If the dwell is made longer, there are fewer independent observations to combine. From eq. (34) however, $\sigma_{FDOA}$ is a strong function of dwell, improving as 15 log (t). Thus, in principal, a much finer range estimate could be obtained by using a longer dwell—providing assumptions of the CAF are not violated (which would adversely affect errors, biases and sensitivity); however, as noted, the azimuth (DF) estimate (based as it is on $\sigma_{TDOA}$) will not be significantly improved.

Figure 15B:
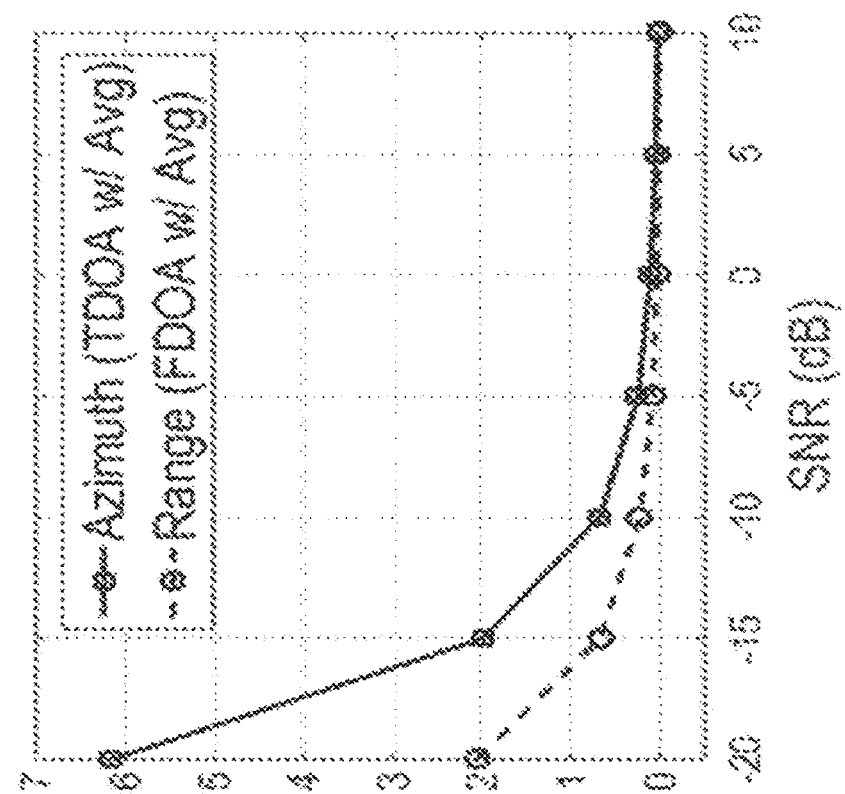
FIGS. 15(a) and 15(b) provide signal details relative to the prior art TDOA/FDOA process for the "stand-off" DF application collection scenario.
Figure 15A:
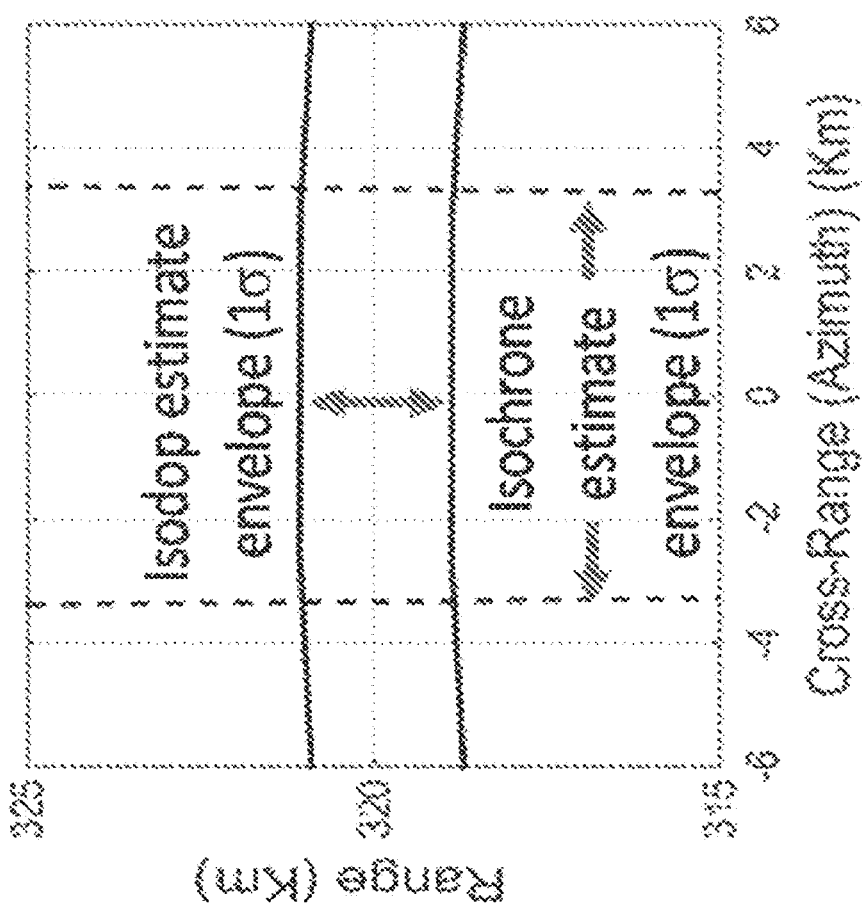

It is important to note that while TDOA/FDOA results in a geolocation, MXAS gives, in this application, only a line of bearing (LOB), or DF. For example, FIG. 15(a) shows how, for the standoff scenario, the one-sigma estimation envelope associated with the peak values of isodops (from FDOA) and isochrones (from TDOA) establish the joint range and azimuth (cross-range) precision (before averaging). FIG. 15(b) gives the azimuth and range (rms) miss distance achieved by the TDOA/FDOA process for the notional ten second collection (thus, with averaging), as a function of SNR.

The exquisite DF precision afforded by MXAS however means that in a short amount of time a geolocation estimate is enabled through the method of intersection of DF solutions. The greater the precision in the DF estimate, the smaller is the angular diversity required between separate DF estimates before a quality geolocation is obtained. In the limit, for perfect pointing ($\sigma_{DF}$=0), even the smallest amount of angular diversity gives the perfect geolocation since two lines intersect at a single point.

Figure 16:
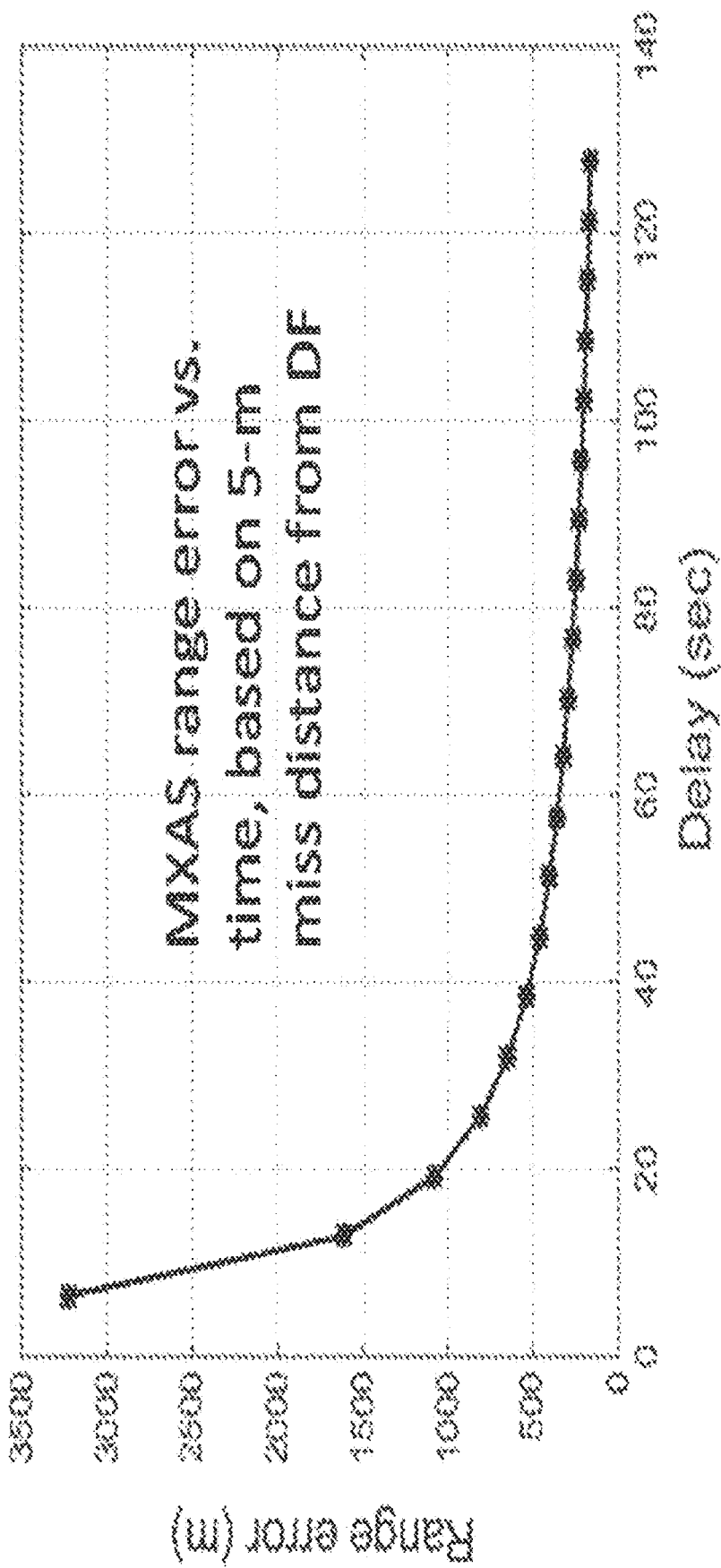
FIG. 16 illustrates the range error in geolocation that results, as a function of time, for the "stand-off" DF scenario, assuming a DF uncertainty of 5-m from MXAS.
Figures 17A, 17B:
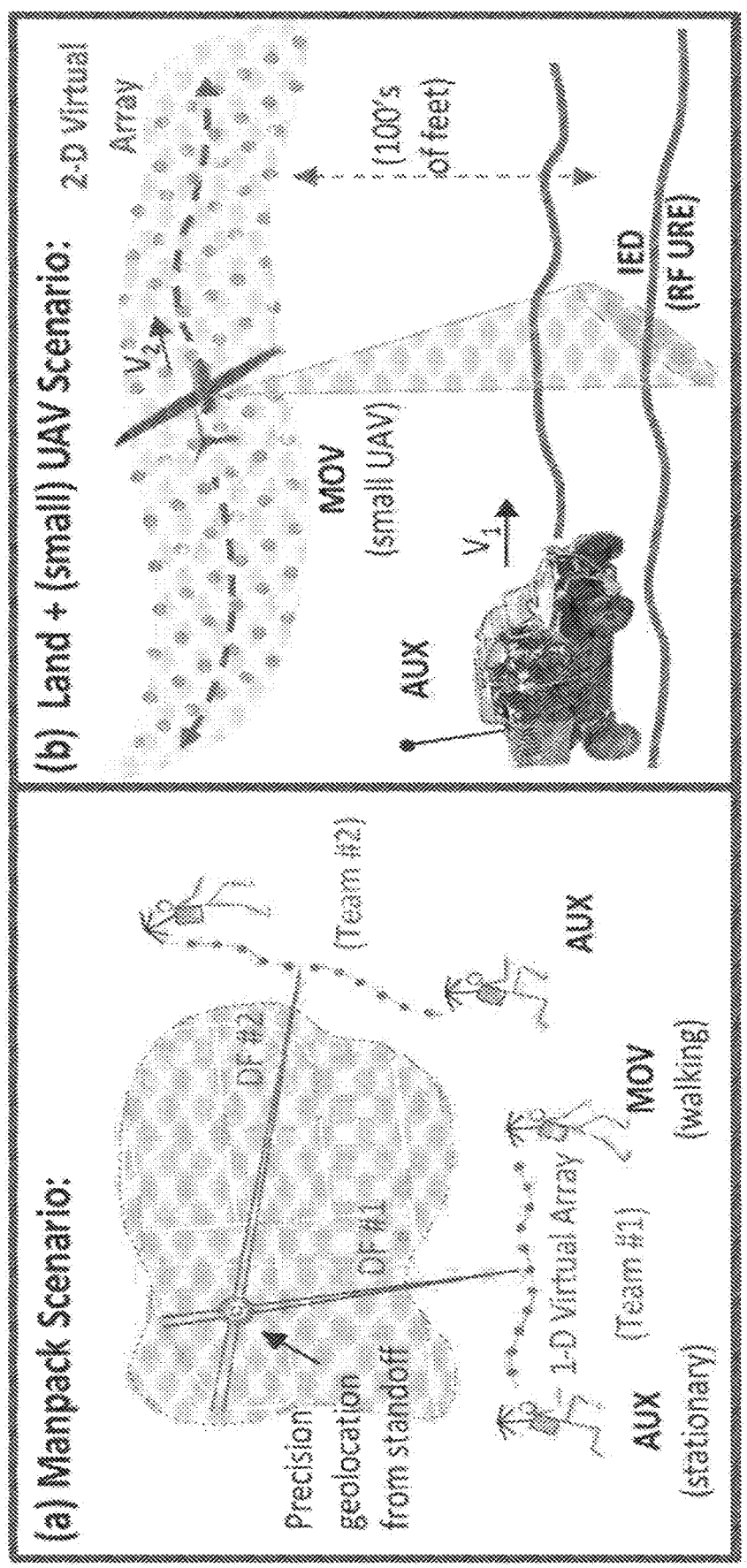
FIGS. 17(a)-(d) illustrate various exemplary applications of MXAS in the physical domain in accordance with an embodiment herein.
Figures 17C, 17D:
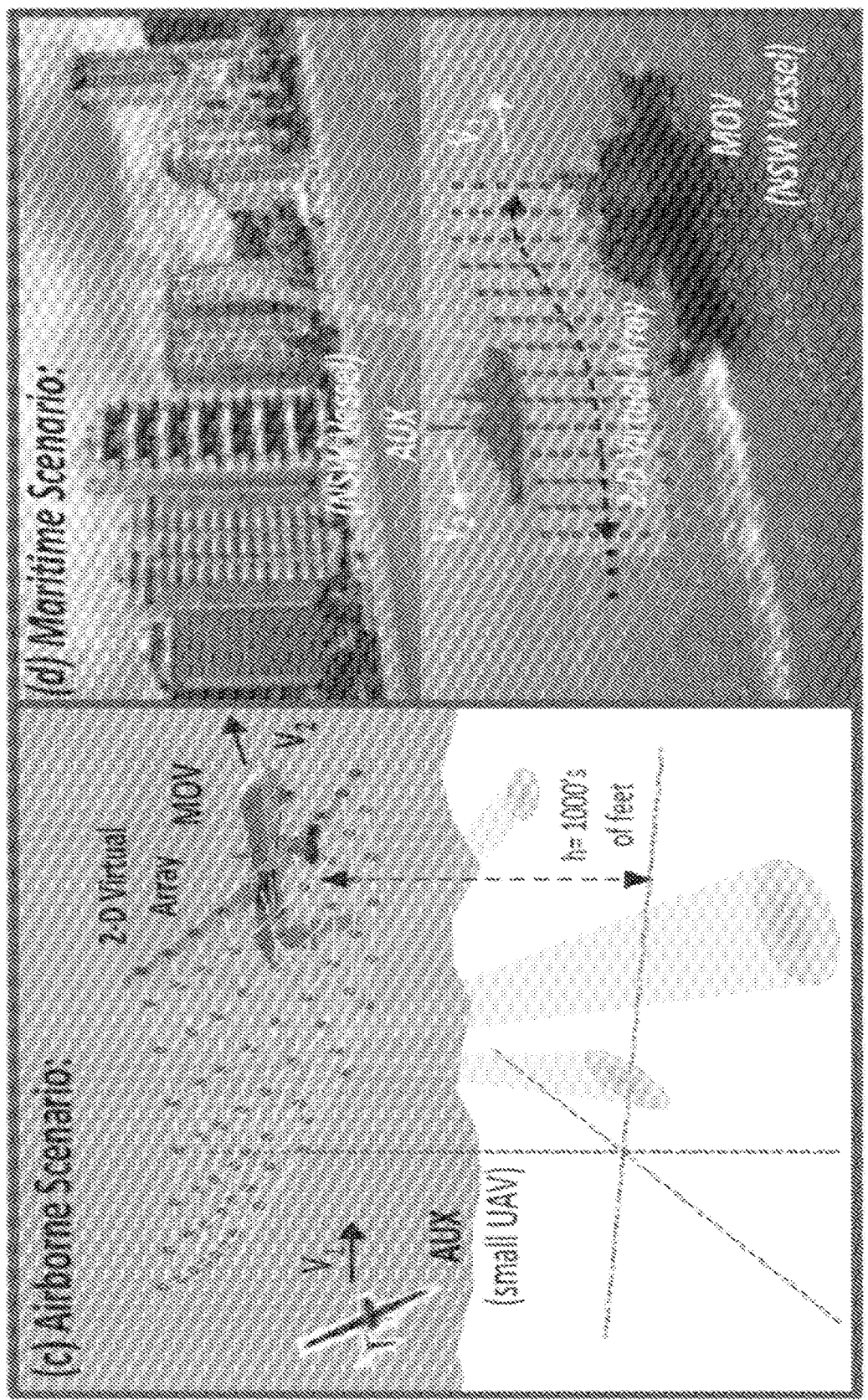

FIG. 16 illustrates the range error in geolocation that results, as a function of time, for the present scenario, assuming a DF uncertainty of 5-m from MXAS, which, from FIG. 14, corresponds roughly to a 3 second collection. Thus, for example, from FIG. 16, a 90 second interval between two such 3-second MXAS calculations affords a range geolocation error of about 250 m.

It is important to note that that the FDOA/TDOA method performance is strongly affected by signal bandwidth. In particular, for narrowband applications the method becomes essentially useless. In contrast, since MXAS leverages the directivity of a large (virtual) aperture, it is suitable for application against signals with arbitrarily small bandwidth.

With TDOA/FDOA, geolocation precision increases with angular separation of the platforms. In contrast, the MXAS approach is largely insensitive to the relative locations of the AUX and MOV nodes. The MXAS approach thus affords simpler, more flexible logistics.

We have shown the theory and method for constructing arbitrarily large (subject to antenna FOV, and, for NB operation, subject to bandwidth and thus fringe washing constraints) arrays using two or more collection platforms having differing velocity vectors.

We introduced a processing method, which we term MXAS, in which the data received from the participating collection systems (AUX and MOV) is allocated over virtual node positions of the virtual array. The processing framework is shown to be interpretable as, equivalently, image formation through the summing of system basis functions weighted by baseline responses (correlations) or else, a beamsteering weight matrix applied to an input SOS manifold vector to accomplish simultaneous focusing on each pixel of the target scene. Both perspectives underscore the existence of degrees of freedom equal to the length of the co-array for the offset imaging system, which due to the motion-extended nature, can be almost arbitrarily large. The latter interpretation, through mathematical resemblance of the formulation to conventional beamsteering on a voltage array manifold vector, admits usage of standard methods for array-centric measures such as interference mitigation in the form of null-steering to multiple/many directions simultaneously, for which we showed examples from simulation.

Accordingly, MXAS provides multiple orders-of-magnitude improvement in performance as compared to a conventional "gold standard" method (TDOA/FDOA) for direction finding and geolocation, for a scenario employing, for each method, the same hardware and data.

The MXAS approach represents a clear and straightforward framework to support a great diversity of candidate implementations to effect orders-of-magnitude improvement in performance over current methods. The performance-enhancement metric follows immediately from the fact that geolocation precision, in a root-mean-square (RMS) sense, is proportional to the beam width of the sensing array; the beamwidth, in turn, is proportional to the area (or length, for 1-D) of the aperture. Similarly, for detection, improved directivity in a non-isotropic environment can afford large improvements in SINR by restricting inputs from directions other that the current focus direction.

Though fundamentally an imaging concept, perhaps the most obvious candidate area for MXAS for terrestrial application is in the precision detection and angle of arrival determination (or geolocation) of discrete emitters of interest. Table 3 represents an exemplary, but clearly partial list of applications, organized according to physical domain, the target type of interest, and the form of the associated collection platforms.

TABLE 3

| Physical Domain/Scale | Purpose/Target of Interest | Configuration Options | |
|---|---|---|---|
| | | MOV | AUX |
| Room/Building/ Warehouse | Surveillance/Counter-Surveillance | Conveyor | Fixed |
| | | Wire guided | Fixed |
| | Baggage/Cargo Inspection | Human-borne | Fixed |
| Land, vehicle-based | Surveillance/Counter-Surveillance | Vehicle | Fixed |
| | | Vehicle | Drone |
| | Stand-off facility inspection | Vehicle | Vehicle |
| | IED detection/location | Vehicle | Balloon |
| | Comms Intercept/Interdict | | |
| Air | (all given for (2), plus . . .) | Airborne | Fixed |
| | Combat Search & Rescue (CSAR) | Airborne | Balloon |
| | Semi-Submersible detection & location | Airborne | Vehicle |
| | | Airborne | Airborne |

Exemplary schematics for various applications of the MXAS system and process to real-world physical domains and scenarios are shown in FIGS. 17(a)-(d).

Additionally, as discussed below space-based applications are also envisioned wherein MXAS enables large virtual array creation on a single satellite platform, which is suitable for conventional radiometric imaging applications. And as discussed at the end of this document, underwater applications of the MXAS processing are also achievable.

Figure 18:
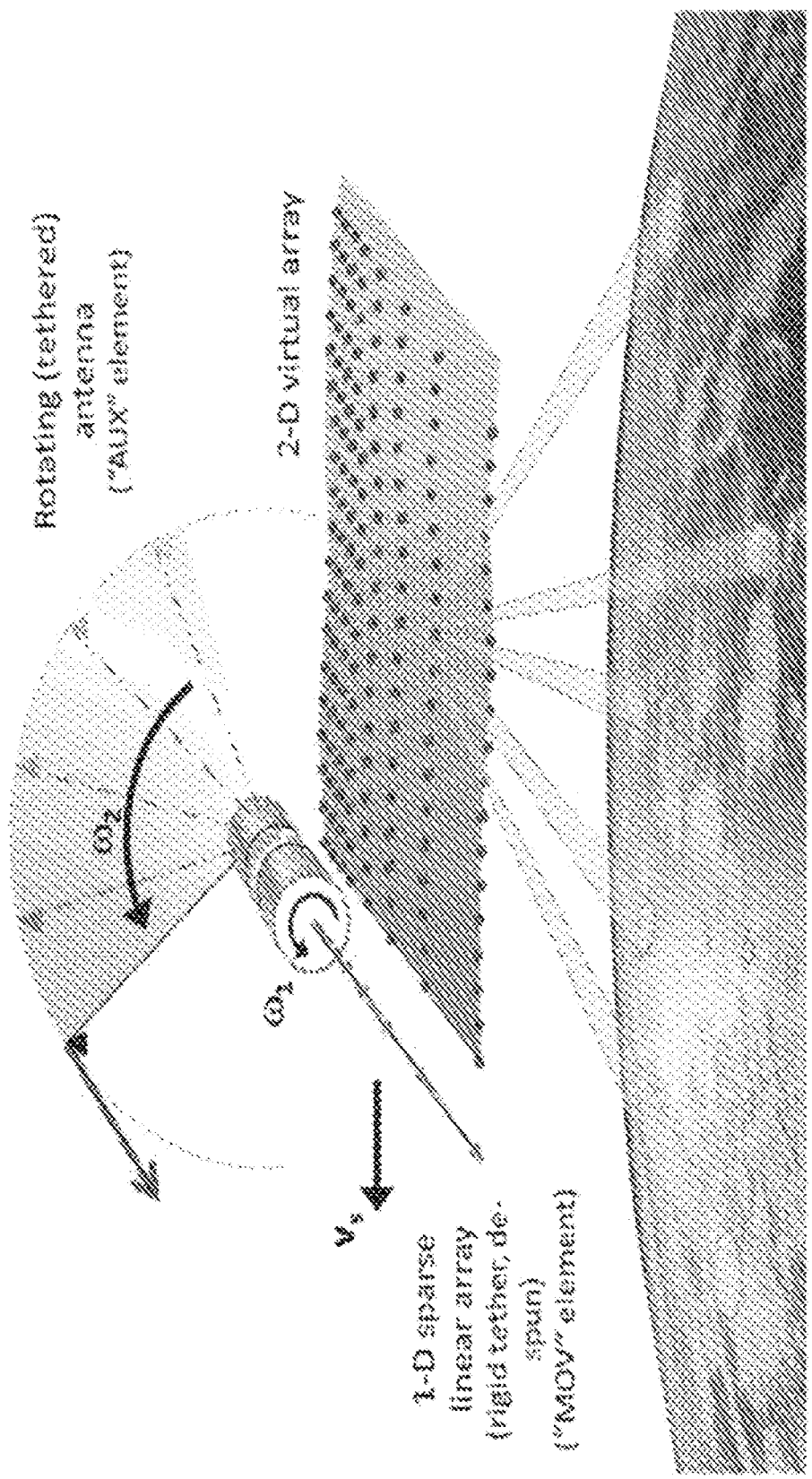
FIG. 18 illustrates a first particular space-based implementation of MXAS, i.e., Rotary-MXAS (R-MXAS), in accordance with an embodiment herein.

By way of a first particular space-based example, Rotary-MXAS (R-MXAS) is illustrated in FIG. 18. As shown, it is a satellite-based system, which comprises, as the MOV element, a rigid tether deployed parallel to the horizon, on which is installed a sparse linear array. The R-MXAS embodiments require dramatically fewer (e.g. 10×) antenna elements even relative to state-of-the-art sparse synthetic array concepts like the operational MIRAS or the planned GeoSTAR systems, to achieve the same spatial resolution, and hence affords dramatic reductions in size, weight, power, and cost ("SWaP-C"). For example, a 20-element prior art design such as that described in A. Camps, et al., "Synthesis of large low redundancy linear arrays," IEEE Trans. Antennas Propag., vol. 49, no. 12, pp. 1881-1883, December 2001, yields the same co-array (and thus gives the same PSF performance) of a 133-element ($\lambda/2$-spaced) uniform linear array (ULA). The rigid tether is despun so as to be constantly facing the earth. The AUX element is represented by an additional single collection antenna at the end of a lengthy tether (non-rigid; under tension). A ground-based component of the R-MXAS system is a processing system that correlates the data from these two antenna (MOV and AUX) systems to accomplish imaging.

The processing exploits the interferometric baselines formed between the rotating tethered antenna at radius R and each of the antennas of the 1-D sparse array on the rigid tether. Due to the antenna rotation, the projections of these baselines into the horizontal plane containing the rigid tether engender a continuum of along-track baselines which range in length from zero to R. The maximum along-track baseline is thus given by the length of the rotating tether; the maximum across-track baseline is given by the length of the rigid tether. Minimum aperture creation time is set by one quarter rotation of the rotating tether. The rigid tether array is made to be very sparse, using minimum redundancy array methods, without any sacrifice of imaging performance.

The state of the art for large RF apertures in space is currently exemplified by the European Space Agency's (ESA's) low earth orbit (LEO) Soil Moisture and Ocean Salinity (SMOS) mission, which has as principal payload the Microwave Imaging Radiometer using Aperture Synthesis (MIRAS). MIRAS is a sparse Y-shaped array, each 4-m arm of which contains 23 L-band antennas operating in a 20-MHz band around 1.4 GHz. It can be shown that the antenna arrangement employed on MIRAS contains nearly all of the spatial baselines of a fully populated square array having a side dimension of approximately 7-m; thus enabling MIRAS to achieve similar imaging performance as such an array, but with far fewer elements. This same design has been the focus of research and planning activities by NASA and NOAA for a GEO-based microwave (MW) sounder GeoSTAR, operating in the 50-GHz and 183-GHz frequency regimes. As discussed herein, R-MXAS affords an additional dramatic reduction in number of antennas, even relative to the MIRAS-type system, thereby offering not only a much lower SWaP-C alternative implementation path, but also a path to apertures of a heretofore unfeasible scale.

Relative to prior art clock scan methods, the critical innovation of R-MXAS is rotation of the AUX system in a plane orthogonal to that in which the virtual array is created. This aspect allows the length of the AUX tether, and hence the along-track dimension of the virtual array, to be arbitrarily large (indeed array size is limited only by feasibility on the length of the rigid tether). In contrast, in the prior art clock scan methods, two rigid booms of slightly different lengths rotate asynchronously about a central hub, in a plane normal to the nadir viewing direction, forming a continuum of interferometric baselines. The clock scan approach requires many full rotations of the rotating booms in order to sufficiently fill in the uv-plane, with acceptable spatial frequency resolution (i.e., $\Delta u$ and $\Delta v$); thus the longer the arm length, the greater the number of full rotations required—and thus the greater the time required-to create a single full aperture. In contrast, as shown, the R-MXAS system, relative to the clock scan method, is rotating in a plane orthogonal to that in which the virtual array is created, enabling formation of the effective aperture in a one quarter rotation, e.g. 15 s for 1 rpm, with images integrated as necessary for sensitivity purposes.

To illustrate technical credibility in a relevant mission context, we present a preliminary quantitative design of a SMOS mission conducted from GEO, at design frequency 1.4 GHz, using the R-MXAS architecture. We show that an R-MXAS system using approximately 84 antennas, comparable to the number (69) presently used by MIRAS, can provide synoptic coverage over the entire visible disc of the earth, with equivalent radiometric and spatial resolution performance to MIRAS, and with a refresh rate of approximately ten image products per day, far higher than the refresh rate for MIRAS, which is once every 1-3 days for a given location on earth. In our quantitative analysis, we consider the two critical system requirements that must be met, spatial resolution and sensitivity. To begin, we consider a simple upscaling of the MIRAS design to accommodate a GEO altitude. To achieve the same angular resolution, the 4-m arms of MIRAS have to be lengthened by the ratio of distances; using 35,800 km for GEO and 900 km for the nominal slant range (i.e. 760 km altitude with a 32° tilt), yields the required arm length of 159 m. The antenna spacing, which is $0.89\lambda$ for MIRAS can be relaxed at GEO to $3.5\lambda$ while still avoiding aliasing from grating lobe effects. Thus the number of antennas per arm is $N=159/3.5\lambda=212$, for a total of 636 antennas over the three arms of the GEO-based MIRAS.

Next, we consider sensitivity and required integration time. Currently, MIRAS integrates for 1.2 s. Power density incident upon a GEO system is reduced by the square of the distance ratio, here $(35,800/900)^2=1582$. However, we must also consider the real aperture or power intercepted. If we used the same antennas on both systems, the power intercept ratio is simply the ratio of number of antennas, or $636/69=9.2$. The total SNR at the GEO receivers is thus $1582/9.2=171$ times smaller than for the LEO system. Since SNR improvement is proportional to the square of integration time, this implies that the GEO system would need to integrate for $(171)2*1.2$ s=9.75 hours to achieve the same sensitivity as the LEO system. However, since the antenna spacing is larger, we may use larger antenna elements for the GEO system, proportional to the relaxed spacing, increasing the (individual antenna) aperture width by a factor of $(3.5/0.89)\approx4$. Since power intercept is proportional to the square of the aperture width, the power intercept ratio between the GEO and LEO systems becomes $9.2*(4)^2=147$. The total SNR at GEO now becomes $1582/147=10.8$ times smaller than LEO, and the required GEO integration time $(10.8)^2*1.2$ s=140 s.

From this equivalent MIRAS GEO system, we can now consider a GEO R-MXAS system. Given the Y-shaped array, the maximum dimension of the notional GEO MIRAS aperture is) $159*2*\sin(60°)=275$ m, which is thus the required length of both the rigid and rotating tethers for the R-MXAS system. Whereas a uniform spacing of $3.5\lambda$ would require $(275/3.5\lambda)=367$ antennas, using known minimum redundancy techniques we can get equivalent (imaging) performance with $2\sqrt{367} \approx 38$ antennas, plus single antennas at each end of two (for mechanical symmetry) rotating tethers, giving a total of 42 antennas. Such a system satisfies the spatial resolution requirements (i.e. 50 km). To enhance sensitivity and hence observation refresh rate, we may place two antennas at each location, making the total number 84. The power intercept ratio for R-MXAS relative to GEO MIRAS, based on number of antennas is thus $(636/84) \approx 7.6$. Thus the required integration time for our R-MXAS GEO system is $\tau = (7.6)^2 * 140$ s $\approx 2.25$ hours, affording a refresh rate of $\approx 10$ images/day. If SWaP-C is a critical driver, we can forgo doubling the antennas, at the expense of refresh rate, which reduces to roughly twice per day (every 8.9 hours). We note that even this reduced system affords synoptic coverage of the visible disc of the earth, at a refresh rate 2-6× higher than is currently available, while using fewer antennas (42 vs. 69) than for the actual LEO-based MIRAS system.

Figure 19:
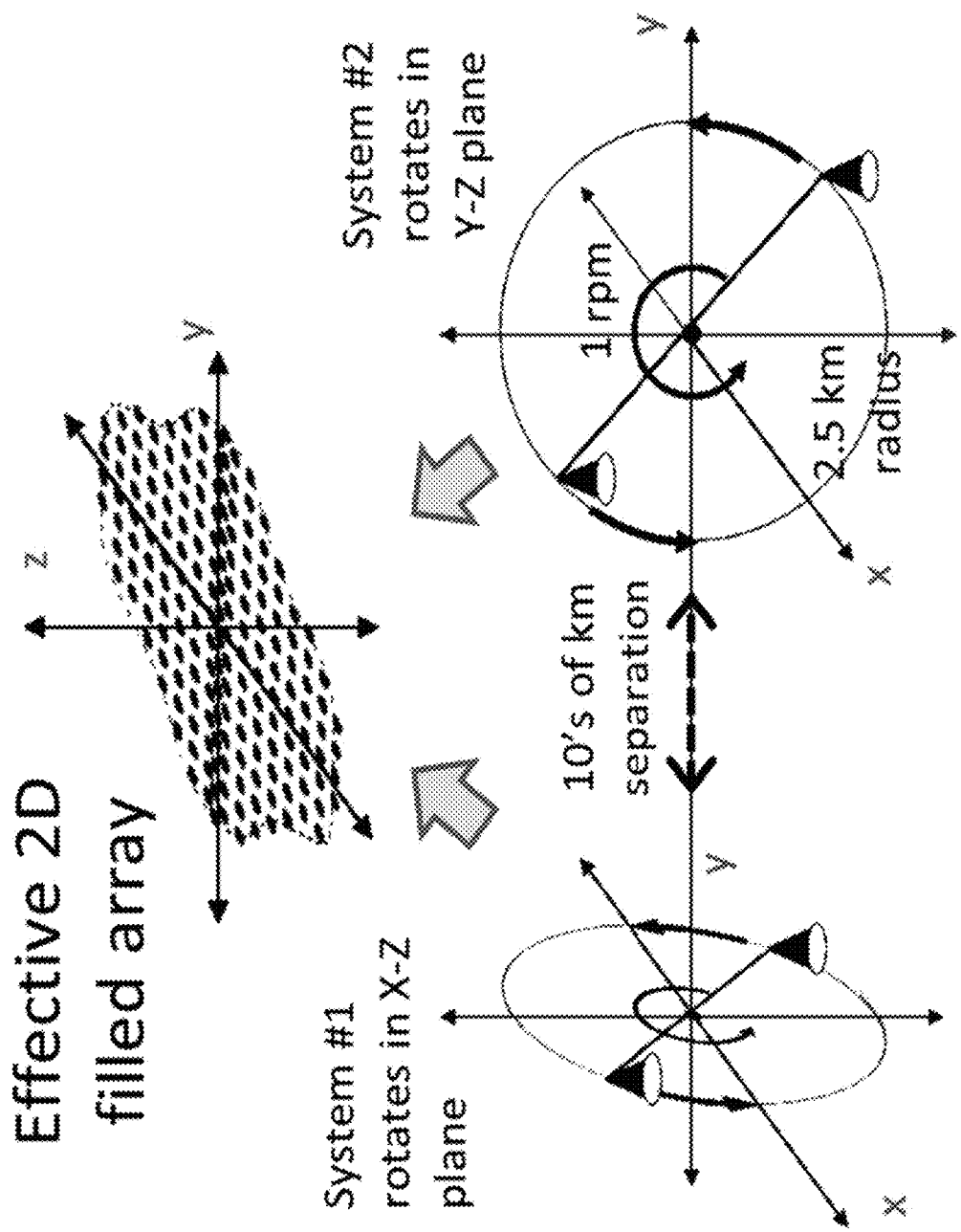
FIG. 19 illustrates a second particular space-based implementation of MXAS, i.e., Rotary-MXAS (R-MXAS), in accordance with an embodiment herein.

In an alternative R-MXAS configuration, a very large virtual array in a GEO orbit is enabled by two systems, shown in FIG. 19, rotating in different planes, X-Z and Y-Z, and separate by large distances, e.g., tens of kilometers. In an exemplary embodiment, tether radius (r) is 2.5 km, with rotation rate of 1 rpm and a full aperture (virtual array side dimension (d) approximately 5 km) achieved every 15 seconds (or every quarter rotation). The tether extends out in two directions from the axis of rotation with an antenna at each.

Figure 20:
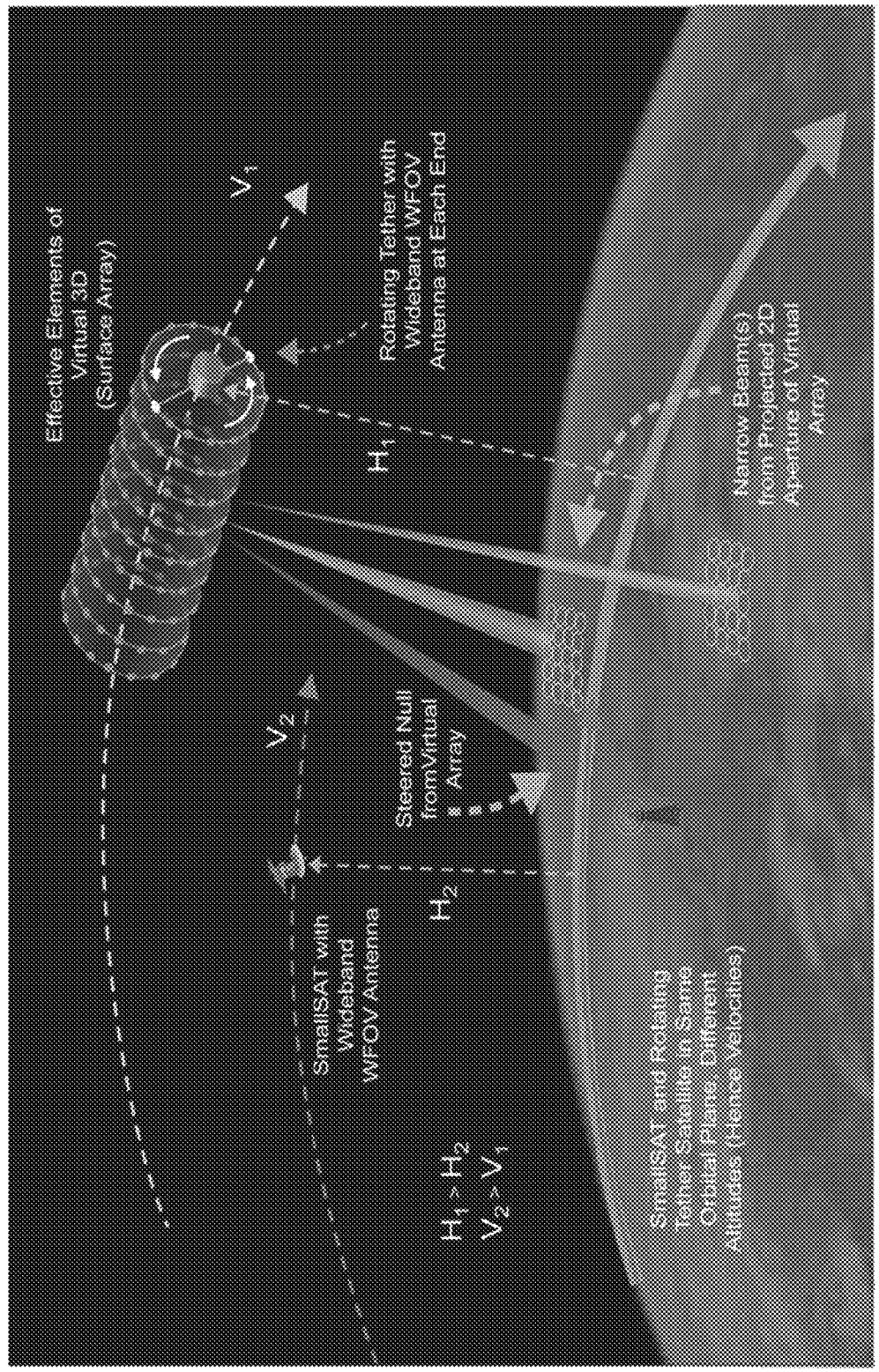
FIG. 20 illustrates a third particular space-based implementation of MXAS, i.e., LEO Companion Aperture Synthesis (LCAS), in accordance with an embodiment herein.

And in yet a further extension on the R-MXAS embodiment, as shown in FIG. 20, the LEO Companion Aperture Synthesis (LCAS) concept removes the need for the physical rigid sparse array used in the R-MXAS embodiment. In LCAS, a continuum of across-track baselines is formed by the projection as a function of time of the line between antennas located at either end of a rotating tether. A continuum of along-track baselines is created between one or both of the rotating antennas by a free-flying smallSAT which is in the same orbital plane but at a lower altitude, thus having a differential along-track velocity component relative to the rotating system. To make this system continually operable, there is (not shown in FIG. 20) a collection of smallSATs distributed in a uniform fashion circumferentially around the (lower) orbit, so that as one smallSAT leaves a common field of view with the rotating system, another moves in to take its place. Note that this system, unlike R-MXAS, because of the potentially large separation between the smallSAT and the rotating system, constitutes in general an offset imaging system, suitable for imaging of a collection of discrete sources but not necessarily so for distributed targets.

It is envisioned that one or more of the R-MXAS embodiments may be utilized to achieve persistent (GEO-based) RF earth imaging, e.g., soil moisture and ocean salinity (L-band). The R-MXAS may provide for an alternative implementation path for the GeoSTAR microwave sounder for a Geostationary Operational Environmental Satellite (GOES) satellite system (Lambrigtsen, et al., "GeoSTAR-A Breakthrough in Remote Sensing Technology," Proceedings of the Sixth Annual NASA Earth Science Technology Conference (ESTC 2006), College Park, MD, USA, Jun. 27-29, 2006. Further, one or more of the R-MXAS embodiments may be utilized to map coronal mass ejection from a solar polar orbit.

In a second space-based embodiment, the MXAS virtual array concept is applied to a collection of small satellites (smallSATs) to detect and geolocate emitters creating an effective large aperture in space that has significant advantages over conventional sparse array concepts, such as a smallSAT "swarm", that might be employed. SmallSats are an increasingly important technology for both geo-based and space-looking missions as described in NASA's Mission Design Division's of the AMES Research Center document entitled "Small Spacecraft Technology State of the Art" dated December 2015, which is incorporated herein by reference. Using SmallSats in a planar array format, the MXAS process provides for superior performance with fewer SmallSats (smaller data volume), including improved Point Spread Function (PSF).

Figure 21:
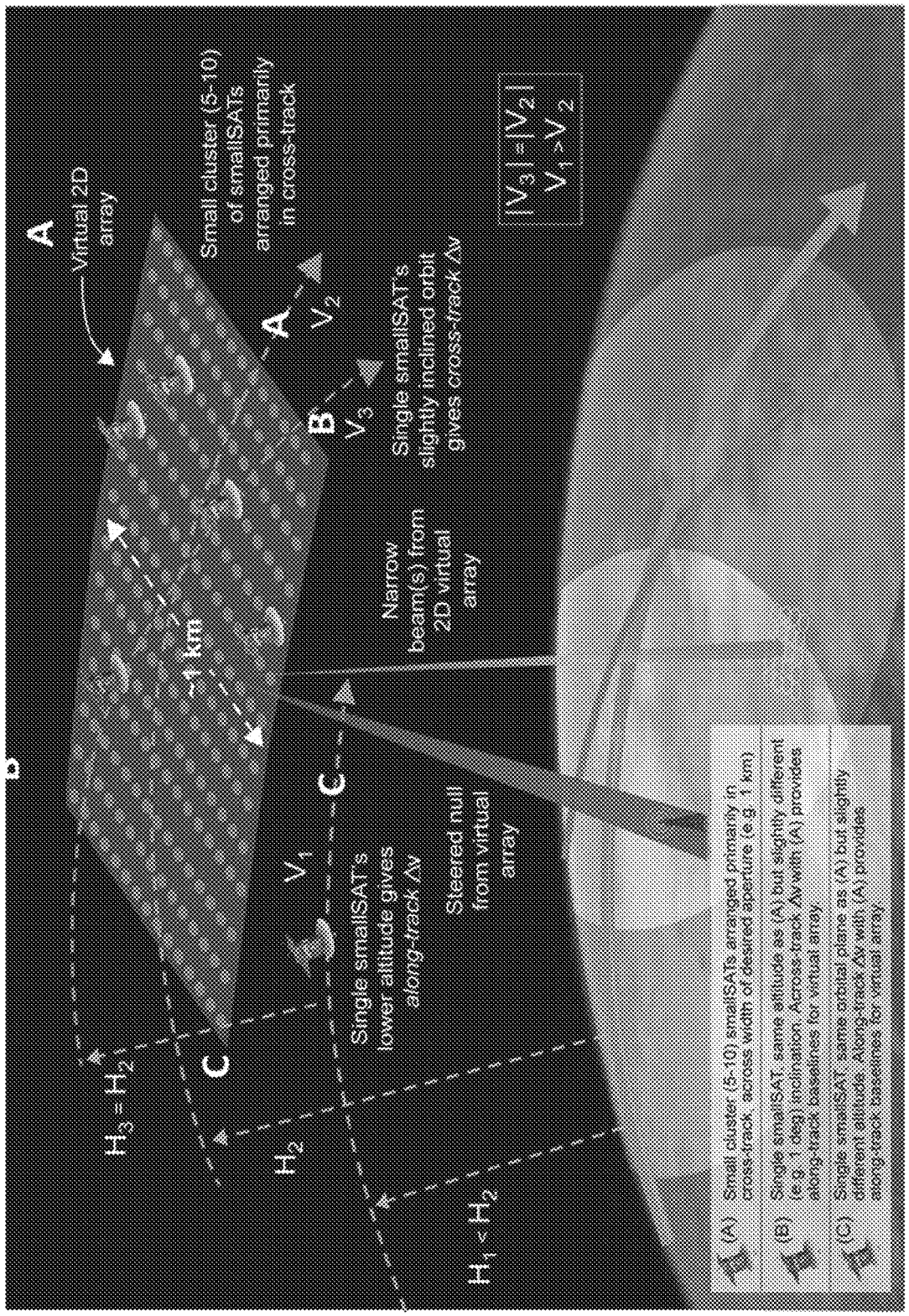
FIG. 21 illustrates a fourth particular space-based implementation of MXAS, i.e., SmallSAT planar array synthesis (SMALLPASS), in accordance with an embodiment herein.

Referring to FIG. 21, the SmallSAT planar array synthesis (SMALLPASS) embodiment is implemented as an orbital plane concept. In the very particular example, one or more orbiting smallSats comprise the system including: level A which is a small cluster arranged in a cross-track configuration across the width of the desired aperture, e.g., 1 km; level B which is a single small Sat, at the same altitude as A but with a slightly different (e.g., 1 degree) inclination; and level C, which is a single smallSat, same orbital plane as A but slightly different altitude. B across-track Av with A provides across-track baselines for the virtual array, while C along-track Av with A provides along-track baselines for the virtual array.

Figure 22:
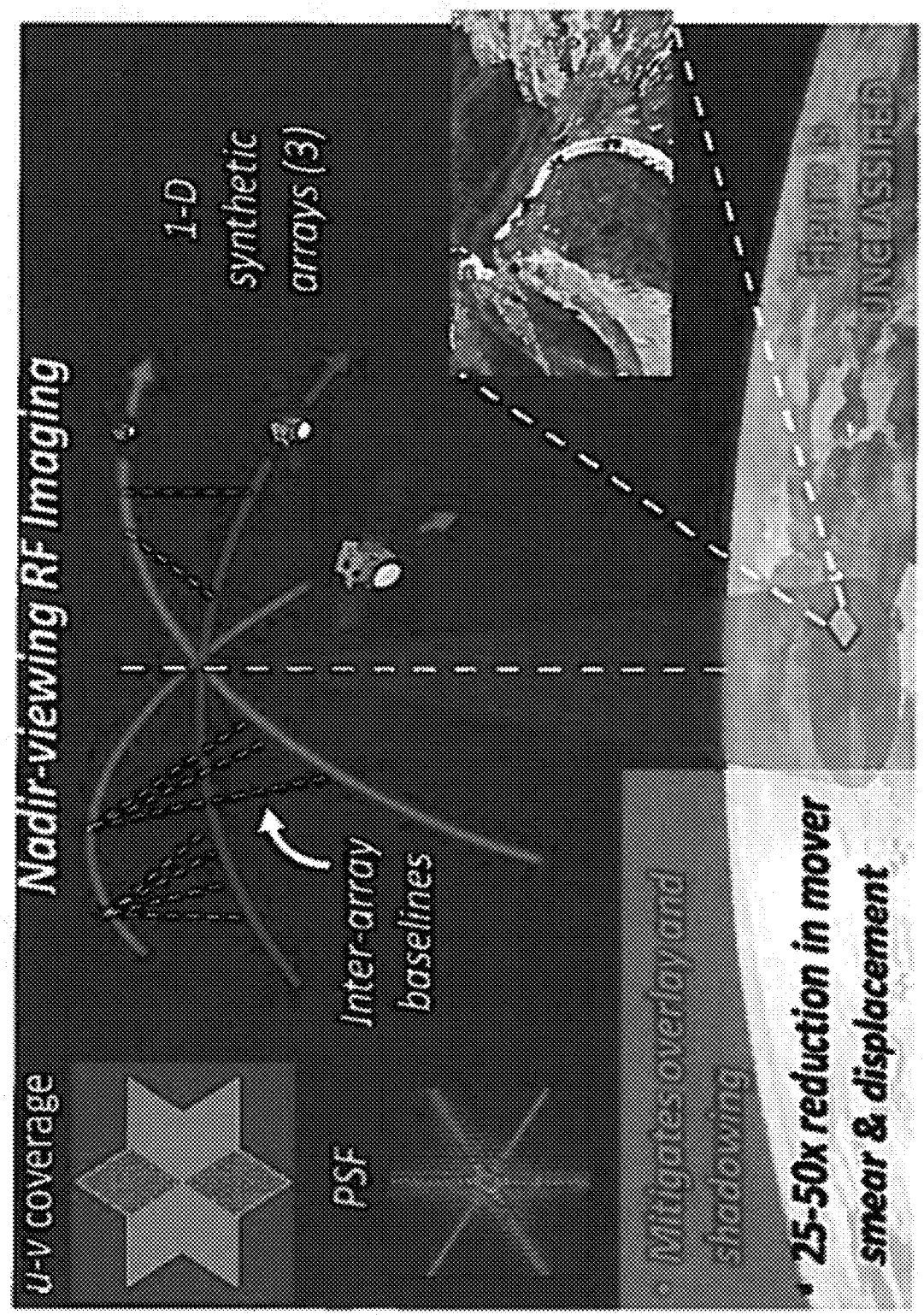
FIG. 22 illustrates a fifth particular space-based implementation of MXAS, Virtual Array RF Imaging (VARI), in accordance with an embodiment herein.

The MXAS principles also illuminate, and motivate exploitation of, the relationship between a "passive" concept, such as R-MXAS above, and so-called "active" methods, such as any form of SAR. Both methods effectively form imagers by enabling the formation of a range of baselines. As seen, the MXAS embodiments primarily do this through the differential motion of two or more collectors. SAR does this by exploiting a reference waveform, a copy of the object-field-illuminating waveform, to produce the same aperture distribution as would be collected by a physical aperture; from which distribution all possible baselines between virtual elements may be created, not just the time-coincident pairwise ones as in MXAS. In the Virtual Array RF Imaging (VARI) embodiment, MXAS principles are combined with a variation of SAR principles to enable literal RF imaging from a nadir perspective. The imaging method is notably distinct from SAR and affords several important benefits. The nadir or near-nadir perspective: a) eliminates overlay and shadowing and allows for all-weather imaging into canyons (natural and urban); b) mitigates moving target signature disruption; and c) allows for use of a much smaller antenna than conventional SAR. The distinctness of the VARI method relative to SAR can be most clearly understood from the fact that range-gating, which provides one dimension of resolution in SAR imaging, is entirely ineffective from a nadir perspective since it provides no differentiation among target cells. Instead, as is illustrated in FIG. 22, imaging in VARI is enabled by beamforming over the virtual nodes, both intra- and inter-array, of three synthetic 1-D arrays, each of which is formed by a single moving platform, which are oriented 120° relative to each other in a plane parallel to the area being imaged. Such a Y-configured sparse array is well known for enabling a well-behaved point spread function suitable for imaging. The size of the sparse array can be made sufficiently large to provide image resolution comparable to what is provided today by conventional SAR. The 1-D synthetic arrays are created using a narrowband illumination waveform so that range effects for the targeted area manifests as phase-only effects. For imaging of stationary targets, collection of the separate synthetic areas can occur at different times.

In yet a further application, the MXAS process may be implemented in the field of undersea acoustics. Underwater sensing is a priority for the navy. Passive sensing is ideal but current technology is assessed as insufficiently sensitive. The topic of passive acoustic aperture synthesis—sometimes called passive synthetic aperture sonar (PSAS)—has been the subject of vigorous research over the past few decades owing to its obvious value in a domain of critical national importance—undersea warfare operations. The advantage conferred by a larger aperture is in the form of both increased detection sensitivity and location precision (typically just angle, not range) of usually distant acoustic sources. In addition to the offensive and defensive value of such capability, benefits extend to enhanced undersea navigation based on triangulation of known distant acoustic beacons.

Despite these obvious benefits, the state of technology for PSAS capability stands as relatively limited, as discussed in a fairly recent survey of the topic (See Stergios Stergiopoulos, Advanced Beamformers, Defence R&D Canada (DRDC), Technical Report, T R 2008-101, September 2008). The survey is authored by Stergios Stergiopoulos, a prominent voice in the field, who in 1989 invented a PSAS technique, called ETAM (See S. Stergiopoulos and E. J. Sullivan, "Extended Towed Array Processing by an Overlap Correlator," J. Acoust. Soc. Am., 86, pp. 158-171, 1989), which remains one of the most highly regarded and frequently cited approaches. In ETAM, an extended towed array is synthesized based on correlations performed over spatially overlapping intervals of a real linear towed array. Although ETAM (and related methods) are currently considered state-of-the art, its application is restricted to narrowband (NB) (preferably monochromatic) signals and the absence of co-channel interference. (See G. L. D' Spain, et al, "Active Control of Passive Acoustic Fields: Passive Synthetic Aperture/Doppler Beamforming with Data from an Autonomous Vehicle," J. Accoust Soc. Am. 120 (6), December 2006.)

In contrast to these methods, the MXAS theory and method represent an extension of principles applied in radio astronomy synthesis imaging (RA SI). In particular, the methods are appropriate for scenes made up of completely incoherent sources; hence the approach is inherently wideband, unlike ETAM. Further, the fact that the two collection systems involved can be practically co-located (though moving with respect to each other) confers important benefits for an undersea application, namely: a) the time-varying channel effect, being nearly identical for both collection systems, is manifest as simply additional common signal modulation; and b) target motion (hence Doppler) is also essentially common to both collection systems and hence largely cancelled in the processing.

Figure 23:
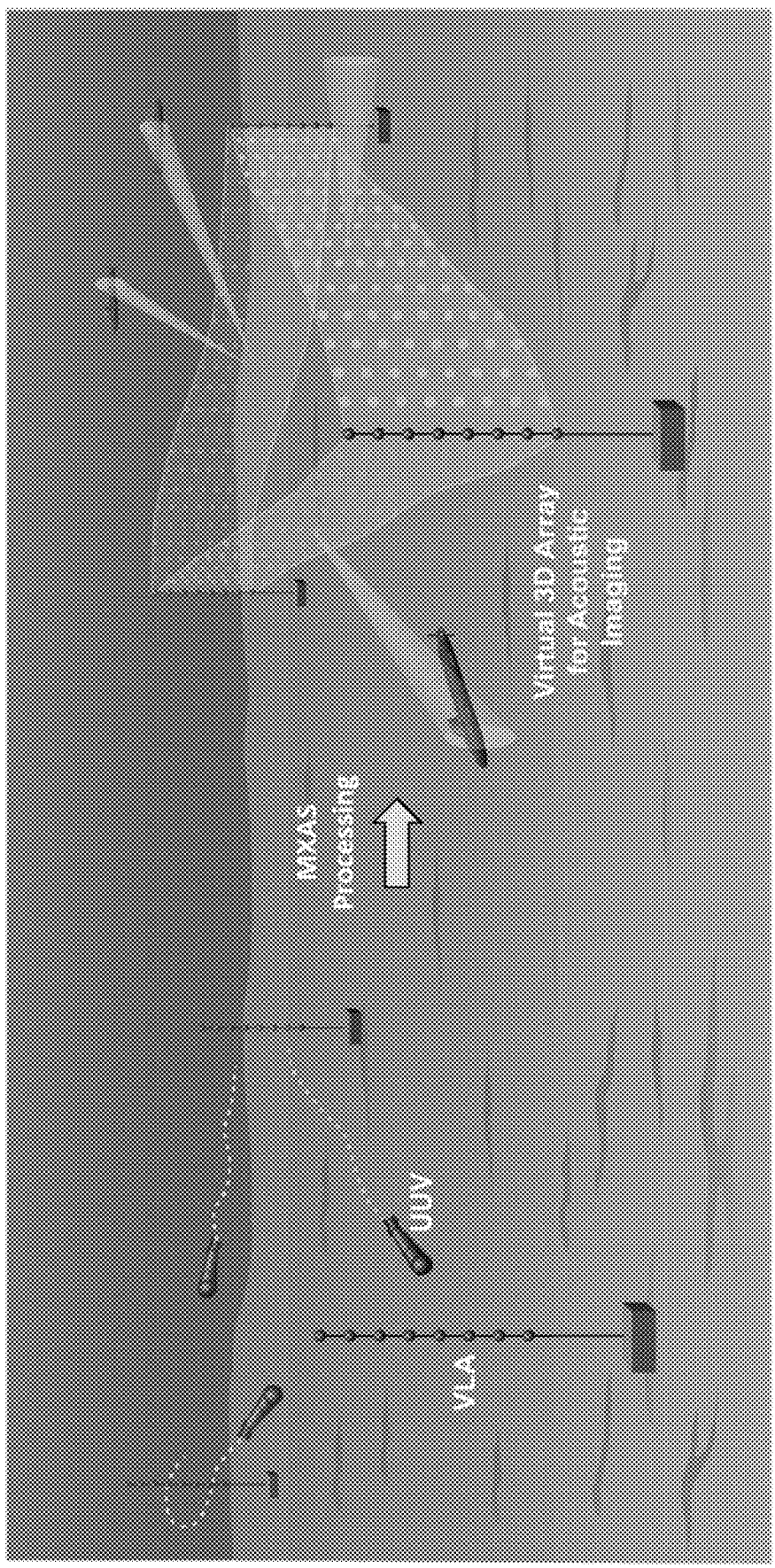
FIG. 23 illustrates an underwater implementation of MXAS, i.e., U-MXAS, in accordance with an embodiment herein.

Referred to as Underwater MXAS or (U-MXAS), it has been demonstrated that a 50-meter virtual array applying MXAS processing performed comparably to a 500-meter real array for a mixture of narrowband and wideband signals. And the virtual array applying MXAS processing demonstrated a greater than 10 times improvement relative to the ETAM for non-narrowband signals. An exemplary system schematic is shown in FIG. 23, which combines advanced technology concepts including MXAS, UUV s (Unmanned Underwater Vehicle), Transformational Reliable Acoustic Path System (TRAPS) VLA (Vertical Line Array), and Gbps through-water COMM to create very large-scale 3D virtual arrays for high resolution 360-degree acoustic imaging for underwater situational awareness. Specifically, the exemplary embodiment utilizes signal date from fixed VLAs and moving UUV(s) to make the virtual array.

The MXAS theory described in detail above has been tested in different environments including, a free-space laboratory bench test setting and an outdoor setting for limited objective field experiment. In the bench test setting, the MXAS theory was tested to demonstrate and examine: discrete versus continuous motion; common versus independent clocks between MOV and REF; resolution of equal power versus disparate power sources; imagine of two or more non-coherent versus coherent sources; moderate versus ultra-weak power sources; imagining (focusing) of course at the same versus varied ranges (tomography); variable platform speed versus sensitivity; array centric processing, i.e., interference mitigation through null steering; and operation in complex, i.e., high-multipath environment. The results and discussion of the bench testing are found in EXHIBIT C and EXHIBIT D from U.S. Provisional Patent Application Ser. No. 62/410,495 incorporated herein.

For the limited objective field experiment, which is also discussed in detail in EXHIBIT C and EXHIBIT D from the incorporated provisional patent application, a synthetic array was created using the MXAS method by transporting an 8-element vertical array across the entire west edge, 60 meters, of a parking lot opposite a 6-floor building and a parking garage as shown in FIG. 24. The distance from the synthetic array to the sources, scattered throughout the building and parking garage was approximately 130 meters. By way of example only, the MOV node is comprised of the following subsystems: antenna array, bank of receivers (one for each antenna element); BIT circuit and associated calibration source; a GPS receiver; an atomic (Rb) clock/source; a second GPS RTK system; USB hub; and power distribution hub. Collectively, these subsystems form an Antenna Array Payload Pedestal (A2P2) which includes an 8-element linear (vertical) array of dual-polarized, narrow-band (BW=5 MHz), nearly isotropic ceramic patch antennas having a center frequency of 934 MHz, and gain of about-5 dBi [Abracon APAE915R2540ABDB1-T]. The complex (phase and amplitude) antenna patterns for each of the array elements were measured (in their respective positions on the array) in an anechoic chamber and this data is incorporated into the MXAS processing. A GPS antenna, from which output is split to feed both the integrated GPS receiver of the atomic clock component of the A2P2, as well as an additional GPS receiver (u-blox EVK-6T) which serves as a component of the GPS RTK precise positioning implementation. For the experimental implementation, the A2P2 is mounted in the open doorway of the van, and the van is driven along the western edge of the parking lot shown in FIG. 24.

The AUX system for the limited objective field experiment consists of the same antenna element as used in the 8-element A2P2, a narrowband RFID patch antenna (fc=934 MHz), mounted, in the case of the AUX node, on an eight-inch square aluminum plate. The AUX system antenna is mounted at a height of approximately 2.5 m on a PVC stand a few meters away from the beginning of the "track" of the MOV node. The AUX system additionally comprises (co-located), a GPS antenna, from which the output is split to feed both the GPS receiver integrated into the atomic (Rb) clock, and a separate u-blox EVK-6T GPS receiver that serves at the base station for the GPS RTK precision positioning system. The atomic clock uses its integrated GPS receiver for long-time-constant discipline, as well as for provision of universal (UTC) time of day information, used to timestamp the RF digital data produced in the Picoceptor software defined radio component of the AUX system. A local wireless network is established between the MOV and AUX systems to permit near-real time data transfer and processing, the latter conducted in a workstation established in the van.

Figure 25:
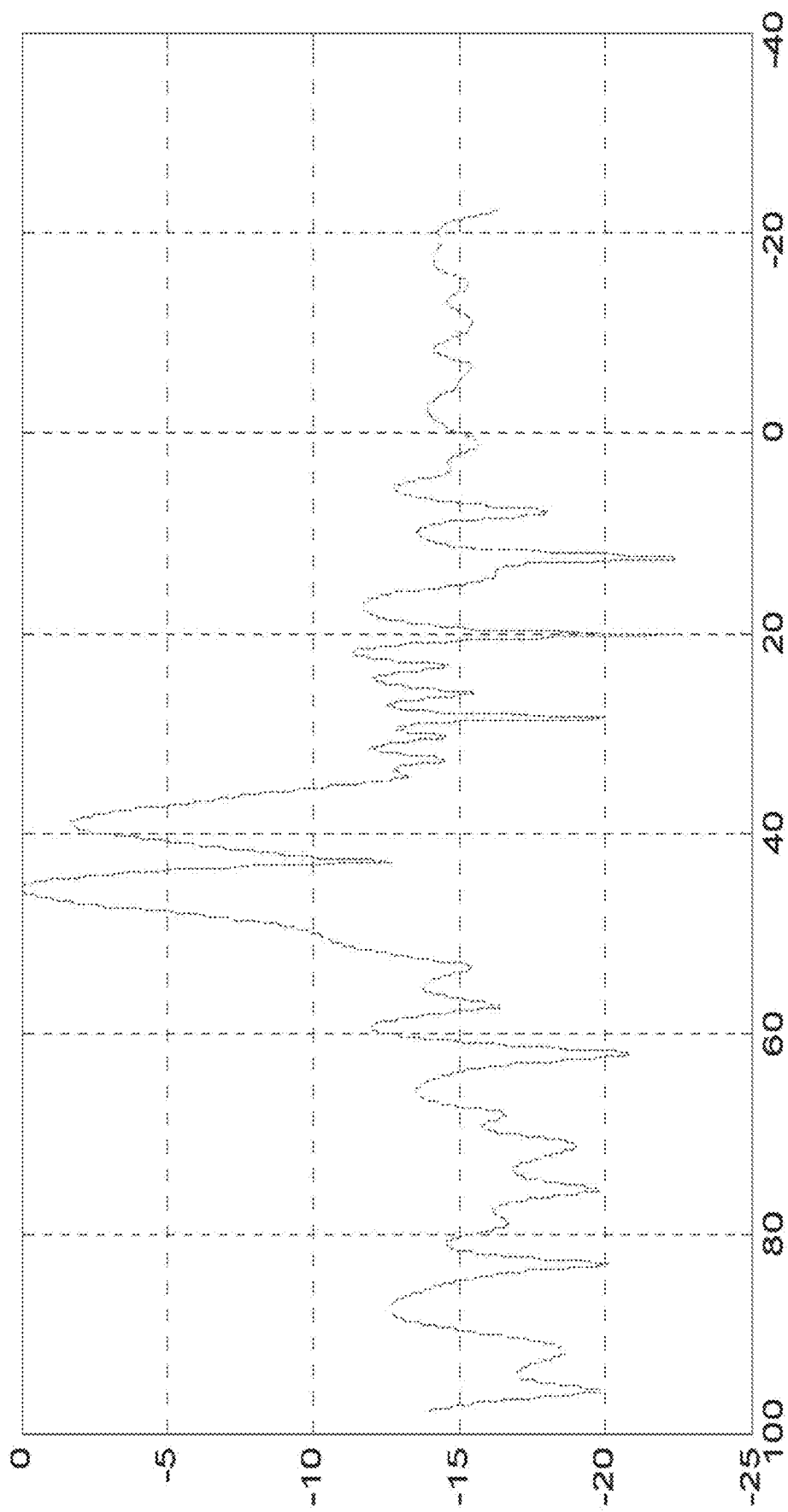
FIG. 25 shows the azimuth cut, at the elevation value corresponding to peak intensity, of the resultant image from the MXAS experimental set-up in FIG. 24.

In the limited objective field experiment a CW source (934 MHz) is split and fed to two small non-directional antennas; these antennas are placed approximately six meters apart and next to windows in a conference room on the fourth floor of the building A from FIG. 24. The signal power is 25 dBm for each. The imaging is accomplished by translating the MOV element (i.e., driving the van), which is 130 m from the building, a distance of about 20 m; the AUX element as mentioned, is stationary and located a few meters from the starting point of the MOV travel, in the opposite direction. FIG. 25 shows the azimuth cut, at the elevation value corresponding to peak intensity, of the resultant image. For this particular image, a Hanning windowing function is used in the processing to reduce the sidelobes.

FIG. 26(a)-(b) shows the same result without a Hanning window applied. The half-power beamwidth exhibited for the peaks is approximately two meters. In order to achieve this imaging resolution with a real aperture, the aperture would need to be essentially the same size in the cross-range dimension, ~20 m, which was traversed by the MOV system. At 934 MHz, 20 m corresponds to an array of approximately 125 2/2-spaced elements; thus the 2D virtual array in this example has the equivalent of 875 virtual antenna elements.

FIG. 26(c)-(d) and (e)-(f) show the results of the application of null steering performed for this same image result. In FIG. 26(c)-(d) the strongest source is nulled; which process makes visible a secondary source, most likely a reflection from the adjacent window frame. In FIG. 26(e)-(f), the secondary (reflection) source is also nulled, leaving only the second source.

Figure 27:
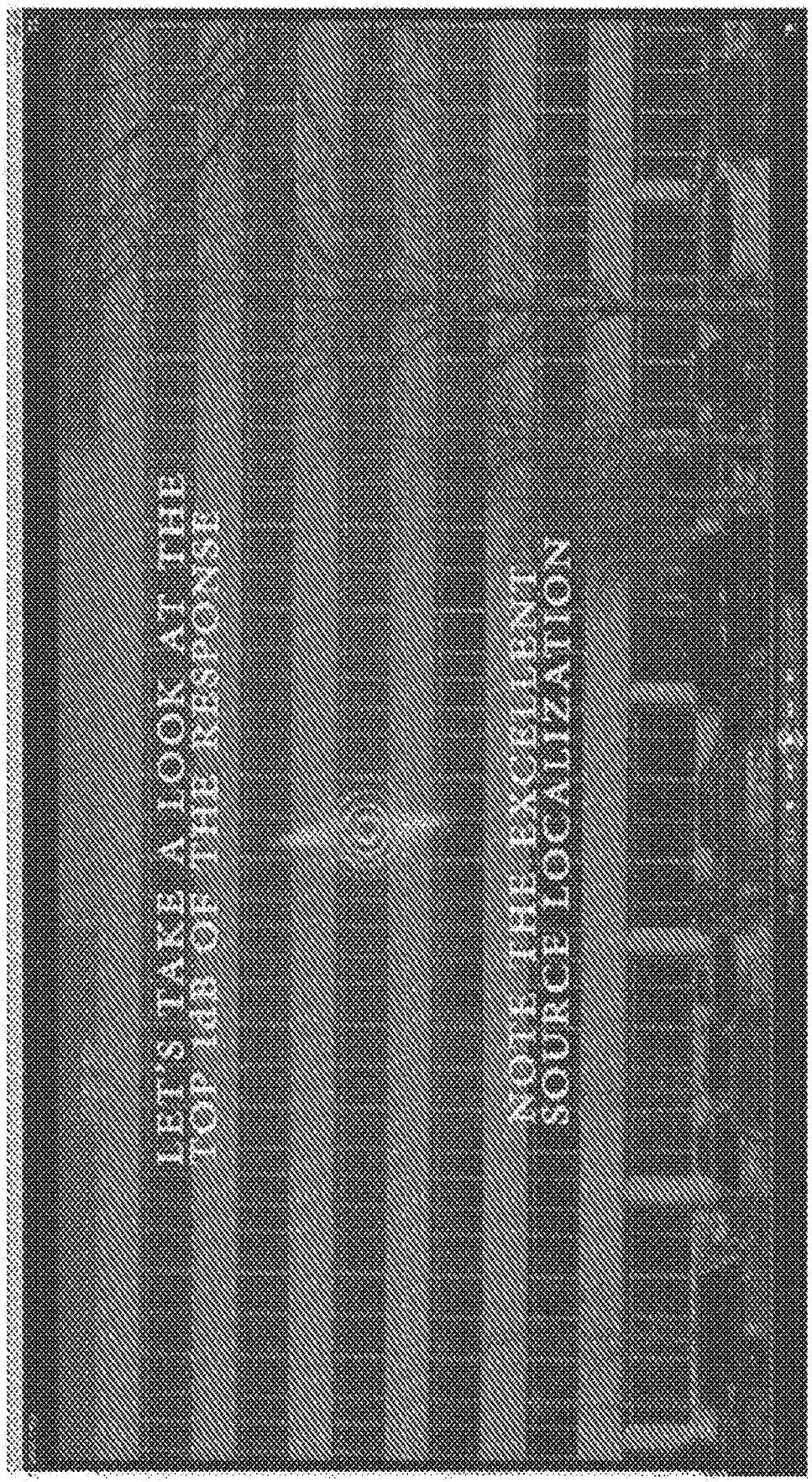
FIG. 27 is an overlay of the top 1-dB of the imaging result from the MXAS experimental set-up in FIG. 24.

The signal in this experiment is CW at 934 MHz; the output power of the signal generator is −80 dBm, and this feeds a small non-directional antenna. The MOV van is driven very slowly, requiring a full two minutes to traverse the 20-$m$ distance. FIG. 27 is an overlay of the top 1-dB of the imaging result onto the building A picture, illustrating excellent geolocation accuracy (within a fraction of a meter) and precision, in both azimuth and elevation of an ultra-weak source. From the imaging, the source location estimate coordinates are (in meters) (42.5, 14), whereas the truth location is (42.5, 14.5).

The actual imaging results are shown in FIG. 28(a), (b), which also shows (FIG. 28(c)) the azimuth (horizontal) cut at the maximum elevation angle (vertical position), as well as (FIG. 28(d)) the elevation cut at the maximum azimuth value. The latter exhibits the expected beam pattern for the 8-element array of the A2P2.

Figure 29:
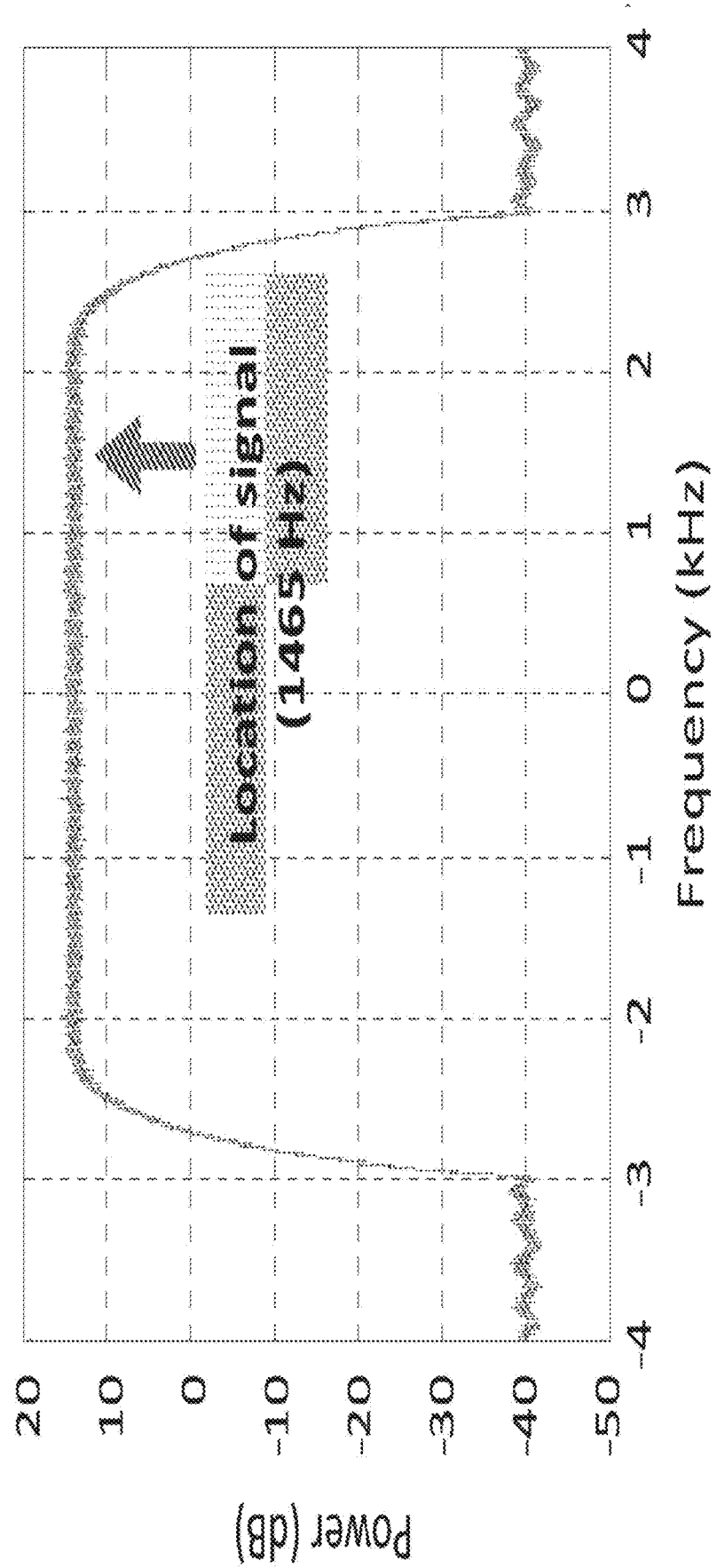
FIG. 29 shows the power spectral density (PSD) estimate obtained for the full 120-second collection for the data from one of the receive channels from the MXAS experimental set-up in FIG. 24.

A noteworthy aspect of the ultra-low power experiment is that the signal was undetectable by spectral means. FIG. 29 shows the power spectral density (PSD) estimate obtained for the full 120-second collection for the data from one of the receive channels. The PSD estimate is produced using the Welch method with a 2-second window (thus 0.5-Hz spectral resolution), and 50% overlap between windows. The Welch method is described in P. D. Welch, "The use of fast fourier transform for the estimation of power spectra: a method based on time averaging over short, modified periodograms," IEEE Trans. Audio Electroacoust., Vol. AU-15, pp. 70-73, June 1967, which is incorporated herein by reference.

Although the signal in this case is nominally CW, it was observed in other, higher power experiments to exhibit about a 4-Hz frequency spread over a 30-second interval. The source was only visible in the MXAS imaging output products for the case in which the processing was performed on the specific 4-Hz bandwidth in which the signal energy was (apparently) centered, i.e., a matched bandwidth. It was not possible to know the location of this bandpass a priori as the frequency of the signal generator could not be reliably known to this level of precision, nor even inferred, from prior experiments, due to slight (and constant) frequency drift. Thus, the detection and geolocation process amounts to a form of spatially focused spectroscopy.

This aspect has two important implications: 1) for any applications where a signal is detectable by spectral methods, it is highly likely that MXAS will afford a good geolocation, given that it has been shown to do so where the signal is not so detected; and 2) MXAS can serve as an ultra-sensitive detection method to, in effect, spectroscopically interrogate a scene or object, in a spatially-selective manner to discover its spectral radiation characteristics.

Accordingly, the experiments validate the MXAS theory and method in the context of a near-field sensing/imaging configuration. Key principles validated include: creation of a two-dimensional imaging system (virtual array) from a temporally-distributed range (continuum) of baselines arising from two collection systems having different velocity vectors, including for an offset disposition; imaging capability by such a virtual array for a range of scenarios to include extreme near-field, complex (e.g., co-channel, multiple correlated incident signals), and ultra-weak signal scenarios; imaging performance similar/comparable to that of a real array of the same (swept area) dimensions, quantitatively in agreement with MXAS theoretical predictions; retention of DOF of an array, exploitable by various array processing methods; and satisfaction of system requirements for synchronization and precision using COTS components.

Figure 30:
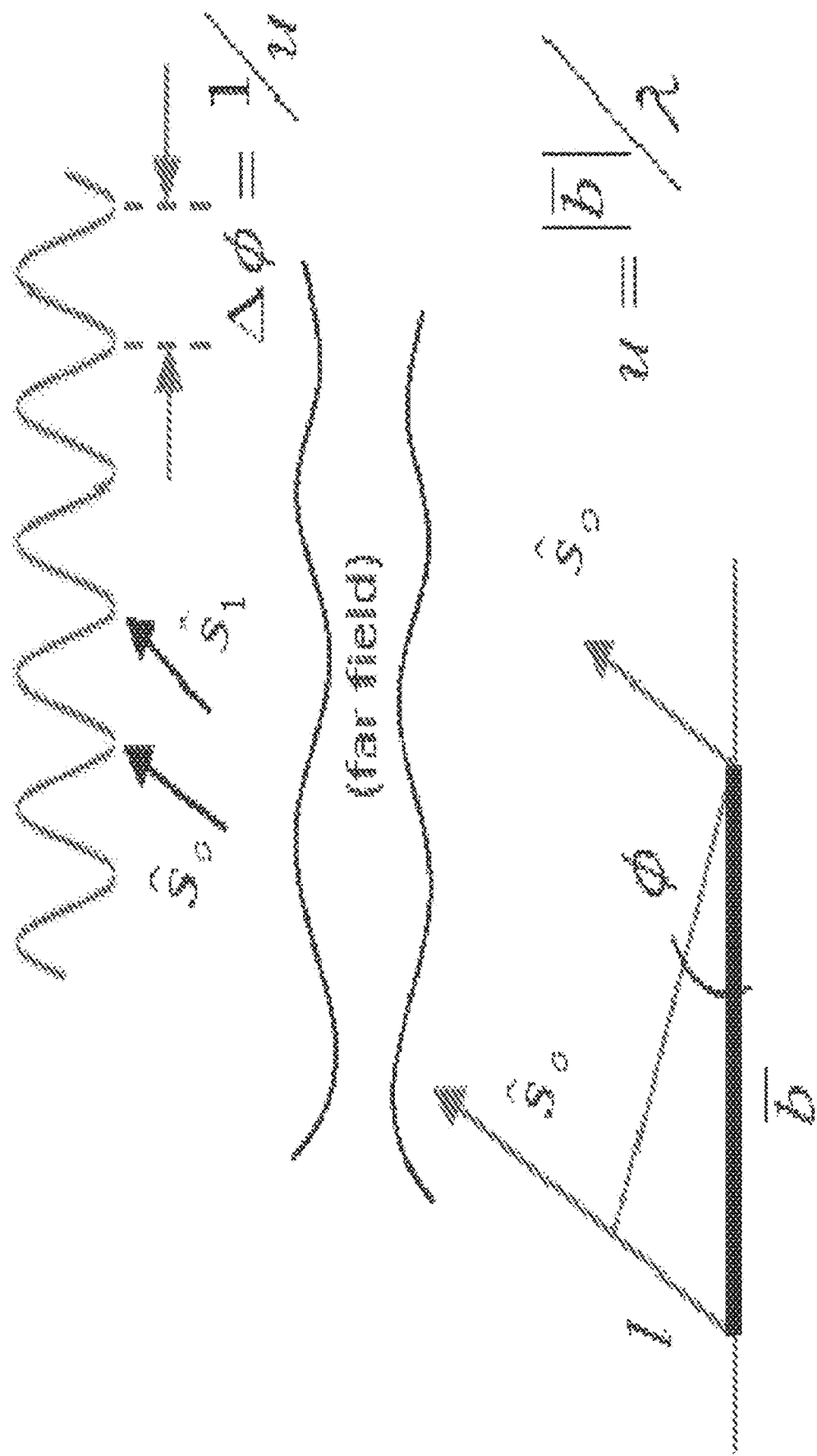
FIG. 30 illustrates the relationship between a baseline, b, and its associated spatial frequency.

The derivation leading up to Eq. (19), was, for the purpose of complete generality, performed with respect to a near-field scenario, which is a model well-suited to many of the potential embodiments of the art. However, to clarify the relationship of the MXAS to alternate array processing methods, namely conventional beamforming and general aperture synthesis, it is useful to cast the fundamental expressions for baselines into their far-field forms, which directly exposes the spatial frequency quantities. Referencing the discussion above with respect to FIGS. 2a-2d, the MXAS theory and processing can be generalized to describe an effective offset-spatial-frequency imaging system. Beginning with the reduction of the quasi-sinusoidal function $$f(\bar{r}) = \cos\{\omega[\Delta\tau_{mn}(\bar{r}_o) - \Delta\tau_{mn}(\bar{r})]\}, \quad (43)$$

here $\Delta\tau_{mn}$ represents the propagation time difference to the virtual array elements m and n, from, respectively, the true source point ($\bar{r}_o$) and the current focus point ($\bar{r}$), is can be shown that in the far-field, this function reduces to, $$f(\Delta\phi) = \cos(2\pi\mu_{mn}\Delta\phi), \quad (44)$$

where $\mu_{mn}$ is the spatial frequency associated with the baseline, a vector, $\bar{b}$, connecting array elements m and n, and $\Delta\phi$ is the angle delta relative to the nominal pointing direction of the, array. FIG. 30 illustrates the relationship between a baseline, $\bar{b}$, and its associated spatial frequency. The numeric value of the spatial frequency is seen from the fact that, as pointing angle ø changes, the phase difference experienced by the antenna pair proceeds continuously from fully in-phase (constructive) to fully out of phase (destructive interference). Starting from ∅=0, the angle for which baseline b incurs one wavelength of differential path length between the two antenna pairs—and hence the angular difference for which one spatial cycle is cast onto space—is ∅'=λ/b radians; since there is one spatial cycle incurred in ∅' radians, it follows that the spatial frequency is equivalent to the wavelength-normalized baseline extent, that is, $1/\phi'=b/\lambda=\mu_{mn}$ cycles per radian.

The signal processing measures by which an image is formed using (real array) beamforming (BF), conventional aperature synthesis (AS), and MXAS respectively are summarized in equations (45)-(49), where we consider a uniform linear array (ULA) geometry with $N_e$, elements, and $N_s$ samples collected at each (real or virtual) antenna position. For MXAS and AS, one element (effectively, the MOV) sequentially occupies $N_e$ different positions in space, and there is one additional element (effectively, the AUX) which is stationary and displaced from the MOV along a line in space; both AUX and MOV are single antenna elements. The MOV samples are taken sequentially at the various MOV positions (denoted with subscript "i"), but simultaneously (for each position) with the AUX system (denoted with subscript "a").

$$Y_{BF}(\Delta\phi) = \sum_{N_e}\langle|\tilde{V}_i|^2\rangle + + 2\sum_{i=1}^{N_e-1}\sum_{j=i}^{N_e}R\{\langle\tilde{V}_i\tilde{V}_j^*\rangle\exp(-j2\pi\mu_{ij}\Delta\phi)\} \quad (45)$$

$$= \sum_{N_e}\langle|\tilde{V}_i|^2\rangle + 2\sum_{i=1}^{N_e-1}\sum_{j=i}^{N_e}|\langle\tilde{V}_i\tilde{V}_j^*\rangle|\cos(2\pi\mu_{ij}\Delta\phi + \phi_{ij}) \quad (46)$$

$$Y_{AS}(\Delta\phi) = R\left\{\sum_{i=1}^{N_e}n_i\langle\tilde{V}_i\tilde{V}_a^*\rangle\exp(-j2\pi\mu_{ia}\Delta\phi)\right\} \quad (47)$$

$$= 2\sum_{i=1}^{N_e}n_i|\langle\tilde{V}_i\tilde{V}_a^*\rangle|\cos(2\pi\mu_{ia}\Delta\phi + \phi_{ia}) \quad (48)$$

$$Y_{MX}(\Delta\phi) = \left|\sum_{i=1}^{N_e}\langle\tilde{V}_i\tilde{V}_a^*\rangle\exp(-j2\pi\mu_{ia}\Delta\phi)\right| \quad (49)$$

The BF expression eq. (45) represents the power (magnitude squared) of the summed antenna element responses (complex voltages), all focused via steering terms (phase adjustments) to the same direction in space. The result, for a real array of $N_e$ elements, is comprised of $N_e$ self-terms, and $N_e(N_e-1)/2$ cross-terms, the latter pertaining to the baselines of the array. The term $\phi_{ij}$ is the phase angle of the complex correlation quantity $\langle\tilde{V}_i\tilde{V}_j^*\rangle$.

Although there are only $N_e-1$ distinct (far-field) baselines, the BF formulation yields every possible position of each baseline; thus there are $N_e-1$ baselines having single unit spacing, $N_e-2$ with two-unit spacing, etc., decreasing linearly to a single instance of a $N_e-1$ unit length baseline. This triangular (including the reverse orientation of the baselines) weighting of the baselines, engendered by a uniform weighting of the antenna element responses, gives the familiar $sinc^2(\Delta\phi)$ receive (power) pattern of a uniform linear array.

Equation (47) provides the AS formulation for this AUX-MOV collection scenario. Although only the distinct far-field baselines are directly measured, they can be weighted (through $n_i$ as indicated) arbitrarily. In particular, a triangular weighting can be applied to enable equivalent performance (in terms of PSF) to the BF method. This is in fact the basis of sparse array processing, specifically minimum redundancy array (MRA) methods: the notion that full array performance can be achieved by measuring only the distinct baselines that occur. Indeed, recent efforts have illustrated that not only can the full array power pattern (and hence imaging performance) be achieved with only the distinct baselines, but that processing (including null-steering and subspace methods like MUSIC) conducted directly with the baseline products (vs. the element inputs) affords nearly twice the DOF ($2N_f-1$ vs. $N_f-1$) as a fully populated (e.g. $N_f$ elements) version of a sparse array (e.g. $N_S$ elements).

The MXAS formulation, which form is derived above, is given by equation (49) and differs from AS in that the magnitude of the sum of the directly-measured (AUX-MOV) baselines versus (for AS) (twice) the (weighted) real part of the same sum. It has been shown that this operation yields all of the intra-array baseline terms, just as for the BF operation. Rather than the sum of them, however, as for BF, under the magnitude operation (i.e. $|\tilde{z}|=sqrt(\tilde{z}\tilde{z}^*)$), MXAS yields the square root of the sum of these baselines. It thus engenders a PSF that is the square root of that for a corresponding real array. Notably, the correspondence is not achieved, as it may be with AS, through a redundancy (i.e. $n_i$) of the distinct baselines. As we shall see, this distinction is significant for near-field scenarios. Another notable aspect distinguishing the MXAS operation from AS, is the complete elimination, in equation (49), of the influence of the (remote) AUX, which has several advantageous implications. A detailed comparison and discussion of the prior art real array BF and AS as applied to radio astronomy (RA), in the form of synthesis imaging (SI), as compared to the MXAS method for image forming is found in EXHIBIT E of U.S. Provisional Patent Application No. 62/410,495 which is fully incorporated by reference herein.

From the comparisons to conventional image forming methods, it can be seen that MXAS confers multiple advantages relative to AS-PS (Aperture Synthesis—Principal Solution), owing to the removal of the influence of the AUX and the high spatial frequency component it engenders, and also to the property of MXAS that all intra-array baselines are estimated, and there is therefore no assumption of the spatial invariance of a measured baseline, as there is with AS-PS. These attributes translate, for MXAS, into a) enhanced performance for extreme near-field scenarios; and b) robustness to phase offsets between collection platform receiver chains.

Accordingly, the present embodiments describe a process and systems for constructing arbitrarily large (subject to antenna FOV, and, for NB operation, subject to bandwidth and thus fringewashing constraints) virtual arrays using two or more collection platforms (e.g. AUX and MOV systems) having differing velocity vectors. The resultant imaging system is comprised of the collection of baselines that are created between the two collection systems as a function of time. Because of the unequal velocity vectors, the process yields a continuum of baselines over some range, which constitutes an offset imaging system 44 (OIS) in that the baselines engendered are similar to those for a real aperture of the same size as that swept out by the relative motion, but which are offset by some (potentially very large) distance.

The MXAS method is "passive" in the sense that no reference signal is required; beyond this fact, however, the distinction between "passive" and "active" is not meaningful. The result of the MXAS process is an effective aperture which is in principle capable of imaging both spatially incoherent target scenes as well as spatially coherent scenes, the latter of which normally results from reflected illumination and is regarded as the province of "active" imaging, synonymous with synthetic aperture radar (SAR) methods, whether mono- or bi-static. The real distinction to be made is that with MXAS a virtual aperture (array) is created using a minimum of two collection systems whereas SAR methods require only a single moving collection system but also access (in terms of knowledge of waveform and location) to the illumination signal. This distinction is accompanied by additional differences in the resultant capability as the nature of the imaging system synthesized is not identical between the two methods.

It has been shown that the point spread function (PSF) achieved by MXAS processing is the envelope of the magnitude of the principal solution obtainable by application of classic aperture synthesis techniques. The offset nature however results in a PSF that is two times wider than a comparable non-offset system.

It was also shown that OIS is applicable to a wide range of target scenarios of interest, dependent upon the spatial frequency spectrum and spatial coherence properties of the target scene. In particular, it is applicable to scenarios consisting of a finite number of discrete sources; and may be expected to be applicable to spatially coherent scenes, such as with reflected illumination, dependent on the character of the scene with respect to phase randomization. One constraint that is indicated by AS theory is that, for spatially coherent scenes, the baseline output, even in the far-field, is spatially variant and therefore successful imaging performance requires that one of the participating collectors (e.g. the AUX), be in a fixed position during the collection interval. This marks a difference relative to other imaging methods such as any form of SAR for which there is access to the illuminating signal. Notwithstanding this theoretical indication, it is possible that imaging of spatially coherent scenes may be achievable with all (e.g. two) non-static collectors in the case of a small number of source (e.g. reflection) locations, as might also be manifest in cases of multi path from ground-based emitters.

In an alternative embodiment, it is contemplated that the MUSIC algorithm may be applied to MXAS, in a similar manner to its successful application in the SMOS mission as discussed in Park, et al., "Improved MUSIC-Based SMOS RFI Source Detection and Geolocation Algorithm," IEEE Trans. Geosci. Rem. Sens., vol. 54, no. 3, pp. 1311-1322, March 2016. Although, the very nature of MXAS in terms of long motion-extended synthetic arrays, precludes in large measure the need for super-resolution methods, as MXAS inherently yields very (to extremely) high resolution. For example, as discussed above, two coherent sources with angular separation of just 2.75 degrees are easily resolved.

Although it has been seen that relative to real arrays, for which data is received simultaneously across elements, the temporally-distributed nature of the virtual array inherent in MXAS is disadvantageous in terms of fidelity of the expected value of the baselines, for the same integration time applied to both concepts, such disadvantages are obviated by the potential, through application of MXAS, to synthesize and exploit virtual arrays that are multiple orders of magnitude larger than any array that could be feasibly constructed and/or deployed.

The embodiments described and claimed herein are not to be limited in scope by the specific examples herein disclosed since these examples are intended as illustrations of several aspects of the embodiments. Any equivalent examples are intended to be within the scope of the embodiments. Indeed, various modifications of the embodiments in addition to those shown and described herein will become apparent to those skilled in the art from the foregoing description. Such modifications are also intended to fall within the scope of the appended claims. All references including patents, patent applications and publications cited herein are incorporated herein by reference in their entirety and for all purposes to the same extent as if each individual publication or patent or patent application was specifically and individually indicated to be incorporated by reference in its entirety for all purpose.

The invention claimed is:

1. An offset-spatial-frequency imaging system for imaging a target, comprising:
a first antenna system and second antenna system, wherein the first and second antenna systems are in relative rotational motion and the first antenna system is rotating in a first plane, and further wherein the first and second antenna systems collect temporally distributed individual signals from one or more target emitters; and
a processor for receiving the temporally distributed individual signals from the first and second antenna systems and constructing a continuum of temporally distributed interferometric signal baselines of the one or more target emitters projected as a virtual array in a second plane that is orthogonal to the first plane.

2. The system of claim 1, wherein the target contains multiple co-channel emitters, and further wherein each of the multiple co-channel emitters is imaged by the system.

3. The system of claim 1, wherein the first and second antenna systems are in orbit around a space-based mass and further wherein the first antenna system is connected by a first tether to a circumference of a rotating body and rotates in a first plane and the second antenna system includes a 1-dimensional linear antenna array attached to an end of the rotating body via a second tether.

4. The system of claim 3, wherein a length of the first tether is on the order of kilometers.

5. The system of claim 3, wherein the continuum of temporally distributed interferometric signal baselines is projected as a 2-dimensional virtual array in a second plane that is orthogonal to the first plane.

6. The system of claim 5, wherein an along-track dimension of the virtual array is equal to the length of the first tether.

7. The system of claim 1, wherein the system is in orbit around a space-based mass and further wherein the first antenna system includes a first tether rotating in an X-Z plane and the second antenna system includes a second tether rotating in a Y-Z plane.

8. The system of claim 7, wherein a distance between the first antenna system and the second antenna system is on the order of tens of kilometers.

9. The system of claim 8, wherein the first tether extends in two directions from a first axis of rotation and the second tether extends in two directions from a second axis of rotation.

10. The system of claim 9, wherein an antenna is located at a first and second ends of the first tether and at a first and second ends of the second antenna.

11. The system of claim 7, wherein the first and second tethers rotate at approximately 1 rpm.

12. The system of claim 1, wherein the first antenna system includes first and second antennas located at either end of a rotating tether for projecting a continuum of across-track baselines as a function of time of a line between the first and second antennas and the second antenna system includes a small satellite (smallSAT) having an antenna thereon, the smallSAT being in a same orbital plane, lower altitude than the first antenna system and the second antenna system creating a continuum of along-track baselines between one or both of the first and second antennas from the first antenna system.

13. The system of claim 12, wherein there are multiple smallSAT comprising the second antenna system located circumferentially along the lower altitude around a celestial mass.

14. The system of claim 1, wherein the system is in orbit around a space-based mass and further wherein the first antenna system includes a first single orbiting small satellite (smallSAT) at a first altitude and a cluster of smallSATs at the first altitude and at an approximately 1 degree inclination to the single orbiting smallSAT, the cluster of smallSATs being arranged across a width of a desired aperture and the second antenna system includes a second single orbiting smallSAT at a second altitude, wherein the second altitude is lower than the first altitude.

15. The system of claim 1, wherein the first and second antenna systems orbit a spaced-based mass and the processor is located on the space-based mass.

* * * * *